United States Patent [19]

Hewitt et al.

[11] Patent Number: 5,012,073

[45] Date of Patent: Apr. 30, 1991

[54] DATA CARD AND MAILER DATA MATCH/INSERTER SYSTEM

[75] Inventors: Donald W. Hewitt, Roseville; David D. Seibel, Bloomington, both of Minn.

[73] Assignee: Fujitsu Limited, Kawasaki, Japan

[21] Appl. No.: 53,608

[22] Filed: May 20, 1987

Related U.S. Application Data

[60] Continuation of Ser. No. 866,941, May 27, 1986, Pat. No. 4,734,380, which is a division of Ser. No. 482,964, Apr. 8, 1983, Pat. No. 4,622,671, which is a continuation-in-part of Ser. No. 469,891, Feb. 25, 1983, abandoned.

[51] Int. Cl.[5] .............................................. G06F 15/20

[52] U.S. Cl. ...................................... 235/375; 235/380

[58] Field of Search ........................ 53/29; 270/52, 58; 271/172; 235/380, 375, 419, 431

[56] References Cited

U.S. PATENT DOCUMENTS

| | | | |
|---|---|---|---|
| 3,484,097 | 12/1969 | Jory | 270/58 |
| 3,606,728 | 9/1971 | Sather et al. | 53/54 |
| 3,704,015 | 11/1972 | Holovka | 270/52 |
| 3,819,173 | 6/1974 | Anderson et al. | 270/54 |
| 3,899,165 | 8/1975 | Abram et al. | 270/54 |
| 3,901,500 | 8/1975 | Gath | 270/53 |
| 3,917,252 | 11/1975 | Harder et al. | 270/58 |
| 3,924,845 | 12/1975 | Wise et al. | 270/54 |
| 3,953,017 | 4/1976 | Wise | 270/54 |
| 3,988,983 | 11/1976 | Matsumoto et al. | 101/35 |
| 4,034,210 | 7/1977 | Hill et al. | 53/266 A |
| 4,091,268 | 5/1978 | Jarleton et al. | 53/266 A |

*Primary Examiner*—Harold I. Pitts

*Attorney, Agent, or Firm*—Staas & Halsey

[57] ABSTRACT

An automated system for inserting data cards into preprinted and addressed mailing forms. A computer controls the automatic asynchronous operation of the overall system. Each mailing form bears the account number and mailing address of the intended card recipient, and a designation of the number of cards to be inserted. The cards are pre-embossed and encoded, and supplied in number and sequence corresponding to the requirements of the successoin of forms. The forms advance in succession from a fan-fold continuous strip supply through a read station and into an insert station. Cards are picked from the supply in individual succession and transported past a read station at which account number data is read from the card for comparison with the data of the form currently positioned in the insert station. The insert station includes a number of bins corresponding to the card insert positions on the form and is controlled to receive the proper number of correctly matched cards in the appropriate bins for the form. Should a no-match condition occur or if the corresponding number of proper cards is not satisfied, the card transport terminates to permit a visual operator check. Operator controls permit selectively rejecting cards and forms where matching requirements are not met and manual overrides for correction of same and for re-initiating automated operation. Forms with the proper inserted cards are automatically burst from the strip and proceed through a folder to an output transport for stacking in sequence into an output hopper.

74 Claims, 41 Drawing Sheets

1000
1015
2026
1026
2030
2021
1092
2019
2017
2004
2006
2010
2012
2013
2060
2014
2016

1101
1104
1111
1121
522
1120
1128
1130
SW
1119
1150
1158
1115
2174
2172
HH
2192
2006
2191
H
2060
20
2168
41
2189
2190
2100
1117

1152
1154
1156

DATA CARD AND MAILER DATA MATCH/INSERTER SYSTEM

This is a continuation of co-pending application Ser. No. 866,941 filed on Jan. 4, 1978 now abandoned.

BACKGROUND OF THE INVENTION

1. Field of the Invention

This invention relates generally to systems for attaching data cards to pre-addressed mailing forms and, more particularly, to such a system wherein data read from the cards and forms, respectively, is compared to assure attachment of the card to the proper form, such attachment being performed automatically and in an improved matter assuring secure attachment while affording ease of removal of the card from the form by the intended recipient.

2. Description of the Prior Art

Prior art patents which may be pertinent to this invention are as follows:

Sherman U.S. Pat. No. 2,440,302
Jory U.S. Pat. No. 3,484,097
Blow, Jr. U.S. Pat. No. 3,537,703
Rupp U.S. Pat. No. 3,804,399
Zaccogino, Jr. U.S. Pat. No. 3,951,251
Funk U.S. Pat. No. 3,961,281
Stocker U.S. Pat. No. 3,965,644
Goldman U.S. Pat. No. 3,982,102
Torok U.S. Pat. 4,004,136.

The patent to Stocker, U.S. Pat. No. 3,965,644 shows an apparatus for stuffing envelopes and specifically for stuffing a card into a pocket formed on a particular type of mailing form designed for use with the apparatus. However, there is no automated matching of credit card information with similar information on the forms.

The patent to Jory, U.S. Pat. No. 3,484,097, teaches the machine attachment of cards onto a carrier webb wherein slots 18 and 22 are provided in the webb structure for reception of an insert card.

The patents to Sherman, U.S. Pat. No. 2,440,302 and Blow, Jr., U.S. Pat. No. 3,537,703, show form bursting and separating machines.

The patents to Torok, U.S. Pat. No. 4,004,136 and Goldman, U.S. Pat. No. b 3,982,103, disclose matching credit information on a credit card with information of a similar nature stored in the apparatus.

The patent to Funk, U.S. Pat. No. 3,961,781 shows a system for performing a plurality of functions including sheet recognition, marking, folding, sorting, discharging and stacking, etc. together with a programed control for the system; manual overrides of automatic controls are also provided The patent to Zaccagnino, Jr., U.S. Pat. No. 3,951,251, teaches the use of a plurality of light emitting diodes (LED's) together with photosensors for scanning the LED's in a document positioning apparatus.

None of the known prior art devices including those represented by the above prior art patents offers the unique features and advantages of the system of the invention disclosed herein.

Despite the massive volume of mailing of credit, identification and like type cards in today's economy, there has yet to have been provided an effective and efficient means for attaching such cards to mailing forms. The mechanical function of attaching the cards to the form frequently is performed manually, a slow and laborious process. The structure of the mailing forms themselves frequently does not assure secure attachment, with the risk that cards can become detached during subsequent handling, either preliminary to or during mailing or upon opening of the mailing form by the recipient, in every case increasing the possibility of loss of the cards. Forms which assure secure attachment frequently use an adhesive surface to which the card is attached, increasing the cost of the mailing forms as well as introducing handling problems in processing cards and forms. Moreover, subsequent, intended removal of cards from forms is made difficult and frequently the surface of the card, after removal, is contaminated, with adhesive residue. This is both objectionable to the cardholder and detrimental to subsequent intended use of the card.

Mailing forms in common use are of various different configurations; for example, one-part forms simply have the card attached thereto and are inserted into an envelope whereas two-part and three-part forms are folded into reduced size before insertion into an envelope, these forms wrapping about the card and affording greater security against a card detached from the form being lost. One type of folded form includes a window aligned with the window in the mailing envelope, in those cases where the credit card itself bears the mailing address of the recipient and serves as the address visible from the outside envelope. This form is efficient, but increases the likelihood of theft, since it reveals that the envelope contains credit cards. Other such forms may be pre-addressed such that the address on the form is visible through an envelope window, concealing thereby more effectively the contents.

The use of pre-addressed mailing forms, while desirable, has introduced additional problems of assuring proper matching of the pre-embossed and pre-encoded cards with the correct mailing form, with the undesired result that the addressee receives the wrong cards if a mis-match has been made. The manual assembly of cards with pre-addressed mailing forms is fraught with human error both as to assembly of the correct cards with the proper pre-addressed form and, moreover, of the correct number of cards intended to be sent to the addressee of the form—i.e., especially where the account holder may designate the number of cards which he is to receive.

Prior automated systems have been insufficient or inadequate in satisfying the many necessary functions indicated above. For example, they have failed to provide adequate means to match the correct credit cards, as to addressee and required number thereof, with the proper form in a fully reliable and sufficiently rapid manner. Typically, prior art systems cannot accommodate different types of mailing forms—e.g., one-, two- or three-part forms. Many require precut and presized forms and hence lack the reliability, speed and efficiency achieved by use of forms of a continuous fan-fold strip variety. The latter assure that the proper sequence of successive forms is maintained and avoids feed problems, e.g., feeding two sheets at one time, which occur with precut individual forms. In general, prior art mailing systems lack the necessary control and automated handling functions as are essential to overall effective and efficient operations.

SUMMARY OF THE INVENTION

Accordingly, it is an object of the present invention to overcome these and other defects and deficiencies of the prior art systems.

More particularly, it is an object of the present invention to provide an effective and efficient system for automatically inserting cards into mailing forms whereby the cards are securely retained for transmittal, yet easily and quickly removed by the recipient. Further, it is an object to afford such secure attachment without the use of adhesives, thus avoiding problems of adhesive handling in the assembly operation and contamination of the card surface by the adhesive when subsequently removed.

A further object of the invention is to provide fast, yet accurate matching of information pre-printed on mailing forms with the respective data card or cards to be attached thereto and to afford immediate termination of system operation when the required matching conditions are not met, while further affording convenient operator interaction and intervention to correct the defect.

A further object of the invention is to permit use of mailing forms variously of one-, two-, or three-part types and particularly to provide handling apparatus of sufficient flexibility to accommodate any of these types.

Another object of the invention is to afford an automated system wherein the number of cards to be inserted in a given mailing form may be preselected—e.g., from one (1) to four (4) thereof—which number may vary from form to form, yet wherein automated matching and inserting functions are performed in a continuous and uninterrupted manner, regardless of variations in the number of cards required for successive forms.

Yet a further object to permit use of a double, or side-by-side form supply, the combined width being convenient from the standpoint of conventional printing equipment used in printing such forms as to the width of paper handled thereby, and with regard to effectively doubling the throughput rate for any given operating speed of the system of the invention.

Yet another object of the invention is to provide automated bursting of individual forms from a continuous supply thereof and automated trimming of transport boarders from the forms, after insertion of the cards and prior to folding.

Still another object is to provide for selective folding of forms of two or more parts and transport thereof to an output stacker in folded form for convenient, subsequent insertion into mailing envelopes.

Another object of the invention is to provide error sensing and detecting apparatus for all critical system functions with automated controls upon detection of error, to assure accurate operation at all times.

Still another object is to provide visual inspection stations for operator intervention and inspection when errors are detected, and manual overrides for operator intervention to correct such errors as occur and are detected.

Another object is to provide automated reading of data from pre-addressed forms from credit cards, whether encoded or embossed thereon, for supply to the computer control for the data matching functions.

Another object is to provide computer control for the entire system to permit asynchronous operation maximizing system speed and efficiency and enabling proper shut down of the equipment upon detection of errors or at completion of a given run.

A general object of the invention is to provide a fully automated operation of attachment of cards to mailing forms and, where such forms are pre-addressed, of matching the card and form data to assure supply and attachment of the correct cards of the number required to the respective forms.

Another object of this invention is to provide computer control structure for the entire system which appropriately will coordinate the proper activities of the various subcomponent structures in their overall inter-relationship with the entire system. Another object is to provide continuous overall operation of the system while permitting certain of the subsystems to be in a state of hold, or temporarily suspended from operation because of errors or other operations, without affecting the continuing function of other portions of the overall system.

The above and other objects and advantages of the system of the invention will become apparent from the following detailed description thereof.

To summarize, the system of the invention provides for fully automatic, rapid and effective attachment of data cards, i.e., credit or identification cards, or elements of like sort, to mailing forms. While the term "credit card" is used predominately throughout, it is to be understood that any type card (preferably of plastic, though of any type flexible, resilient material) may be used with this automated system. In a preferred embodiment, the mailing forms are pre-printed, typically with the address of the intended recipient, the credit card account number, and the number of cards to be attached to the given form. The invention will be described in a preferred embodiment wherein cards are to be attached to such pre-addressed forms, necessitating proper matching of data read from each card with its respective form and the supply of the requisite number of cards for the given, respective form. It should be appreciated that the inserting apparatus may be employed solely for the mechanical function of automatically attaching cards to forms, i.e., where data matching requirements are not present and, as will later become apparent, many other of the individual structures and operating controls of the system are useful in many different environments and applications apart from the specific, preferred embodiment to be described.

The system of the invention in its preferred embodiment herein described includes a number of different "stations", so-characterized to correspond to certain basic functions performed by the system. The system operates in an asynchronous manner in that each "station" and its related function is optimized as to speed, efficiency and effectiveness, while maintaining proper general coordination between the various successive individual stations/functions.

The pre-printed forms are supplied in a fan-fold or manifold continuous strip configuration, successive forms being delineated by perforations afforded to facilitate subsequent bursting of the strip into individual forms. The supply strips, moreover, include edge or marginal portions having sprocket holes for transport of the forms in a positive, precision manner into the various successive operating stations. Preferably, the forms are double-width and thus contain two separate mailing forms in side-by-side relationship.

Each form preferably contains two separate credit card attachment positions for attaching, selectively, either one or two credit cards each. The forms feature a unique attachment structure wherein apertures of specific configuration and location are formed adjacent the two, preselected, diagonally opposite corners of a card of the size to be attached to a given form, at each of the card attachment positions. The inserting function, to be described, provides for bending the card about a diagonal axis of the card to a flexed, configuration, concave relatively to the form surface. The card then is lowered to insert the corners into those corresponding apertures. Finally, while maintaining the corners in their inserted positions, the card is permitted to return to its normal flat or planar configuration whereby the corners project fully into the respective apertures and thus lock the card to the form.

The continuous form supply strip is advanced by timing sprocket chains initially to a read station at which transport terminates while an optical character reader (OCR) reads the necessary information from each of the side-by-side forms—typically, the information read being the account number and the number of cards for that account number to be inserted on the given form. This information is transmitted to the computer. After reading, the form then is advanced into the insert station. This assumes, of course, that any prior form theretofore positioned in the insert station has received the requisite number of cards and has been transported out of the insert station.

The cards are pre-embossed and/or pre-encoded and provided in edge-stacked relationship in the same sequence of account numbers and with the requisite number of cards per account, corresponding to the respective forms and the sequence thereof presented in the continuous fan-fold strip supply of those forms. Two such trays of cards are accommodated in the card input stacker station; this system automatically selects a given one of those trays as the first tray for feed supply of cards. Sensors determine an empty condition of each tray and thus upon depletion of the card supply in one tray, the feed will automatically begin from the other tray. Thus, continuous operation can be achieved by replacing each tray as it becomes empty. Alternatively, either tray may be selected first by manual override.

A picker mechanism picks a card from the selected tray and feeds it into a card transport, implemented by a belt engagement system which grasps the card longitudinally therealong and moves it from the input stacker station to a card read station. Either embossed characters on the card, magnetic encoding or other types of encoding or combinations of one or more of the above may be read at the card read station and the information transmitted to the computer. The card is transported continuously to and through the read station and progresses into an inspection station, the transport conveniently re-orienting the card from a vertical to an inclined horizontal position. Should the data read from the card not correspond, or "match", the data read from the form intended to receive that card, the card transport terminates and the card remains in the inspection station for observation by the operator. This error condition can arise for various reasons. For example, if the required number of cards for a given form are not present, but otherwise the sequence of cards is correct, the card which stops at the inspection station due to a data match error will actually be a card bearing an account number corresponding to the next form to be supplied. If that is the case, the operator intervention will involve indicating to the system by the control panel "skip card" switch that a card is missing. The operator may also designate that the incorrect form be routed to form reject hopper. The system completes the card insertion function and resumes automatic operation. Assuming that the sequence and required number of cards for the form now advanced into the insert station are available, automatic operation will resume.

Other errors would include the more simple circumstance of a card simply being out of sequence or containing some other error. Error of embossed character reading itself may occur in which case if the operator determines that the account number is correct for the form, manual override of the error condition can be accomplished and the card advanced into the inserter station. If the card is in error, alternatively, a manual control provides for passing the card directly through the insert station and into a card reject hopper.

The insert mechanism of the insert station includes movable fingers defining a number of bins corresponding to the number of card positions on the forms. As before specified, double width forms are employed, each having two attachment positions for a total of four card positions and hence four bins. The insert mechanism moves in a vertical reciprocating manner so as to receive the cards from the card transport in an upper position and to perform the card insertion into the forms in a lower position directly superposed on the forms. The insert mechanism includes a card transport path extending along the top of the bins. A deflecting element associated with each bin is selectively controlled either to a normal "up" position to transport the card over, and beyond its associated bin, or to an activated, "down" position to deflect the card into the bin. The card reject hopper is positioned at the exit from the card transport mechanism of the insert station; when an error occurs requiring reject of a card, the deflecting elements remain in the up position so that the card is transported fully through the insert station into the reject bin.

Where a data match is satisfied, the card is transported through the insert station and, under computer control, the appropriate deflecting element is actuated to deflect the card into the proper bin, with regard to the total cards per form required. After the bins have received the necessary cards for the associated forms then at the insert station, the insert mechanism is actuated to perform the insertion function.

Specifically, the insert station includes a support finger which extends centrally underneath each card transverse to the greater longitudinal dimension thereof, and extending from the trailing longitudinal edge of the card as respects the eventual transport path of the card and its associated form from the insert station. Further, two pairs of fingers extend under the card at displaced positions along the opposite longitudinal edges of the card, adjacent the card end edges. These "fingers" define the initial, longitudinal sides of the normal bin configuration corresponding closely to the normal dimension of the card. Other structures define the ends of the bin.

When the bins have received the appropriate number of cards, the insert function is performed. The bin defining fingers are pivoted away from the card, the underlying central support finger remains stationary and a pair of pins are lowered to engage the card adjacent the diagonally opposite corners which are to be received in the apertures of the form. The card is flexed in this manner, the pins are lowered with the central support finger remaining up maintaining the flexed condition of the card and thereby inserting the diagonally opposite card corners into the respective apertures in the form. The central support finger then is lowered into close proximity with the form, permitting the card to flex to its normal flat or planar condition, the diagonally opposite corners projecting fully into the respective apertures and locking the card into position. Thereafter, the paper transport mechanism is actuated to advance the form with its attached, inserted cards out of the insert station and into a bursting station. After removal from the insert station and specifically when the trailing longitudinal edges of the attached cards have passed beyond the central support fingers, the latter are raised, and the support fingers are pivoted back into their bin-defining positions, thus preparing the bins for receiving the necessary cards for the next successive (double) mailing forms to be positioned in the insert station.

As the form exits from the insert station, it enters a bursting and trimming station wherein the side-by-side forms are burst from the next successive form of the strip, which has now entered the insert station along a delineating perforation therebetween; the burst forms are separated into two forms and substantially simultaneously the margins with sprocket holes therein are slit from their respective forms. The transport mechanism of the folder station advances the burst forms for the slitting operations and directly into the folding station.

In the folding station, depending on the type of the form, a system of rollers and baffle plates directs the form so as to fold it, where required, and a folded form then exits from the folder into an outfeed transport mechanism.

The outfeed transport mechanism of the output station receives the folded forms, transports same to an output stacker station and a further mechanism conveys the folded forms in separated relationship into a selected one of two adjacent output stacker trays.

At this juncture, the asynchronous operation of the system will be readily appreciated as necessary to its maximum speed and efficiency of operation. For example, since different numbers of cards may be required for adjacent or successive forms, the time required for transporting cards into the insert station will vary. Conversely, the insert operation is performed at the same speed regardless of the number of cards to be inserted on the adjacent forms. Moreover, the number of folds will affect the speed of throughput of the forms through the folder station and to the output hopper. Hence, separate monitoring of the stages of operation of the respective stations and thus asynchronous control of the respective stations permits maximizing the total system through-put rate while assuring maintenance of coordination of the respective stations' operations. Further, where error conditions exist, whether it be the depletion of cards in the input stackers or ah error in the reading of a card or a data match operation, jam or other error conditions in the feeding of the forms, insert operations, or etc., the operation of the involved station should be suspended, but previously completed forms should be permitted to be transported through to the output stacker. Again, asynchronous operation is essential to achieve this desirable mode of operation. The logic arrangement whereby this asynchronous operation of these multiple operating stations is achieved is a significant contribution to the efficiency and effectiveness of the system of the invention.

DESCRIPTION OF THE PREFERRED EMBODIMENT

Figure 1:
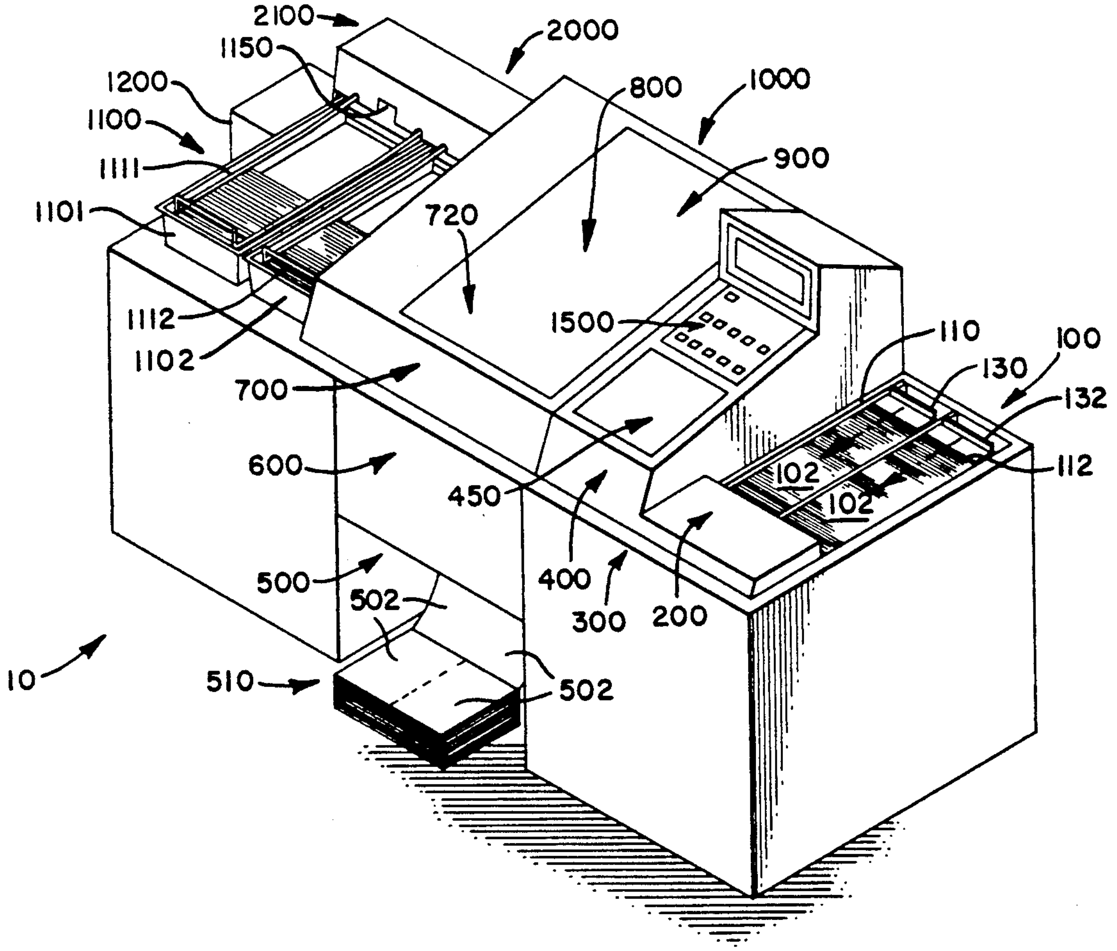
FIG. 1 is a perspective of the entire credit card data match and inserter system of this invention.
Figure 7:
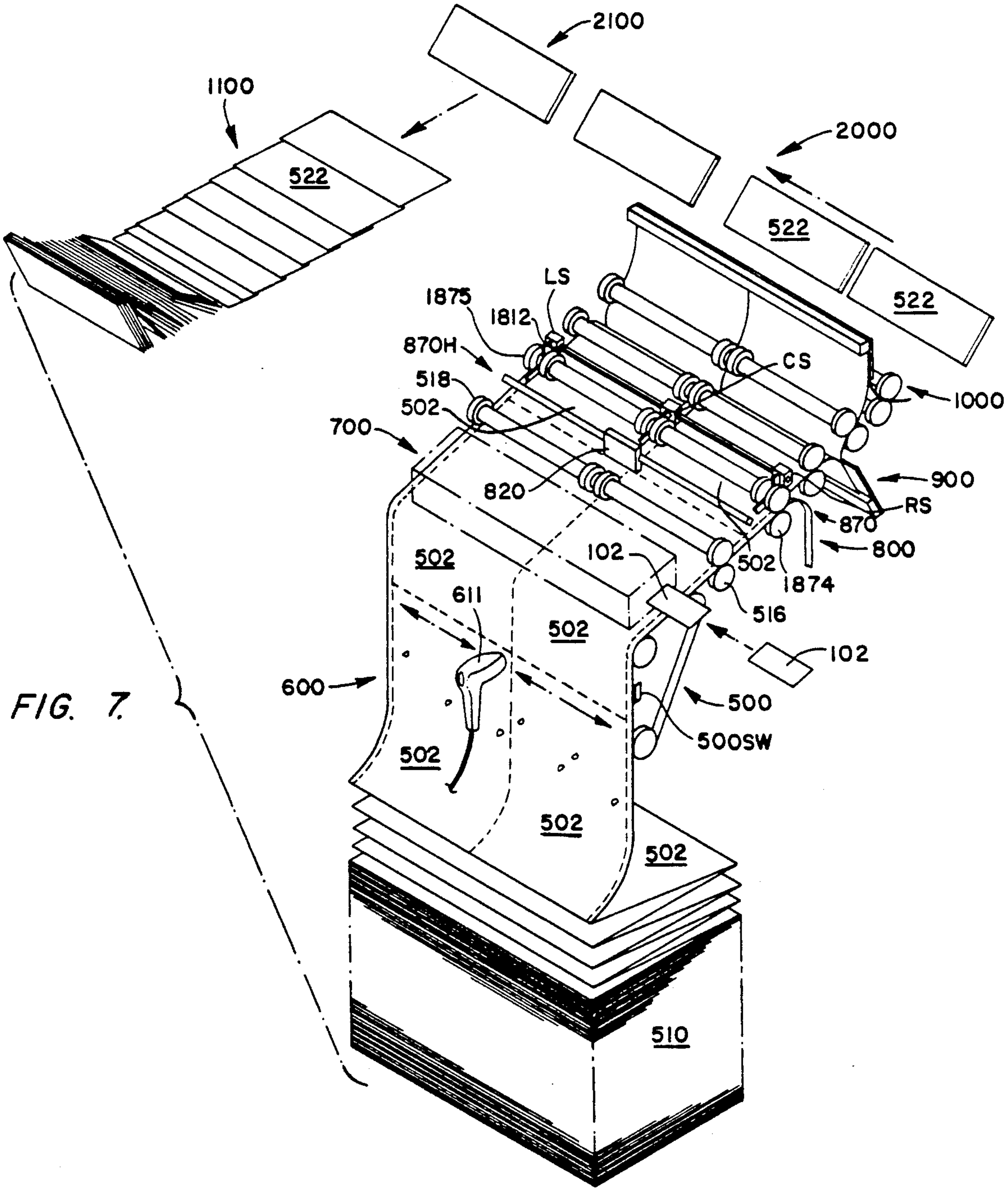
FIG. 7 is a perspective diagrammatic view of the mailer form supply and transport mechanism, optical card reader, form burster and slitter, form folder, form receiver and outfeed flow path.

With concurrent reference to FIGS. 1 and 7, cabinet 10 houses the entirety of the mechanical and electrical apparatus and control computer of the data match inserter system of the invention. Commercial acceptability of equipment of this type requires that it be of dimensions to permit passage through conventional office doorways, limiting depth to approximately 31 inches; this imposes stringent design requirements, with close interrelationship of the various mechanical operating modules; this important design requirement has been achieved in accordance with the teachings of this invention.

The card input hopper, or station, 100 for the preembossed and encoded cards 102 accommodates two trays 110 and 112 in which the cards are stacked vertically on edge in a predetermined sequence corresponding to their intended matching, as to card account number and number of cards, with the sequence of forms into which the cards are to be inserted. Accordingly, the trays 110 and 112 are necessarily positioned with that sequencing function taken into account, and the system, as will be discussed, automatically selects a first of the trays for initial supply of cards and when the tray is empty, automatically switches to the second tray. As a matter of convenience tray 110 is selected first, initially. The card input hopper 100 includes spring biased mechanisms 130 and 132 for urging the cards toward the front end of the trays.

The automated selection, moreover, may be overridden by manual control. For example, it may for some reason be preferable to use a tray in position 112 and, accordingly, that tray may be manually selected first. Moreover, when the system automatically switches from a depleted tray 110 to tray 112 and is shut down during operation on tray 112, the automatic selection would return to tray 110 and this instead can be overridden by manual selection of tray 112.

Photosensors 242 and 240 detect the presence or absence of cards in the respective trays 110 and 112; the resulting sensor outputs to the control system accordingly provide the automated switching from a depleted tray to a full tray and as well to recognize the condition of both trays being depleted so as to shut down the feed mechanisms and, eventually, the system operation.

A card pick station 200 receives the front ends of the rays and includes corresponding picking mechanisms, selectively enabled into operation for the selected tray, as aforedescribed, for picking individual cards in succession from the selected tray. The pick mechanisms direct the picked card to a transport mechanism 300 which receives the picked card and transports it past a card read station 400 and a visual observation station 450. The card transport mechanism 300 rotates the cards during transport about a longitudinal axis aligned with the direction of transport to a rearwardly inclined, substantially horizontal position, to facilitate viewing thereof at the observation station 450, and alignment with the insert station.

For continuity of nomenclature, each individual mailer form is referred to by reference numeral 502, each individual plastic card is referred to by reference numeral 102 and once combined, i.e., the plastic cards) has (have) been inserted into the form, reference numeral 522 is used.

Figure 3:
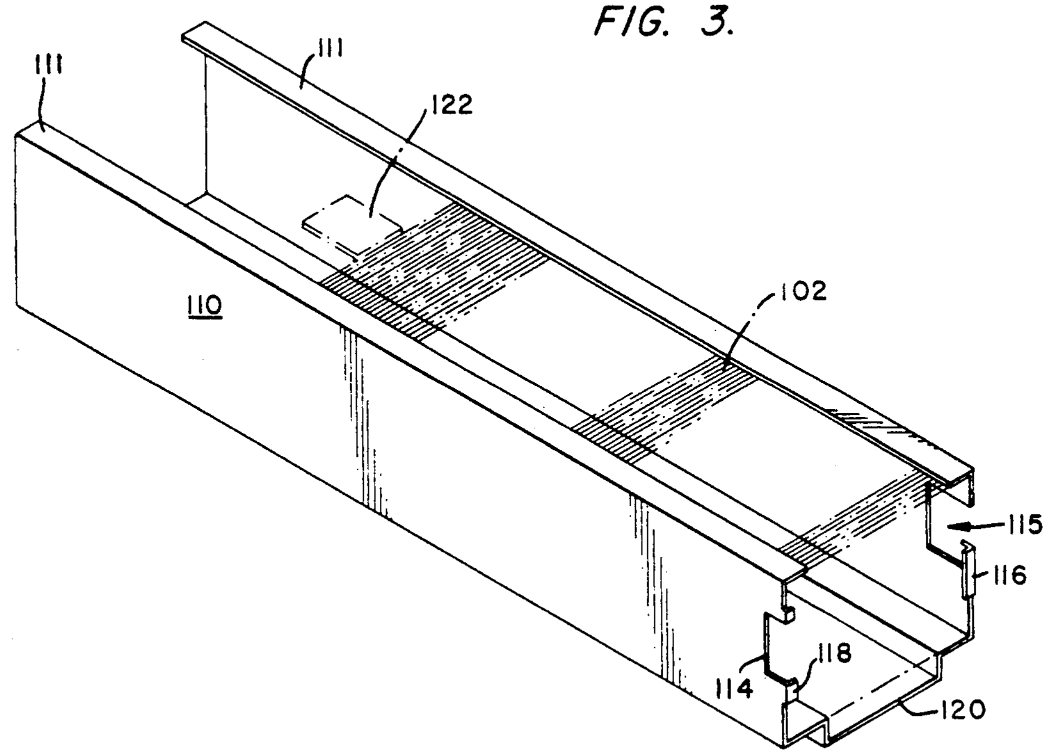
FIG. 3 is a perspective view of a single input tray for holding a plurality of pre-embossed credit cards.
Figure 5A:
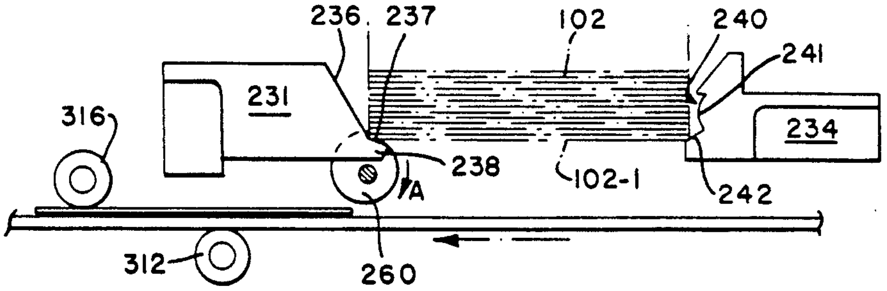
FIGS. 5A–5D are diagrammatic views showing successive steps in the operation of the card pick mechanism.
Figure 5B:
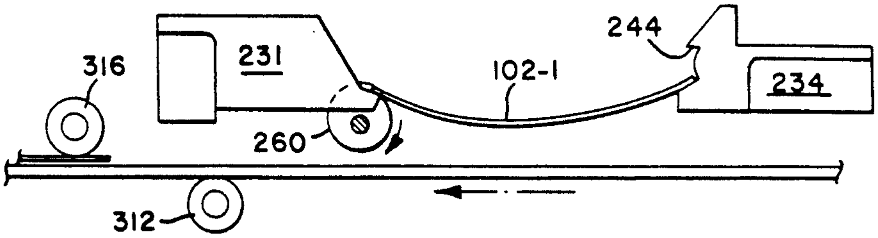
Figure 5C:
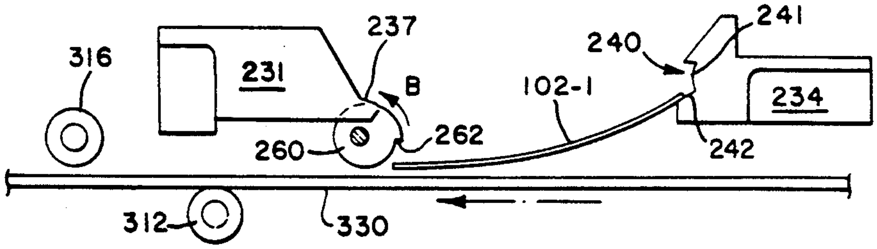
Figure 5D:
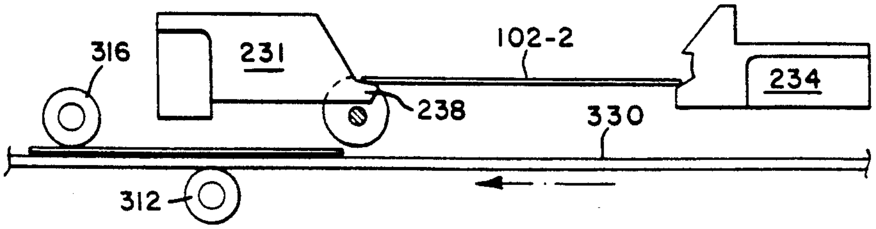

FIG. 3 shows a single input tray 110 for holding a plurality (e.g., minimum 350 cards each) of pre-encoded and/or pre-embossed credit cards. The overall tray 110 is of generally rectangular configuration and sized according to the particular size and type of credit cards to be processed (e.g., typical types CR80, 50 and 60, each of different dimensions requiring corresponding, different trays). Inwardly extending guide lips 111 restrain the cards from vertical displacement. A longitudinal recess or channel 120 receives a conventional clip spring bias mechanism shown in outline form at 122 maintaining a forward bias on the cards. Retention lips 116 and 118 prevent the cards from being pushed out of the front of the tray inadvertently. Recesses 114 and 115 permit engagement of the front-most card by the pick mechanism.

A form transport station 500 receives a supply of successive, double-width forms 502 in a continuous, fan-fold strip 510; it incremently advances the strip 510 to position a given pair of double-width forms 502 at a form reader station 600 and the next preceding pair of forms 502 at the insert station 7000. An optical character reader (OCR) 602 scans a selected line of data on the forms 502 at station 600 for supply of form data to the computer for comparison with data read from the plastic cards. As seen in FIG. 7, the spacing of the stations 600 and 700 permits simultaneous card insertion and scanning operations, respectively on the successive pairs of forms 502.

A burster/slitter module 800 provides for bursting the perforation line between successive forms 502 and is positioned to engage the perforated line delineating between the bottom edge of the form already advanced partly into the folder module 900, and at the top of the next successive form currently in the insert module 700, thereby to release the former from the latter. The slitter mechanism is structurally common, in part, to input portions of the folder module, and functions to slit the double-width, burst forms into two separate forms, and to slit away the longitudinal margins which engage the tractor drive of the form transport.

Folder module 900 folds the burst and slit, card-filled individual forms 522 and deposits the folded forms into a folder outfeed module, or receiver, 1000. The folder module 900 is selectively adjustable to accommodate the different lengths and fold requirements of one- or two- or three-part forms, in the first case merely transporting same and in the second and third cases selectively folding the forms once or twice, respectively. A folder output feed transport 2000 transports the folded forms to a stacker outfeed module 2100 at which output ejector mechanisms eject the folded forms in sequence into the output stacker station 1100. The station 1100 includes a pair of trays 1101 and 1102 and a corresponding pair of output ejectors 2100 which are selectively enabled for ejecting the folded forms, in sequence, into a selected one of the trays 1101 and 1102 and, when that selected tray is full, automatically switches to the other thereof. This permits continuous operation, the full tray being removed and replaced when the second tray is selected.

Retaining arms 1111 and 1112 are associated with trays 1101 and 1102, respectively, and carry at their rear mounting portion a plate as seen at 1150 for arm 1111. When tray 1101 is properly positioned, arm 1111 is moved to a down position contiguous with the top edge of the vertically stacked, folded forms therein. Arm 1111 is spring biased to the down position shown and as well to an up position for removal of the tray. Arm 1111 actuates a microswitch, later shown, to indicate its down or up position. The tray 1101 or 1102 pushes the associated plate 1150 to the rear of the machine when the tray is positioned properly. Arms 1111 and 1112 are independent of each of the pivotally mounted plates 1150. Each plate 1150 has a window aperture 1152 therein. With a tray in position, the aperture 1152 exposes a photosensor 1154 which receives reflected light from a form adjacent the rear of the tray 1111 such that reflected light from that form will be detected and the photosensor thereupon provides an output indicating that the tray is full. When the tray is removed, the plate 1150 swings up and the back surface thereof having a reflective surface thereon is exposed to the photosensor providing a false indication of a full output tray, serving, along with the microswitch output, to indicate that the associated tray 1111 of the output stacker 1100 is not available for receiving forms.

Figure 2:
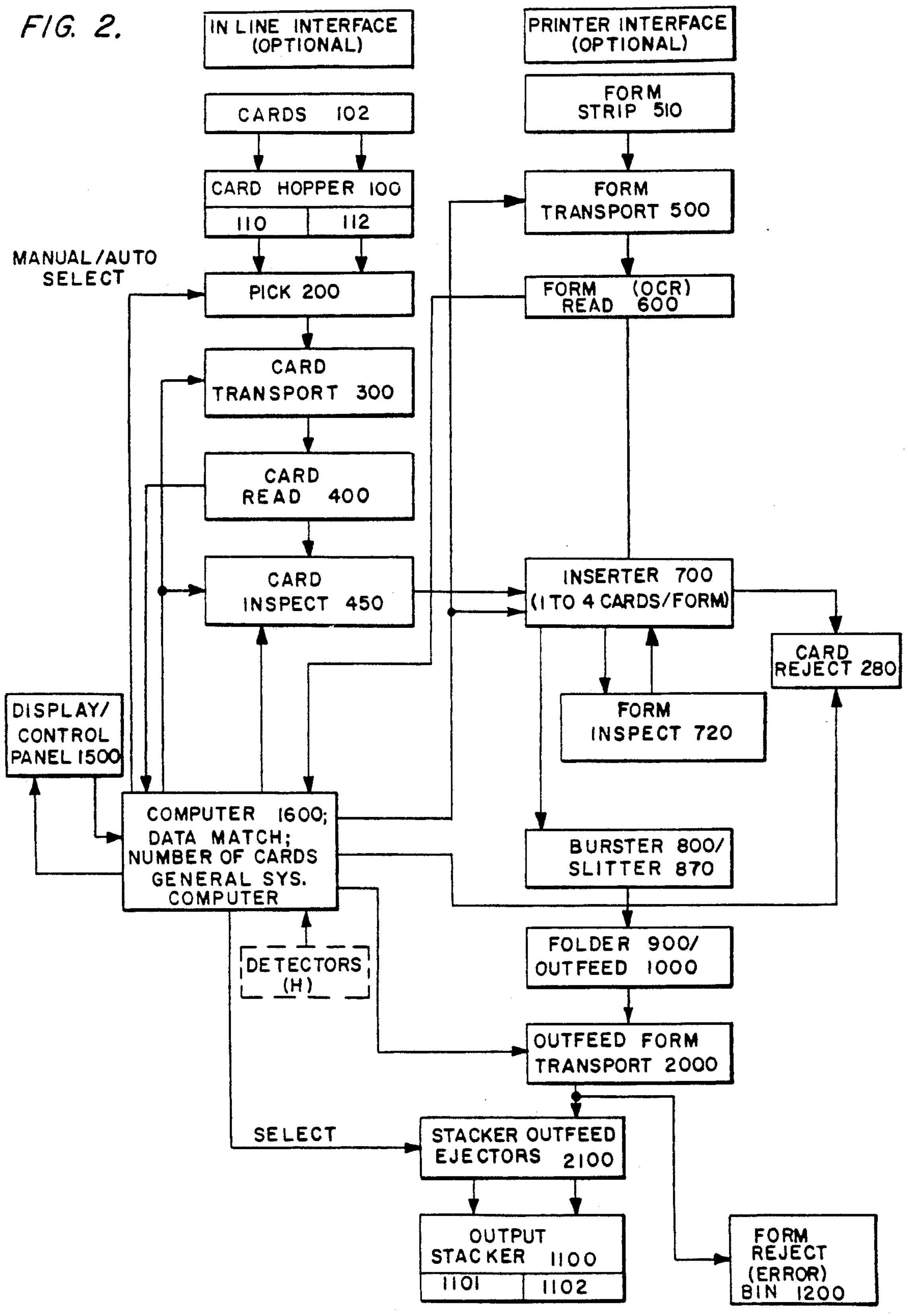
FIG. 2 is a block diagram of the work station of the system of this invention.

The block diagram of FIG. 2 provides an overview of the system operation. A computer 1600 having an associated display/control panel 1500 provides for a general automated system control and receives inputs from various detectors, typically photosensor outputs, for both timing and error checking functions; the significant functions of matching data read from a form and from cards being picked for transport to and insertion into that form is indicated. Cards 102 are supplied in hopper 100 by one or two trays 110, 112 which are selectively employed as the supply by manual-/automatic select of the picking mechanism 200, the latter transporting the selectively picked cards, taken in sequence from the selected tray, to a card transport 300. The latter transports the cards to the card reader 400, the output of which is supplied to the computer 1600. Various error conditions produce an automatic operation or manual controls may be employed for terminating card transport with a card positioned at the card inspection station 450 for operator inspection.

Forms 502 supplied as a fan-fold strip 510 are transported by form transport mechanism 500 to a form (OCR) reader station 600 which supplies the account number and number of cards required for that form, as read therefrom, to the computer 1600. If the data matches, the form 502 is advanced to the insert station 700 and the cards, as transported and read, if satisfying the required data (account number) and number thereof defined by the form, advance to the insert station 700 for insertion into the associated form. If the match is not satisfied, the card is stopped at inspection station 450 and if in error following operator inspection is transported to the card reject hopper 280. That transport function actually occurs through the inserter structure of station 700 thus functionally bypassing the insertion operation of the insert mechanism of station 700. The error match condition as well results in the form being advanced to a form inspection station 720. The inspection station 720 is physically beyond insert station 700 in the path of travel of the forms; hence, if the form is usable for the given card sequence (i.e., the error is not that of incorrect card account numbers or required number of cards for the given form) the form is retracted to the insert station for receiving the cards. Errors in the form or failure of data matching between the available cards for the given form result in the form being transported to the form reject (error) bin 1200 after passing through the folder 900/outfeed 1000 and outfeed form transport 2000. Proper forms, on the other hand, are transported by the outfeed form transport 2000 to the stacker feed ejectors 2100 and from thence into the selected one of the trays 1101 and 1102 of the output stacker 1100. Forms which are in error or for which the required number of cards is not present, or the account of the card is in error, result in the form proceeding by the outfeed form transport 2000 to the form reject (error) bin 1200.

If desired, a printer interface as seen in FIG. 2 may directly print the mailing forms and provide thereby a continuous in-line operation of supply of forms to the system. Similarly, an in-line interface may be provided whereby automated card embossing/encoding equipment may directly emboss and encode cards for direct supply to the inserter of the invention.

Figure 4:
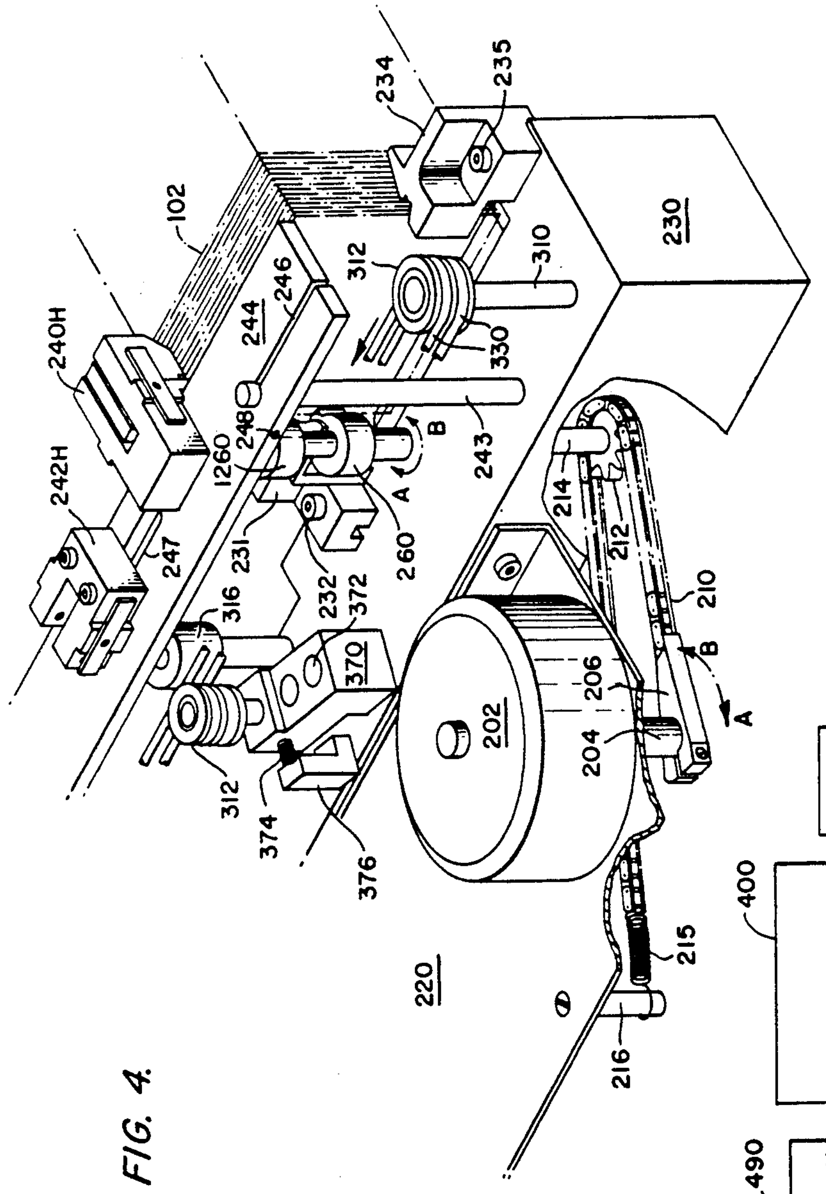
FIG. 4 is a perspective view of the pick mechanism for one card tray.

FIG. 4 is a perspective view of the pick mechanism and FIGS. 5A to 5D, inclusive, show successive stages of its operation. The mechanism of the card pick station 200 serves to pick an individual card from a selected one of the two trays 110 and 112; since the pick mechanisms are substantially the same for the two, only a single one thereof is shown. A rotary solenoid 202 is mounted on a bracket 220 secured to a structural support 230 of the main housing 10 (FIG. 1). Rotary solenoid 202 has a rotatable output shaft 204 to which lever arm 206 is rigidly secured. Lever arm 206 is pivotally connected to link chain 210 engaging gear 212 secured to shaft 214 suitably mounted in support 230, and the chain 210 is secured by spring 215 to stud 216 secured in bracket 220. Energization of solenoid 202 rotates shaft 204 in the direction of arrow A against the bias of spring 215 and upon de-energization thereof, spring 215 withdraws the chain 210 and in turn causes rotation of shaft 214 and solenoid shaft 204 in the direction of arrow B to the normal position indicated. There results a partial rotation of the shaft 214 in the rotary direction A upon energization of solenoid 202 and B upon its de-energization.

Credit card guides 231 and 234 are received within the recesses 114 and 115, respectively, of the input tray 110 (FIG. 3). The guides 231 and 234 are adjustably mounted on support 230 and hence are movable to accommodate different widths of cards, thereupon secured in position by screws 232 and 235. Suitable designed recesses are provided in the lower surfaces of the guides (not shown) to accommodate the adjustment while maintaining alignment and secure position once adjusted.

Guide 231 includes an inwardly inclined surface 236 (FIG. 5A) for urging the left-most vertical edges of the cards to the aligned position indicated with the foremost card resting on the inclined surface 237 of tip 238.

Bracket 234 includes a recess 240 having a convex surface 241 joining inclined surfaces 242 and 244.

The operation of the pick mechanism will be clear from the successive stages thereof shown in FIGS. 5A through 5D. The pick cam 260 includes a pick edge 262 defined by the spiral circumferential configuration of the cam 260, which edge 262 is slightly less than the thickness of a single card from guide 231. The cam 262 projects, along with guide 231, through the opening 114 in the left edge of the card tray 110. Cam 260 is urged to rest position seen in FIG. 5A by spring 215 (FIG. 4). Upon energization of solenoid 202, cam 260 is rotated in the direction A, causing the pick edge 262 to engage the left edge of card 102-1 and urge same to the right, the right edge of the card moving along inclined surface 242 and engaging the corner defined by convex surface 241 of the guide 234. Surface 241 serves as an abutment, such that continued rotation of cam 260 flexes card 102-1 into an increasingly convex configuration. The card 102-1 acts as an over-center spring function to snap free of the cam 262 when the latter has rotated approximately to the position shown in FIG. 5C. At that time, the solenoid 202 is de-energized and the spring 215 rotates the cam 260 in the direction of arrow B back to the rest position. The picked card 102-1 thereby is deposited on double transport belts 330 of the card transport mechanism, to be described. Roller 1260 is freely rotatable on shaft 214 to keep the picked card against the double belts.

As already mentioned, each station is provided with detectors such as photosensors H, shown in FIG. 5 at 240H and 242H. Sensors 240H and 242H are mounted on plate 244 adjustably supported on the main support by means of slot 246 engageable with a reduced portion on support pin 243 and locked into position by means of screw 248. This adjustment permits plate 244 and thus sensors 240H to be moved traversely of the input trays and cards, for alignment purposes. Sensors 240H senses the presence of cards in the associated input tray. A slot 247 provides clearance for a photosensor flag (not shown) which is engaged by a successfully picked card, as it is moved by transport belts 330 out of the pick area, to block sensor 242 and provide an output to the computer indicative thereof.

Figure 6:
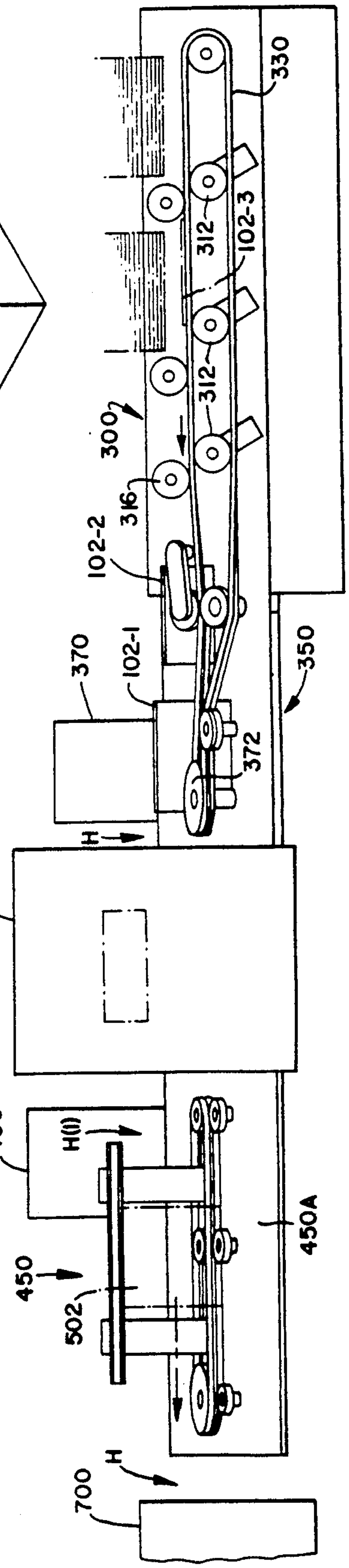
FIG. 6 is a partial schematic, partial flow diagram of the card transport and rotate mechanism.

Referring concurrently to FIGS. 4, 5 and 6, the card transport 300 includes belts 330 carried by support pulleys 312 mounted on axles 310. The pulleys 312 may be merely idler or positively driven; preferably, belts 330 are driven by pulley 372 from motor 370. In the diagramatic view of FIG. 6, other pinch rollers, or pulleys 316 are spaced apart at less than the longitudinal card length, and engage the cards against the transport belt 330. Also at least one support pulley 312 is pivotally mounted and spring biased to provide tensioning of the belts 330. FIG. 4 shows a pivotal support block 370 which may pivot around pin 372, and is spring biased by the spring 374 against the fixed stop 376.

The card transport mechanism 300, including the belts 330 previously noted, transports the cards from the pick mechanism to the read station 400 and the observation station 450 and ultimately to the insert station 700.

Card transport 300 includes a portion 350 for rotating each card in turn from the substantially vertical position as transported from the pick mechanism to a rearwardly inclined position, at about 75° from the vertical before proceeding into the embossed character reader 400. Thus, the axles of drive pulleys 372, at the card output end of portion 350 of the transport mechanism, are inclined rearwardly at substantially a 75° angle from the vertical, and the intermediate pulleys are progressively inclined between the vertical and 75° to properly support the belts 330 thereon and provide a smooth transition, or rotation, of the cards from the vertical to the 75° rearwardly inclined, substantially horizontal, orientation. In FIG. 6, card 102-1 is fully rotated to, rearwardly inclined position, ready to be fed into the embossed character reader 400. A second card 102-2 is at the mid-portion of the path, while third card 102-3 has just left the pick mechanism area. In an actual device, up to five (5) cards may be accommodated in the transport mechanism.

Preferably the cards are transported past the embossed character reader 400 by means of a separate drive motor and rollers which can adequately control speed, especially for Mag stripe and OCR card readers. Photosensors H are positioned to monitor card transport progress, as indicated schematically in FIG. 6. The photosensor outputs are fed to the computer. Also while only a single pick mechanism is shown in FIG. 4, the actual machine has two such mechanisms for association with the two input trays as best seen in the perspective view of FIG. 1 and schematically shown in FIG. 6. The embossed character reader 400 may be of conventional type and has its own internal card engagement and driving structure. A further transport mechanism, which may be substantially of the type shown in FIG. 6, is employed to receive the card emerging from the reader 400 for transport to the insert station 700. Motor 490 drives the segment 450*a* of the card transport mechanism which passes through the inspection area 450 between the ECR reader 400 and the insert station 700. As a card leaves the ECR the data comparison is done and if a error condition exists, card transport 300 is stopped, preventing the next card from entering the ECR. Transport 450*a* moves the card away from the ECR 400 past photocell H(1) to the inspection station area 450 where the card OCR account number is visible to the operator.

The apparatus employed in the embossed character reader 400 may be of the type commercially available for reading the OCR characters embossed on the card. Additionally, or alternatively, OCR encoded and/or magnetically encoded data as is provided on some cards may be read for the purpose of determining the account number assigned to the card.

Photocells or other detectors are provided in the card transport mechanism at the output from the pick station and both intermediately of and at the output of the transport path. The typical operation of such photocells is to switch from a non-block to a block state when a card passes and a predetermined time thereafter switch back to an unblock state to indicate that the card both has been successfully picked and transported away from the pick station, with subsequent photocells detecting the successful continued transport of the card and successful entry into and exit from the embossed character reader station 400. Outputs from the sensors are supplied to the computer which monitors the state of those outputs and determines whether the involved operations have been performed successfully, based on the timing significance of the photosensor outputs.

As noted, only a single pick mechanism is shown in Fig. 4 whereas in reality a pair of pick mechanisms is provided so as to accommodate the two input trays of cards (FIG. 1).

Manual override of the card pick and transport mechanisms is afforded as later detailed; when operator inspection of a card at the inspection station 450 is necessary, the manual override necessarily terminates further picking and card transport operations so as to prevent a jam from occurring.

Figure 8:
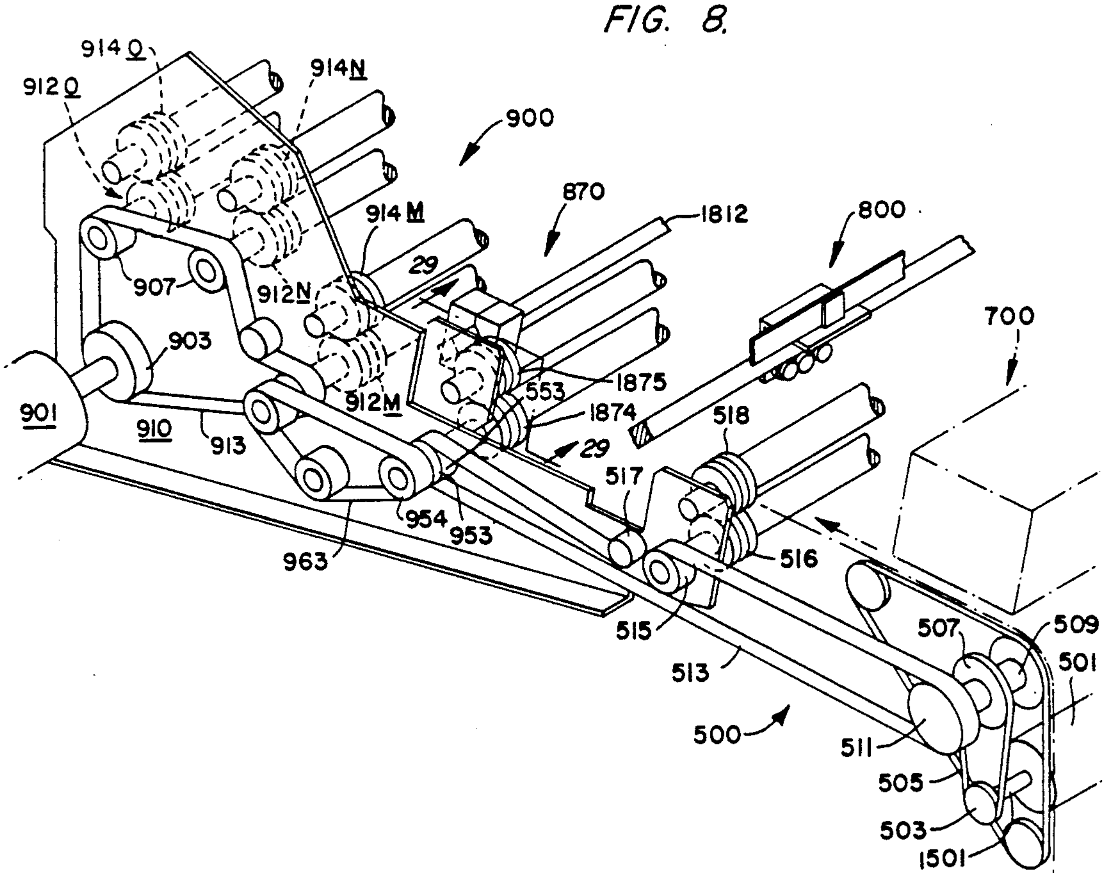
FIG. 8 is a perspective view of the overall drive arrangement for the mailer form transport mechanism, the form burster and slitter rollers, and the folder rollers.

FIG. 8 shows the basic mechanical interrelationship of the mailing form transport feed mechanism 500, the insert module 700, the burster/slitter 800, and the form folder 900. The highly integrated and compact relationship of parts herein is essential to the commercial objective of acceptable depth of the equipment in consideration of its transportability, while accommodating forms of differing lengths and yet achieving the general objectives of the invention. Although more detailed discussion of FIG. 8 follows as to its various portions in relation to the respective stations, or modules which are illustrated therein, certain/salient features are noted at the outset.

Motor 501 is the drive motor for the transport 500 and serves to advance the fan-fold strip 510 of the serially connected forms 502 past the read station 600 and into the insert station 700. The motor 501 carries a timing disc 1510 (FIG. 12) which with associated photosensor structure 1510H establishes a basic timing cycle for the system. Disc 1560 driven by a suitable gear reduction arrangement establishes a second basic timing function related to the time for transporting one length of the type form currently in use. For example, a three part (two fold) form requires six basic machine cycles and hence a six to one gear reduction arrangement is used to drive disc 1560 so that upon six revolutions of motor 501, a second output pulse will be produced by the structure associated with disc 1560. The time between the two outputs from disc 1560 thus will correspond to the time for advancing the strip 510 by one form length. More detailed discussion of the timing functions follows.

Output drive shaft 1501 of motor 501 drives pulley 503. A belt 505 connects the drive pulley 503 to a driven pulley 507 which in turn drives shaft 509 for the form transport mechanism. Another pulley 511 is affixed to shaft 509 for driving a belt 513 which in turn drives pulley 515 connected to the drive rollers 516, and idler rollers 518 for moving the mailer forms to the burster station 800. Belt 513 also provides a drive input to pulley 553 of a one way clutch structure 953.

The one way clutch 953 can be driven in a counterclockwise direction as viewed in FIG. 8 from the left by driving either of pulley 553 associated with the form transport mechanism 500 or the pulley 954 associated with the mechanism of the folder station 900, to be discussed later. As will become more apparent, the form transport system 500 controls the progress of the form past the insert station 700 as well as the burster station 800 and must serve to advance the form into the folder station 900. Due to asynchronous operation of the system and in light of need for compacting the relationship of the various operating modules, a form exiting from the insert station will partially enter the folder mechanism prior to being burst from the new form entering the inserter station; nevertheless, after the burst operation, the drive mechanism for the form remaining in the insert station 700—namely the paper transport feed mechanism 500—must remain motionless while permitting the burst form to proceed through the folder mechanism of station 900. Accordingly, separate driving of pulley 954 by motor 901 of the folder mechanism through the one way clutch 953 permits the form to be advanced through the folder station while the transport mechanism 500 is stationary, maintaining a form at the insert station 700.

Preferably, the diameters of the pulley 515 for the rollers 516 and 518 is selected so as to maintain a taut condition between the form which presently has advanced into the folder station 900 and that still within the insert station 700, so as to facilitate operation of the burster 820 of the burster station 800.

Figure 9:
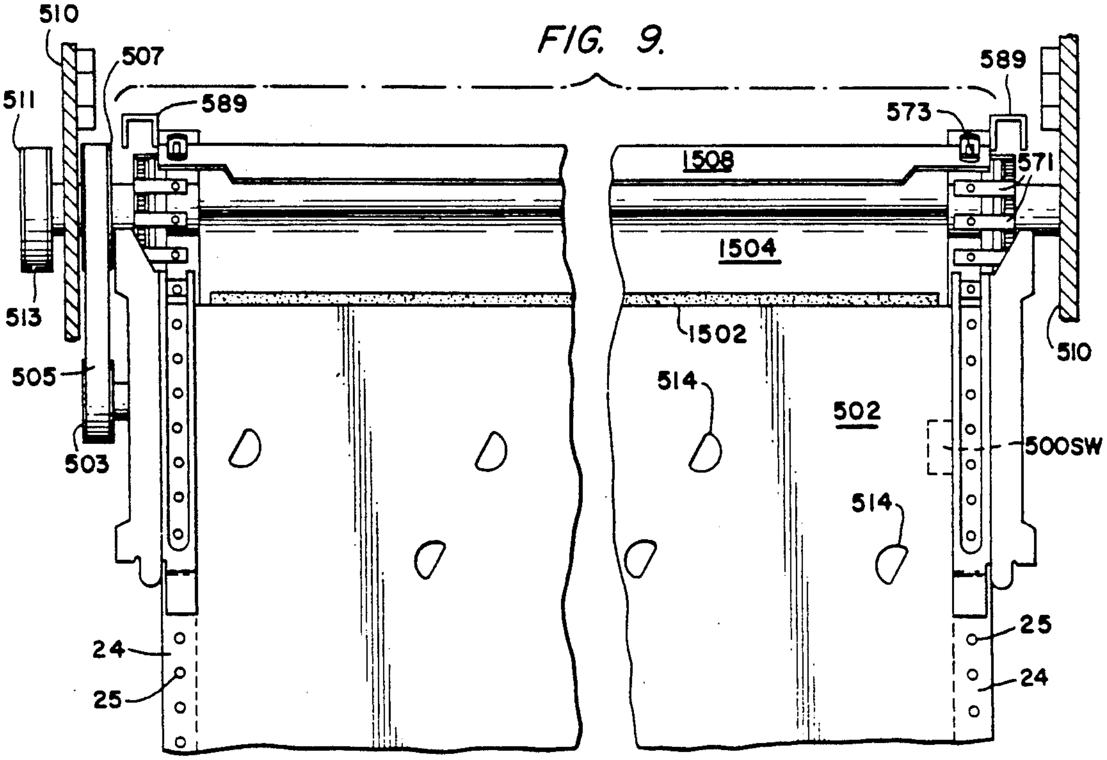
FIG. 9 is a front elevational view of the mailer form transport mechanism.
Figure 10:
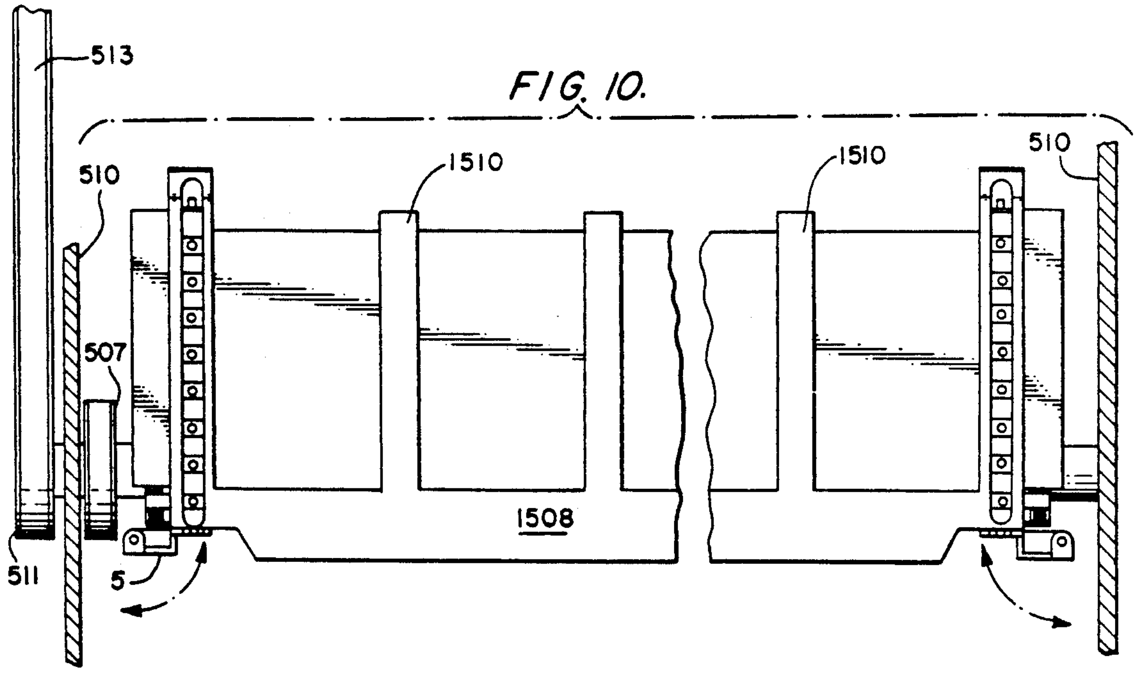
FIG. 10 is a top plan view of the mailer form transport mechanism.
Figure 11:
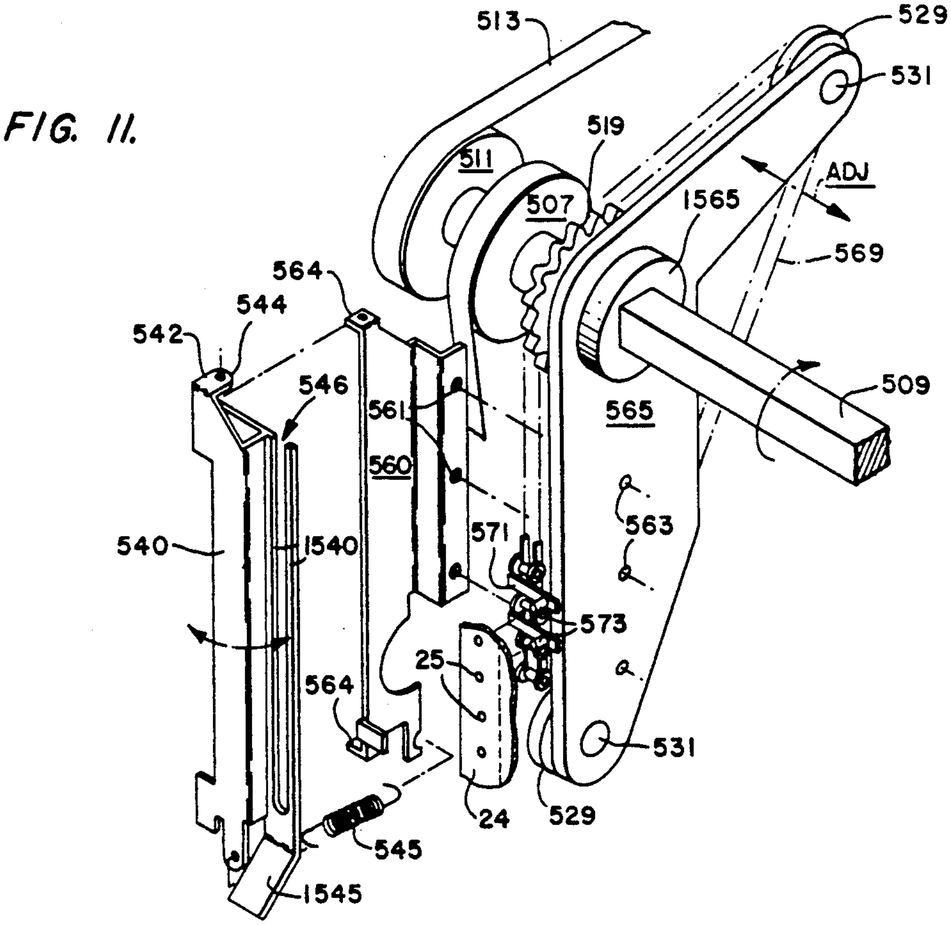
FIG. 11 is a perspective view of the left side portion of the mailer form transfer mechanism.

FIGS. 9, 10 and 11 illustrate basic details of the form transport mechanism. Support panels 510 of the basic housing 10 support the various components of the form transport mechanism 500. Inwardly of both of the panels 510 are adjustable (ADJ) L-shaped subpanels 565 having a rotatable bearing 1565 for rotatably supporting square shaft 509 and sprocket 519. This main shaft 509 drives at each end just outside the subpanels 565, sprockets 519 which in turn drive tractor chains 569. Idler pulleys 529, at the respective ends of the L-shaped subpanel 565, support each chain 569 in a triangular shaped, free chain action manner. The idler pulleys 529 are rotatably mounted by shafts 531 to the plate 565. The chains 569 have finger members 571 with outwardly extending tractor pins 573. These pins 573 cooperate with the tractor holes 25 of removable edge strips 24 of the mailer forms 502.

FIG. 11 illustrates the openable retention structure of the transport mechanism to permit attachment of a new form of the fan-fold strip by the operator. A Z-shaped member 560 is attached to subpanel 565 by securing means through the respective, aligned holes 561, 563. A further Z-shaped member 540 is pivotally mounted at its extensions 544 to corresponding extensions 564 of member 560, to permit pivoting the member 540 open and thereby expose the underlying tractor pins 573. Spring 545 normally maintains member 540 in a closed position with the tractor edge strip of a form engaged on the chain, tractors pins 573 projecting through the holes 25 and the elongated slot 1540, assuring firm retention of the drive strip 24 at its apertures 25 on the tractor pins 573. The angled extension 1545 facilitates the operator's opening the element 540.

In FIG. 9, the alignment guideline 1502 is seen at which the operator places the leading, or top edge of a form 502 when loading a new supply of the fan-fold strip 510 of forms 502 into the transport station 500. Proper alignment is critical to initialization and actual operation of the system.

FIG. 9 also shows the chain guard panels 589 which are appropriately used at all exposed points of the chain with which the operator might inadvertently come in contact. Guide baffles 1508 with guide fingers 1510 also are provided over the top of this form transport mechanism to positively prevent the double wide form from coming up in the middle portion thereof between the chain tractor drive at the respective ends.

Figure 12:
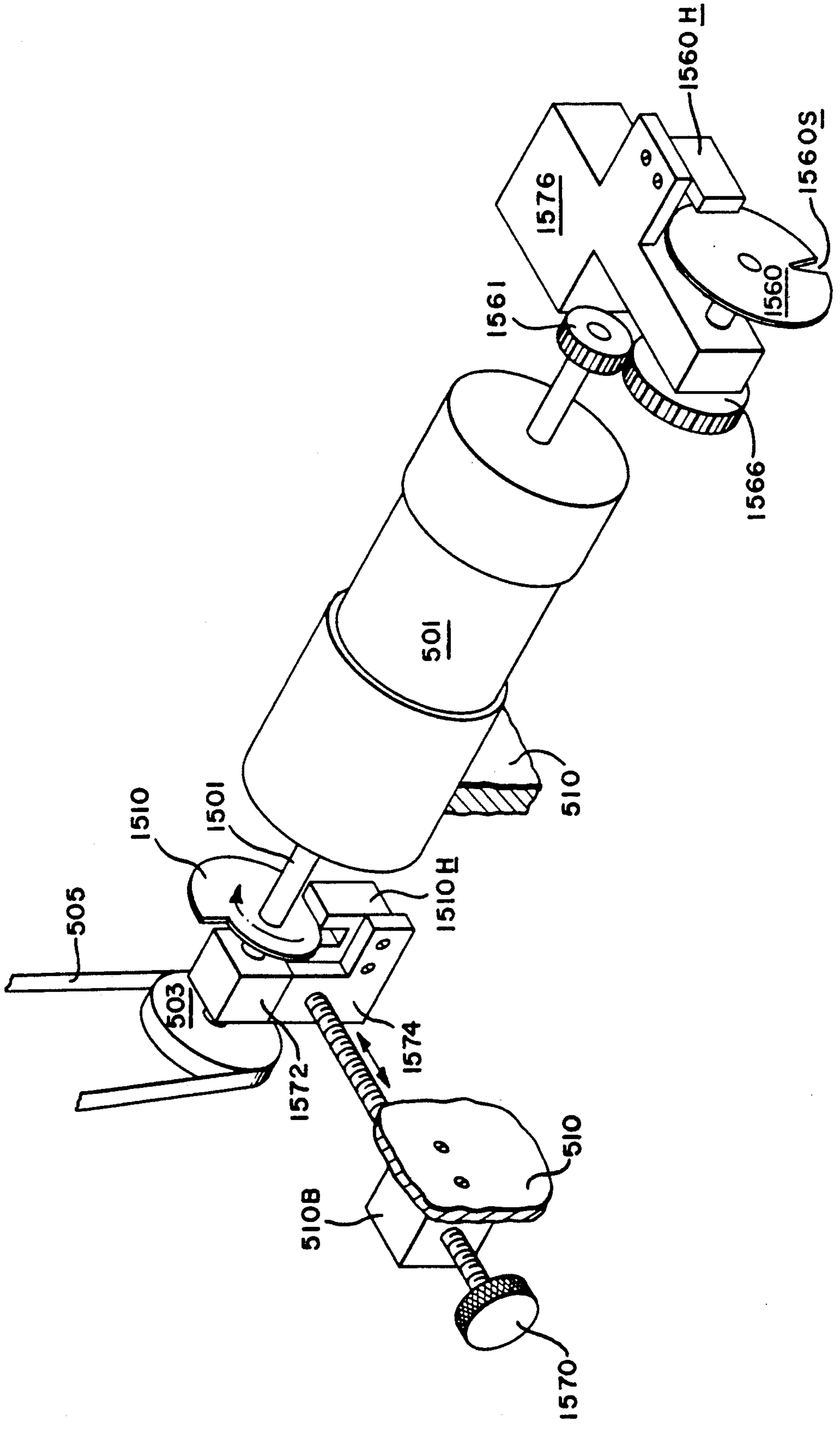
FIG. 12 is a perspective view of the mailer form transport motor together with the associated timing and control discs.

FIG. 12 shows the transport motor drive 501 together with the two photocell discs 1510 and 1560, as previously noted. The disc 1510 has a reduced portion or slot therein which exposes the photocell to the activating light, indicated as 1510H, once for each revolution of the motor, to form a basic system cycle timing output. The second timing disc 1560 also is provided with a slot or reduced portion and is geared down by gears 1561 and 1566 to a ratio of six to one from the motor 501. The timing disc 1560 provides a unique form indicating signal such that when its slot 1560S uncovers the light source of its associated photocell sensor 1560H it indicates the circumstance in which the leading edge of the paper form is in its proper aligned position, or initialization position, in the transport mechanism. Hence for each six revolutions of the drive motor 501, anew mailer form has advanced to position its leading edge at the alignment, or initialization position, and the OCR data line on the form is positioned for reading by the OCR reader 600; moreover, the next preceding form will have advanced properly into the insert station and a new form will be automatically aligned. Where forms of different length, e.g., two or one part forms, are employed, the gearing is changed to accommodate the different length of the form.

Motor 501 is secured to the machine structure 510, and blocks 1572 and 1576 are dependent on 501 for their mounting. Support block 510B carrying threaded screw 1570 as well is secured to the basic structure support 510 and is rotatably mounted within block 1574 which carries the photosensor 1510H. Rotating screw 1570 permits movement of block 1574 and hence the photosensor structure 1510H relatively to the timing wheel 1510 and this permits advancing or retarding the electrical timing signal derived with respect to the rotation of the motor 501 and thus to properly phase electrical controls with the actual mechanical operations of the system.

Returning to FIG. 8, the rest of the drive arrangement for the feed rollers will be described. The motor 901 is for the folder portion 900 of the machine, and by means of a pulley 903 affixed to its output shaft drives flexible belt 913. This belt 913 in turn engages with and drives the rollers 907 connected to the respective folder drive rollers 912. Adjustably mounted idler rollers 517 and 917 provide proper driving tension on the belts 513 and 913 respectively.

As before noted, the one way clutch 953, which may itself be conventional, affords a convenient inter-relationship of the driving of the roller 1874. Specifically, motor 901 may drive pulley 954 in conjunction with advancing a form from the burster station 800 into the folder station 900 while the transport mechanism 500 remains stationary during insertion of cards into a form still within the insert station 700. Conversely, the folder mechanism 900 may be stationary while the transport mechanism 500 advances a new form into the insert station 700 and a prior, completed form is advanced beyond the inserter station and into the folder station 900, preparatory to bursting and folding operations. This clutching arrangement is also important to other conditions of the system such as where operator intervention is required such as in inspecting a form or a card prior to completion of insertion but wherein prior, successfully completed forms should be burst and folded and thus removed from the system.

Figure 13:
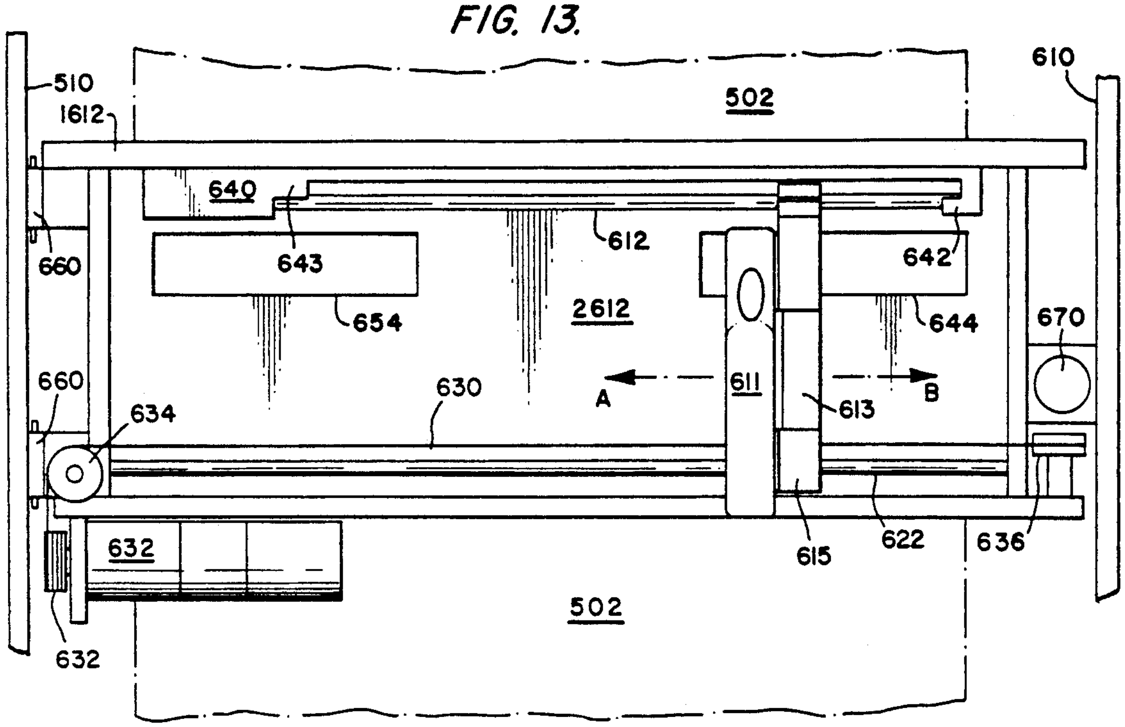
FIG. 13 is a front view of the OCR reader.
Figure 14:
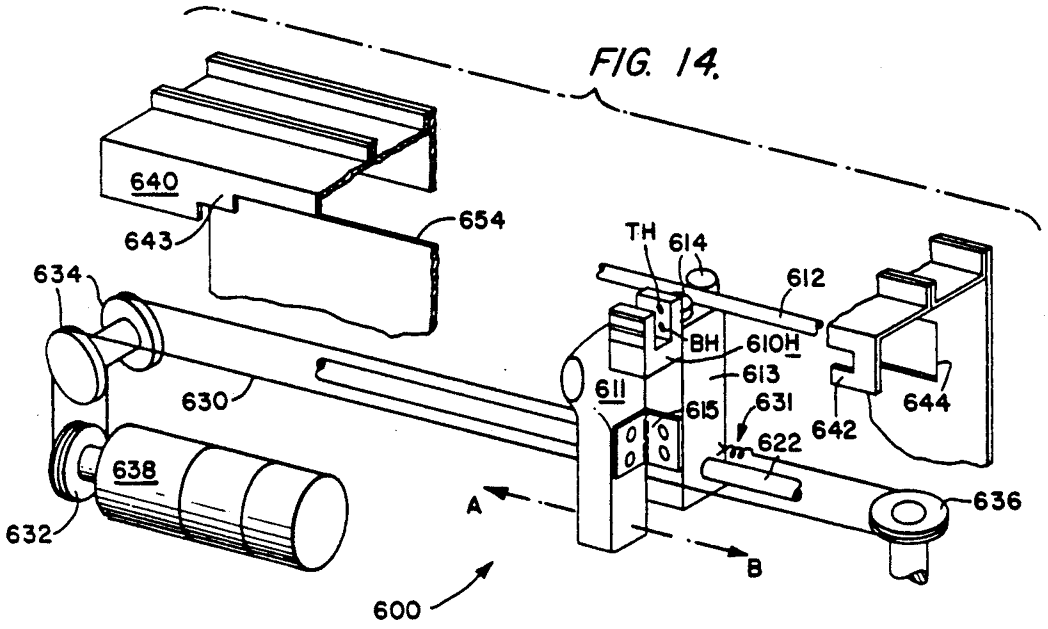
FIG. 14 is a perspective view of the OCR reader.

FIGS. 13 and 14 show the OCR scan head and the arrangement of its drive mechanism. The overall structure is mounted on a frame 1612 by a pivot mount 660 on the left basic support structure 510 while a latch mechanism 670, generally indicated, is connected to basic support panel 610 on the right, to permit opening same and afford access to the form transport mechanism 500 described above. In the closed, operative position, the structure of FIGS. 13 and 14 is positioned directly in front of the form transport mechanism to position the OCR head for reading the form, as seen in the simplified view of FIG. 7.

The OCR head 611 is mounted on a traverse moveable carriage 613 by bracket 615. Carriage 613 is slidably supported by a lower guide rod 622 by means of low friction bearings (not shown) and by upper guide rod 612 and cooperating rollers 614 in a conventional manner.

The carriage 613 moves in a back and forth manner as indicated by the arrows A and B in FIGS. 13 and 14. The motor 638 drives a pulley 632 which receives several turns of a drive line 630 therearound, drive line 630 extending over idler pulleys 634 and 636 and is secured at its free ends to the carriage 613. A resilient spring 631 maintains proper tension. Photosensor unit 610H includes a top photosensor T and a lower photosensor B mounted on carriage 613 to be in alignment with the blocking flags 642 and 643 mounted on the panel 640 at the extremities of travel of carriage 613. Normally, the OCR read head is in its "home" position at the right as viewed from the front of the machine, at which the top photocell TH is exposed and the bottom photocell BH is blocked by the flag 642. Conversely, when the OCR read head is at the extreme left, the top photocell TH is blocked by flag 643 and the bottom photocell BH is exposed. The photocell outputs thus indicate to the system the extreme left and right positions of the OCR read head and the computer appropriately controls the selective energization and direction of rotation of reversible motor 638.

In actual operation, the OCR head reads the OCR data on forms 502 while traveling from the right to the left. The apertures 644 and 654 in the panel 2612 permit an operator visual observation of the OCR data on forms 502 when in the read station. This panel 2612 also functions as a mask to prevent unwanted reflections, data, etc. from interfering with the OCR read function.

Figure 15:
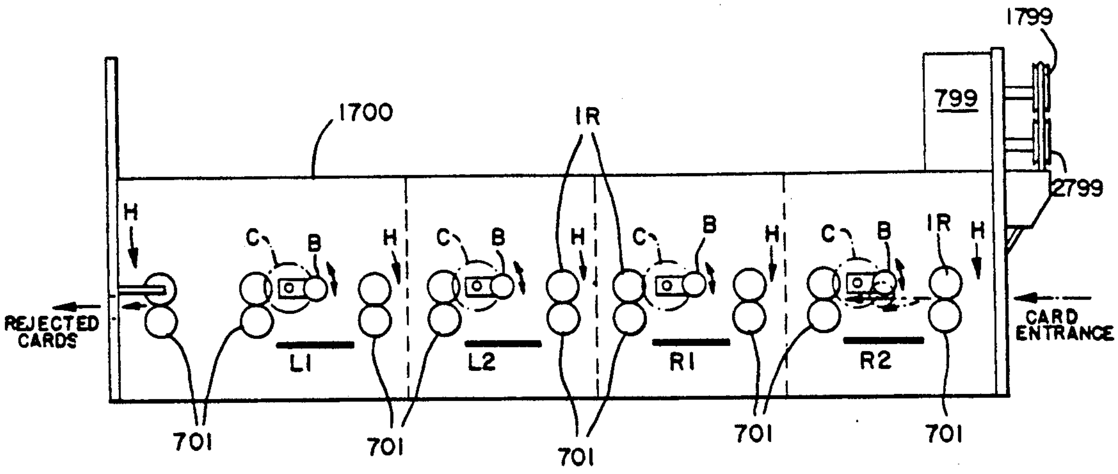
FIG. 15 is a diagrammatic front elevational view of the inserter module.
Figure 16:
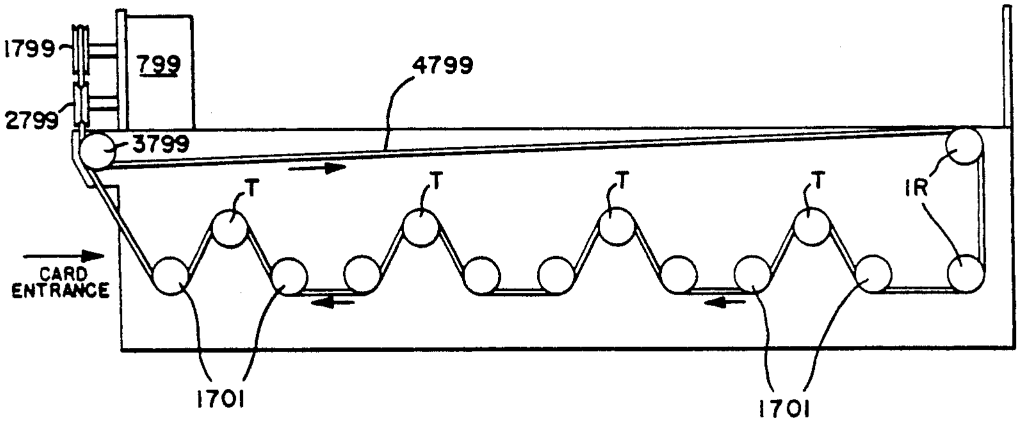
FIG. 16 is a diagrammatic, rear elevational view of the inserter module.

FIGS. 15 to 25 show the apparatus of the insert station 700. FIGS. 15 and 16 (cross section) afford a schematic view of the card transport elements and the drive therefor, and FIGS. 17A and 17B are schematic views of the card insertion process, to which reference is first made.

The insert module 1700 of the insert station 700 includes a number of bins corresponding to the number of card insertion or attachment positions on the forms being processed; in the preferred embodiment, the forms are of double width and each form includes two card attachment positions in side-by-side forms and thus four bins in the insert module 1700. In FIG. 15, cards enter from the right and are engaged by a succession of pinch roller drive assemblies including driven rollers 701 and associated idler rollers IR, generally positioned within each bin just adjacent the input and output, respectively of the bin. The rear view of FIG. 16 illustrates a drive motor 799 with associated pulleys and driving belt 4799 engaging a plurality of drive pulleys 1701 rotatably mounted on axles secured to the drive rollers 701 of FIG. 15. Appropriate idler rollers IR serve for proper direction of the belt and tension rollers T are typically adjustably mounted to maintain proper tension in the belt and sufficient engagement of the belt 4799 with the drive rollers 1701 to assure positive drive conditions.

Rotary solenoids C, shown by hidden lines in FIG. 15, carry on their respective shafts corresponding deflection idler rollers B which are selectively movable from the normal, "up" position indicated, out of the path of the card passing through the bin, to a down position for selectively deflecting a card engaged by the input rollers of that bin into the bin. Photocells indicated at H are located at the entrance to each bin to detect whether the card has passed into the bin, upon the photocell being blocked and unblocked, in succession, during the passage of the card past the photocell. This output permits the computer to monitor the passage of the card through the insert module and as well to determine, by the absence of the blocked/unblocked outputs of a next successive photocell H, that the card was deposited in the respectively next preceding bin.

In FIG. 15, the four bins are designated by L1 and L2 to correspond to the two card attachment positions of the left form of a double width form and by R1 and R2 to indicate the right two card attachment positions of the right form of a double width form. Up to two cards may be attached in each position and thus up to four cards per form.

If, in operation, two successive credit cards have provided a proper match with the left-hand form as to their respectively encoded account numbers and assuming the form designates a requirements of two cards, these two cards will progress through the insert station in the following manner. By appropriate timing controls, the rotary solenoid for bin L1 will be actuated to lower its deflection roller B while the solenoids for bins L2, R1 and R2 remain de-activated; thereby, the first card passes through the first three bins and then is deflected into bin L1. In appropriate timed sequence, the solenoid for bin L2 is selectively activated, lowering its roller for deflecting the second card into bin L2. Although any desired sequence of deposit of cards into bins can be established by appropriate programming, a prepared sequence is as follows. The left-hand form (bins L1, L2) is filled first and the right hand form (bins R1, R2), second. For each form, e.g., the left form, if only one card is required, it is deposited in the right, or first bin L2; if two cards are required, they are deposited in sequence in bins L1 and L2—a third card in bin L1 and a fourth card, in bin L2. Thus, for example, if only a single card is required for the second, right form, the deflection roller B for bin R2 will remain in its normal, raised position and deflection roller B for bin R1 will be lowered to deflect that single card into bin R1.

FIG. 15 also indicates schematically the output for rejected cards; in this instance, all deflection rollers B remain in the raised position causing the entering card to progress entirely through the insert module 1700 and exit to the left as seen in FIG. 15, a photocell H as well detecting the passage of the rejected card out of the insert module and confirming this circumstance to the computer.

Figure 17A:
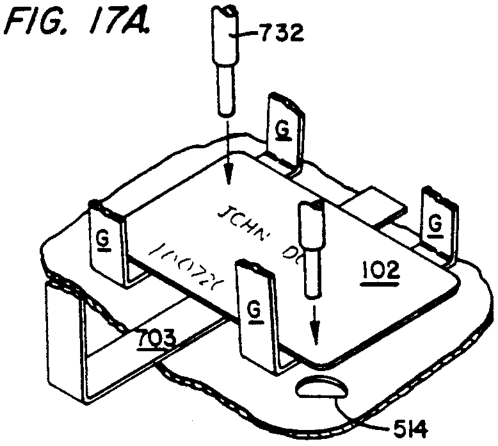
FIGS. 17A and 17B are perspective views of a card supporting finger and deflector pins of the inserter module.
Figure 17B:
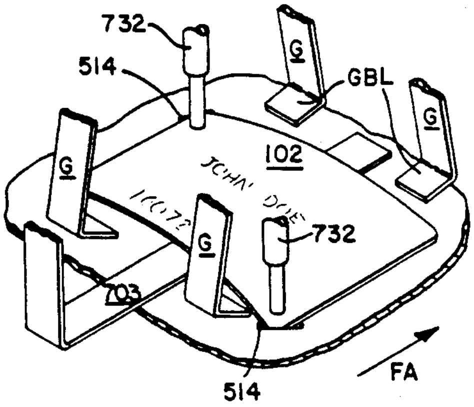

FIG. 17A and 17B illustrate two basic conditions of the insert operation of the insert module 1700. FIG. 17A corresponds to the card upon being received in the bin. A pair of opposed arms G are disposed along the longitudinal edges of the card 102 adjacent the leading and trailing edges thereof (i.e, as respects the card movement into the bin). The inward extensions GBL of the opposed pairs of arms G define a lower support for the card 102 within the bin and in essence serve to define the dimensions and structural support of the bin itself. Additional end structure also is provided as will be seen in later detailed views. A support finger 703 extends transversely of the longitudinal dimension of the card, substantially along the middle of the card length and it is in a position substantially contiguous the lower surface of the card 102. Deflection pins 732 are located to correspond substantially to the diagonally opposite corners of the card which are to be received in apertures 514 of the form 502 in that card receiving portion thereof underlying the associated bin.

The insert procedure involves pivoting the support arms G to the outward position as indicated in FIG. 17*b* and simultaneously lowering the deflection pins 732 to engage and depress the corresponding diagonally opposite corners of the card 102 while retaining support finger 703 essentially in its original, or normal, up position, displaced from form 502. With the card thus urged into a deflected or distorted configuration, it follows that the diagonal distance between the diagonally opposite corners is decreased, inserting the deflected corners of the card 102 into the respective apertures 514. Deflection pins 732 are at the bottom of their stroke and stationary, then finger 703 is lowered, substantially into contact with the surface of form 502, permitting the card to resume its normal, planar configuration whereupon the diagonal corners inserted into the apertures 514 extend outwardly and securely engage the card within the form 502. Pins 732 are then retracted (moved up). The form then is advanced from the insert station 700 into the burster station 800, that direction of form advance being shown by arrow FA in FIG. 17*b*. The form 502 and attached card 102 thus slide away from finger 703 and when clear of the finger 703, timing controls provide for finger 703 to move upwardly to the original position shown in FIG. 17A. Preferably, by proper design, pins 732 need only move between the upper position and the card deflection positions since, upon lowering of finger 703, when the card resumes its planar configuration locked into the form 502, its upper surface then is below the bottoms of the deflection pins 732. Alternatively, pins 732 would be required to be raised vertically prior to transport of the form and attached card out of the insert module.

With this understanding of the general insert station structure and operation, reference is now had to FIGS. 18 through 25 which show structural details thereof. FIGS. 18, 19, 20 and 21 are perspective views, substantially broken away, which illustrate the basic structural arrangement of parts whereas FIGS. 22 through 25 illustrate successive stages in the card insertion operation. The structure of the module for the insert station 700 is generally designated by numeral 1700.

Figure 18:
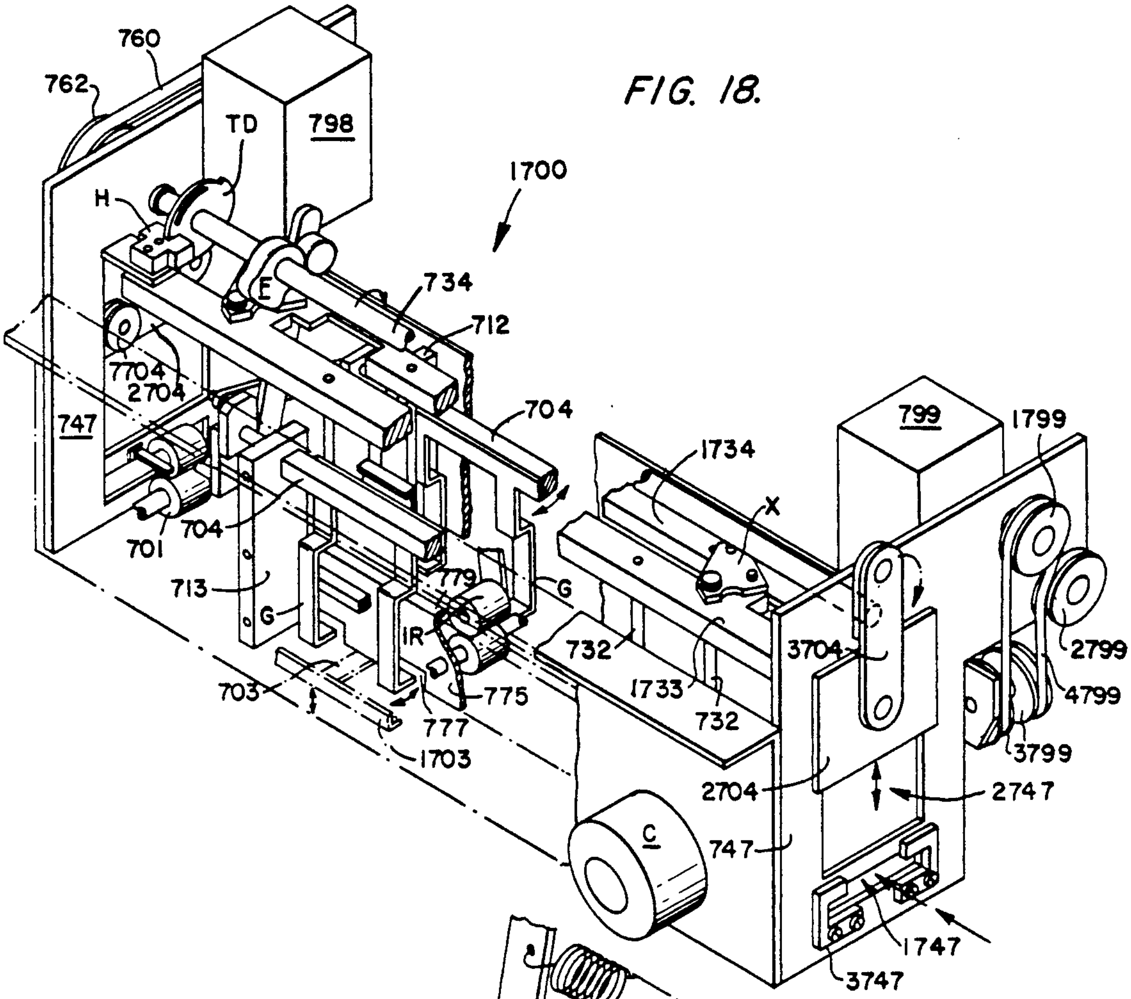
FIG. 18 is a perspective view, partly broken-away, of the basic components of the insert module.

In FIG. 18, motor 799 drives pulley 1799 and through it the drive belt 4799 which passes over tension pulley 2799 and direction changing pulleys 3799 before proceeding to the various drive pulleys 1701 and associated tension pulleys T and idler pulleys IR previously seen in FIG. 16. Each end of the insert head has a main support plate 747 with two apertures therein. The lower apertures 1747 are in alignment with the card feed-through channel. The upper central apertures 2747 are for the guide and reciprocating plates 2704. These plates 2704 are provided with suitable guide rollers 7704 for engagement with the inner vertical edges of the apertures. It should be noted in FIG. 18 that the card guide channel apertures 1747 may be provided with adjustable guide elements 3747 for changing the relative width of the card channels whenever a different size card is to be used with the machine.

Figure 19:
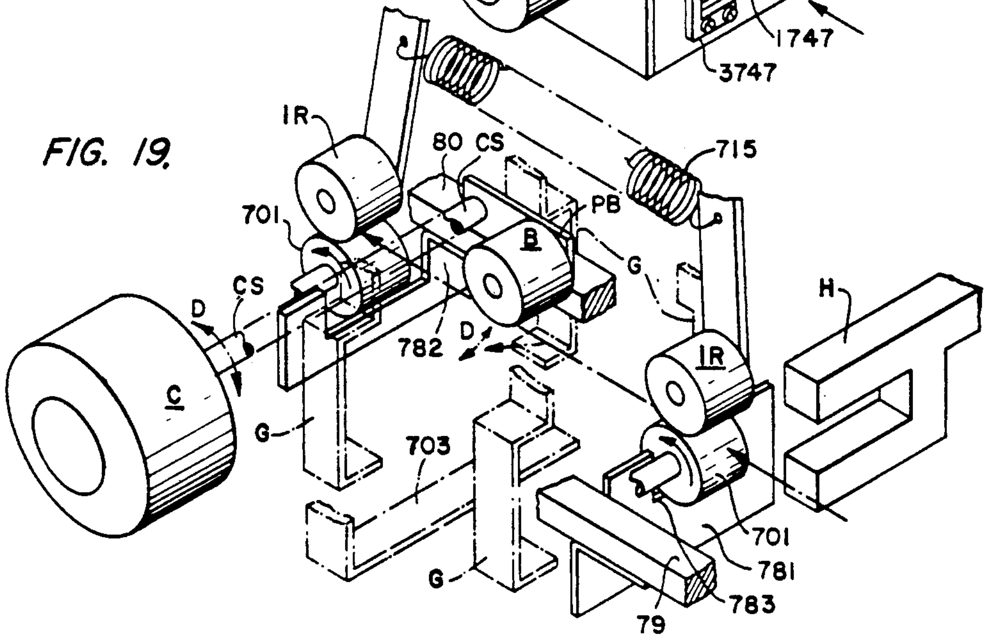
FIG. 19 is a perspective view of the insert module, partly broken-away to illustrate card deflecting elements including rotary solenoids and deflecting rollers thereof.
Figure 22:
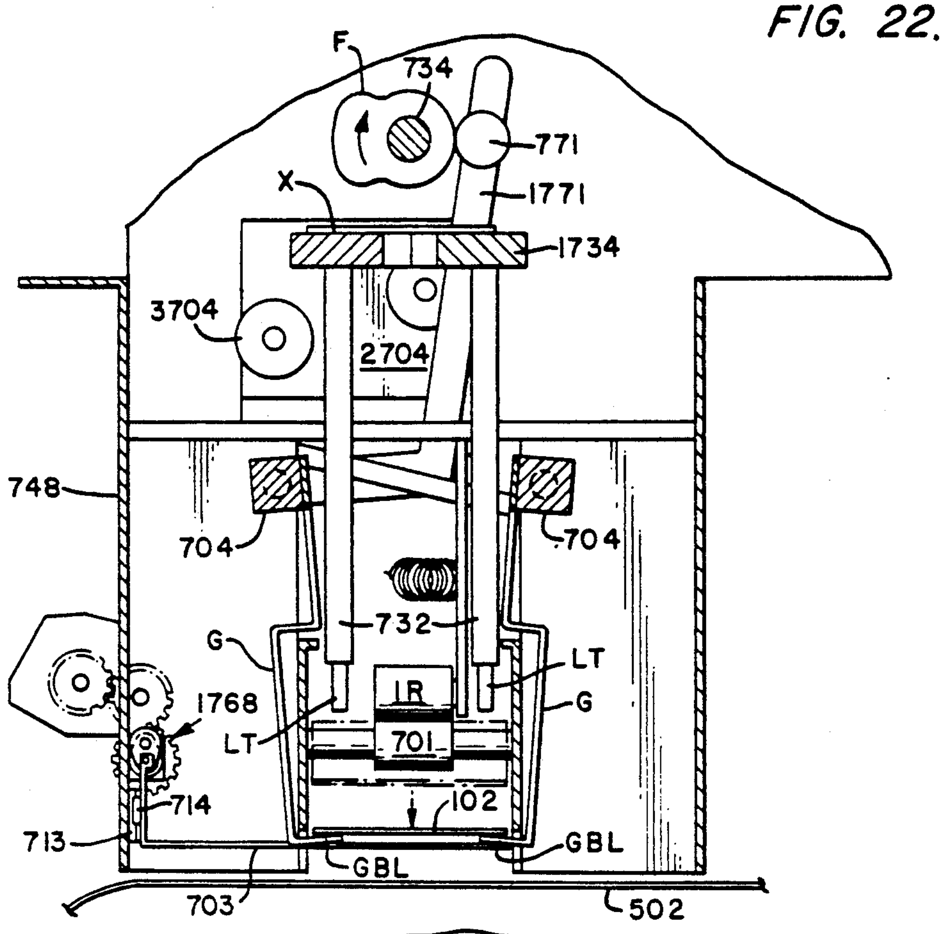
FIGS. 22, 23, 24 and 25 are cross-sectional elevational views taken across the central portion of the structure of FIG. 18, showing successive stages of operation of the card insert apparatus for a single one of the bins.

The card feed through rollers 701 may be clearly seen in the perspective of FIG. 19. Also clearly shown in this view is one of the photosensor devices H as associated with each of the card bins L1, L2, R1, and R2. Each bin also is provided with bin defining plates 781 and 782 with respective recess channels 783 and 784 cut from the upper edge thereof. Support bars 79 and 80 extend the entire width of the insert station head and support the plurality of bin separating plates 781 and 782 alternately therefrom. That is, the leading edges or sides of all of the bins are defined by plates 781 supported from the bar 79, while the trailing edges or sides of all the bins are defined by the plurality of bin defining plates 782 which extend toward the front of the machine from the supporting bar 80 traversely of the rear of the inserter head. The front and back sides of each bin are enclosed by front and back channel plates 774 and 775, best seen in the cross sectional view of FIG. 22 and the perspective of FIG. 18. The front card guide plate 775 is suitably provided with an inwardly extending upper lip 779 to prevent cards from jumping out of the card channel while suitable apertures 777 are spaced along the bottom edge of the card channels, with at least two of these recesses for each bin. The rear card channel guide 774 also is provided with an inwardly extending upper lip 778 and appropriately spaced recesses 776, as best seen in FIG. 22. Card supporting arms G, at least two per bin on both sides, thereof, are secured to pivotally mounted support bars 704. The lower tips GBL of these arms G will extend through appropriate recesses 777 of the front card channel guide and recesses 776 of the rear channel guide when the support rods 704 are moved in the direction to close the arms G. As may be seen in FIG. 17A, four of these fingers G appropriately support a credit card when in a given bin and the arms G are positioned inwardly or together.

In FIG. 18, several of the projecting pins 732 may be seen as mounted on the reciprocating bar 1733. The reciprocating bar 1733 is appropriately fastened between the reciprocal plates 2704 at each end of the insert head. Thus, as each end plate 2704 is moved up and down the traversely extending bar 1733 will likewise move up and down and cause the attached deflecting pins 732 to likewise move up and down. Adjusting plates X support a parallel bar 1734 for mounting corresponding deflecting pins 732 therefrom. Thus a pair of deflecting pins 732 are provided for each card bin. The adjusting plates X permit appropriate adjustment of the deflecting pins 732 relative to each other for variation from one credit card size to another. This is most important since each pair of pins 732 must engage a credit card correctly near the diametrically opposite corners thereof in order to effect the proper bending and bowing, or flexing, action of the cards during the insertion process.

Figure 20:
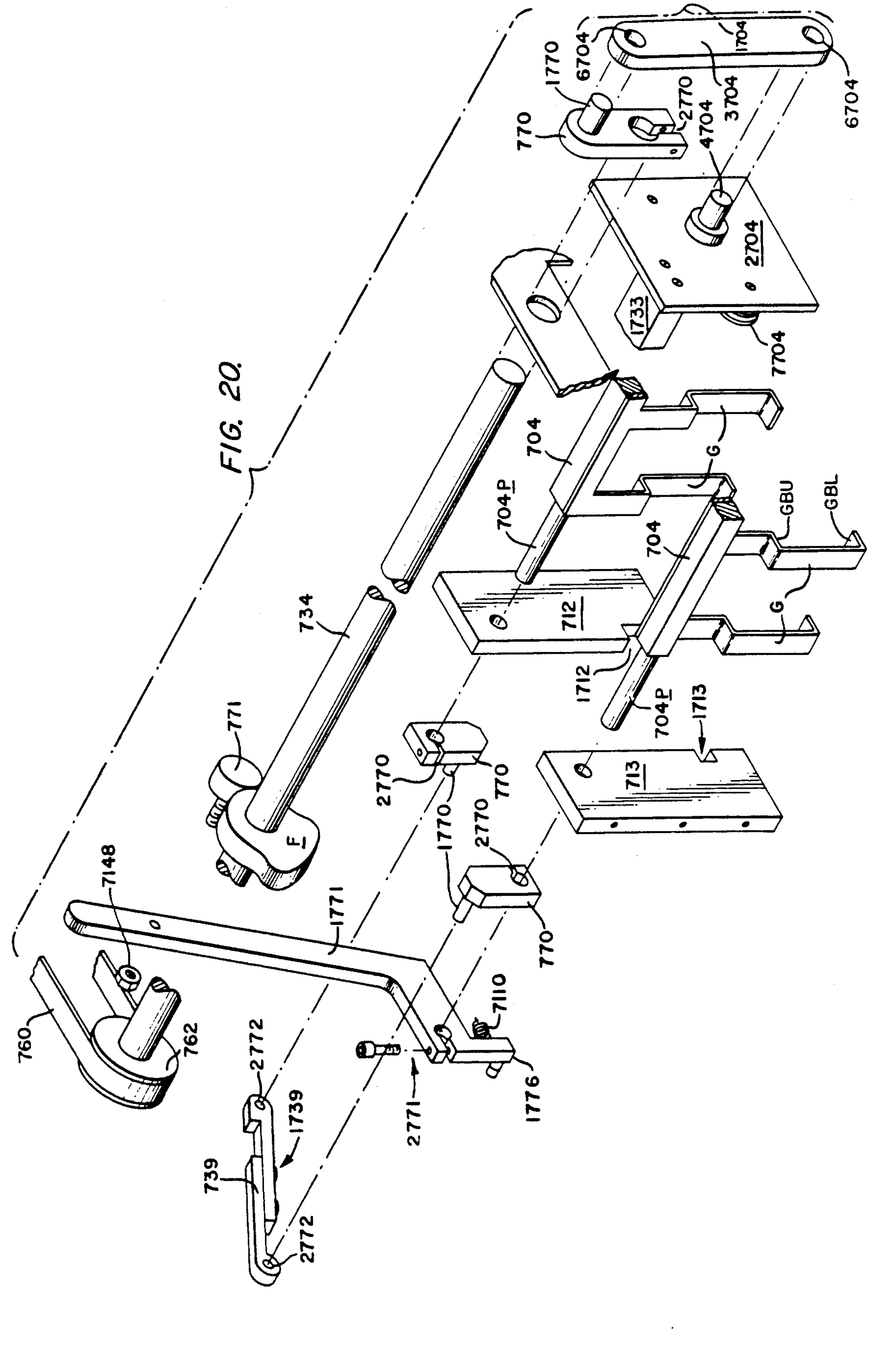
FIG. 20 is an exploded perspective view of the basic component parts associated with one bin of the card insert apparatus of the insert module.

FIG. 19 shows idler rollers IR which are under the bias of a spring 715 for resilient engagement thereof with respective card feed rollers 701. A pair of these associated idler and card feed rollers 701 are provided at each bin. The card deflection roller B is mounted to a pivot bar PB on the end of the rotary solenoid C shaft CS, and thereby positioned between these pairs of rollers. This structure, as described above, will deflect a card into the associated card bin when the roller is lowered from its normal position shown. When the solenoid C is deenergized, the roller returns by spring bias of its energizing solenoid to its card feed-through position as shown in solid lines of FIG. 19 to permit the credit cards to pass beyond the roller-associated bin. With reference to FIGS. 18 and 20, the arms G are secured to rotatable bars 704 pivotally mounted in support plates 712 and 713 at each end, the respective rotary shafts 704P thereof being securely engaged by corresponding clamps 770 by means of their respective slotted apertures 2770 and tightening screws (not shown). Note that clamps 770 are oriented 180° apart; their respective actuating pins 1770 are received in corresponding apertures 2772 of a link 739. Link 739 is adjustable in length at its connection 1739 to accommodate adjustment of bin size for different card sizes.

Attached to the pin end 704P of the frontmost bar is a lever arm 1771. A clamping structure 2771 similar to 770 permits adjustable securing of this lever 1771 to the pin 704P. A bias spring 7110 is appropriately mounted on one end to a support structure and at the other end to a pin extending from the lower end 1776 of this lever arm. Cam follower 771 is secured to the arm 1771 through the aligned apertures shown by nut 7148. Cam follower 771 engages cam F which is secured to the main actuating shaft 734, the latter having pulley 762 secured thereto for being driven in rotation by belt 760 by a drive motor 798. The opposite end of shaft 734 has secured thereon a coupling member 770 which, in similar fashion as before, is adapted for rotatable connection to a link and eccentric structure 1704. This structure include pin 1770, link 3704 with apertures 6704 at each end, and pin 4704 on slide plate 2704. A corresponding eccentric and link structure is provided at the opposite end of the inserter head for engaging the respective, corresponding slide plate 2704.

Figure 21:
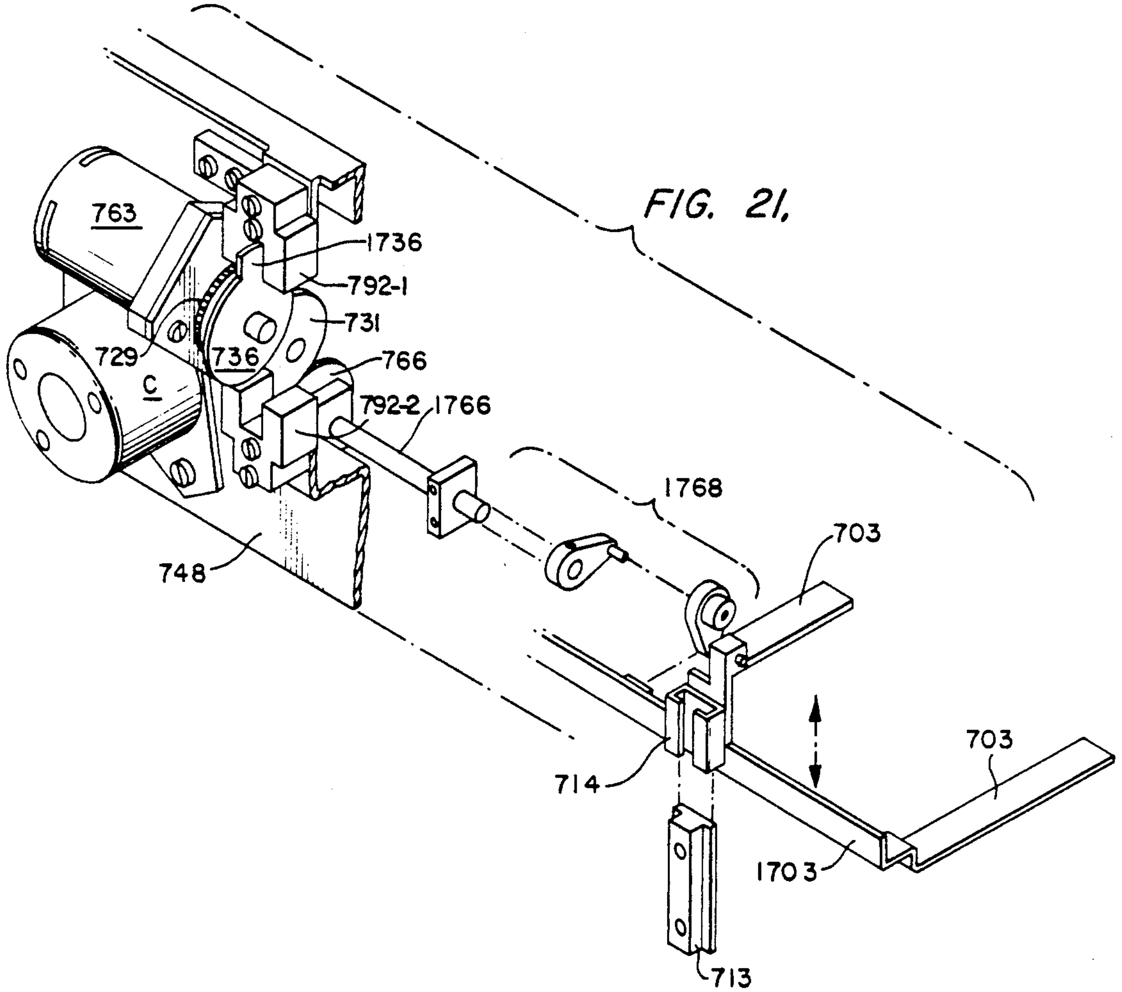
FIG. 21 is a perspective view of card support fingers, and associated drive elements therefore, of the insert module.

FIG. 21 shows the actuating structure for the card support finger 703. The latter are secured to, or integral with, a support bar 1703 which is driven in a vertical, reciprocating manner. Particularly, guide follower 714 and guide 713, the latter secured to support structure of the insert station 1700 by means not shown, restrict bar 1703 to vertical reciprocatory motion. DC motor 763 operates through reduction gear 729, 731 and 766 which will rotate shaft 1766 and by it the rotary-to-reciprocating motion linkage 1768 to achieve the vertical reciprocatory motion of the bar 1703 and, with it, the support fingers 703. Illustratively, panel 748 is part of the support structure of the insert module 700.

Motor 763 furthermore drives timing disc 736 which interacts with the light source/photosensor device 792-1, the latter detecting the radial projection of the disc 736 to afford an output electrical timing signal indicative of the rotary position of the disc 736 and thus the motor 763. 792-1 detects 703 in the up position. 792-2 detects 703 in the down position. Motor 763 rotates slightly more than 180°—it rotates slightly over top dead center to provide a locking function for 1703 in the up position. Motor 763 reverses direction to go down.

Figure 23:
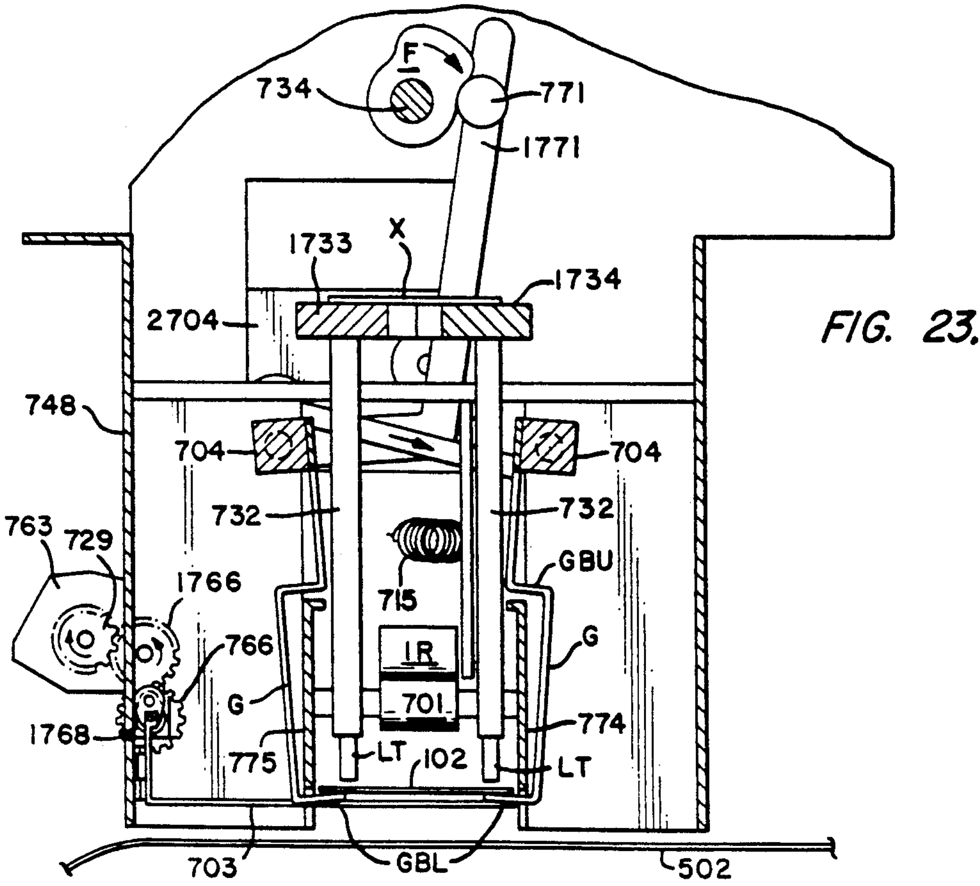
Figure 24:
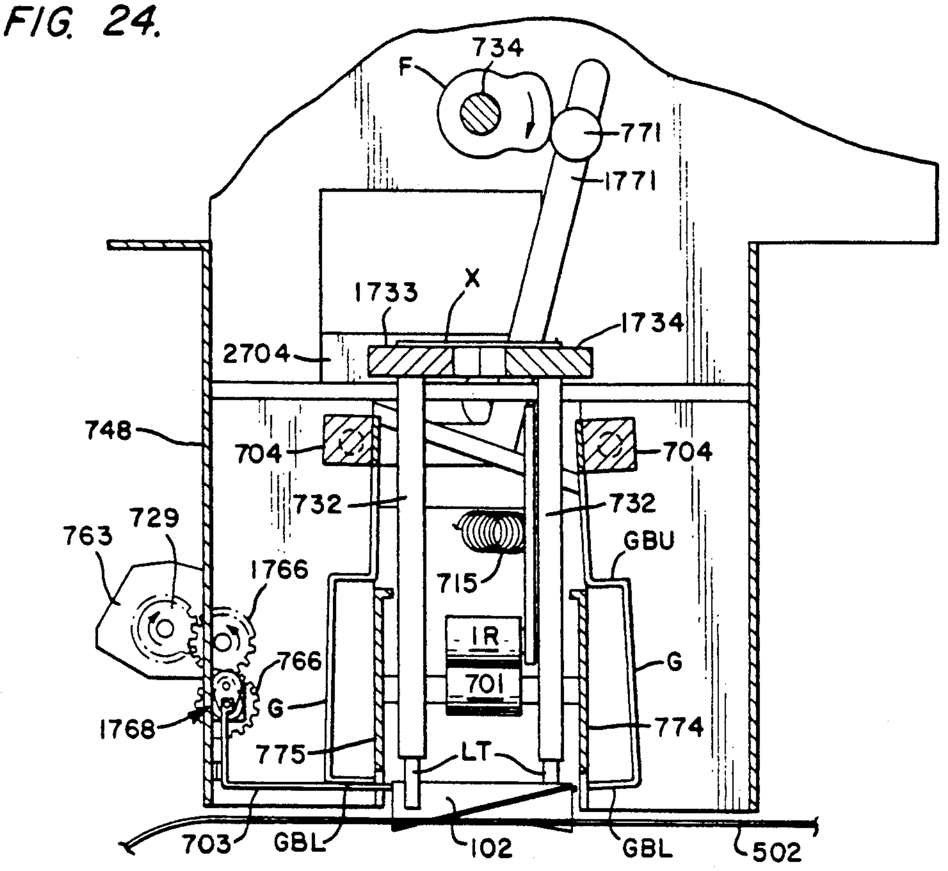
Figure 25:
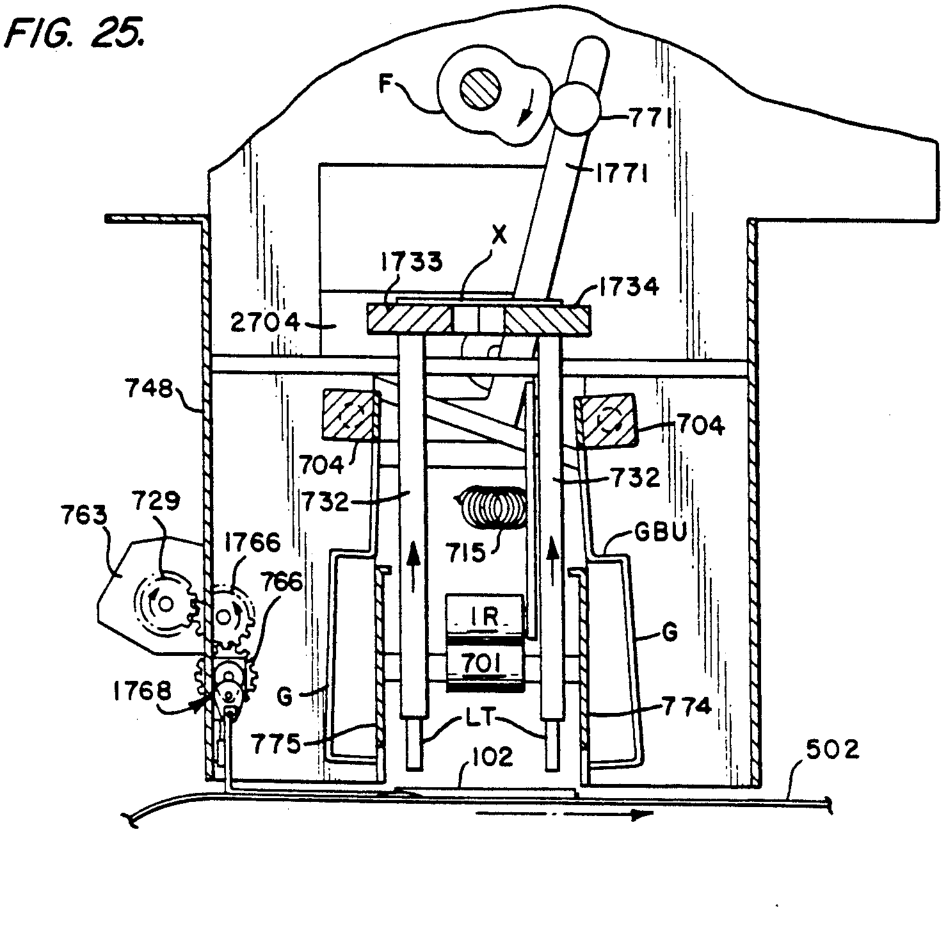

In FIGS. 22–25, inclusive, a credit card 102 is shown as having been deflected into the respective bin for insertion onto the form 502, under the further assumption that the proper data matching has occurred as between data read from the card and the form there presented. FIGS. 22–25 comprise a common sight elevation of the insert station 1700 taken effectively through one of the bins and thus centrally of the structure as seen in FIG. 18, looking to the left. The pivotal mounting of the arms G by the finger support bar 704 is now readily seen, as well as the slide elements 713 and 714 associated with the central supporting finger 703. Note moreover that the linkage 1768 which operates the fingers 703 is just abutting the side support wall structure 748 in an above-center type position. This reduces the load on the DC drive motor 763 by having a direct mechanical stop function when the fingers are in the raised position. This also serves to precisely position the fingers 703 at the desired height relative to the form 502. In similar fashion, when driven to the lower position, in which fingers 703 are contiguous the surface of form 502 as seen in FIG. 25, the linkage 1768 has now swung down to abut the wall support 748 in the opposite, undercenter position, again affording precise positioning of the fingers 703.

Each of FIGS. 22 through 25 as well illustrates the operative relationship of the main drive shaft 734 and cam F carried thereby, with the cam follower 771 and link 1771 which controls the pivoting motion of the support bars 704 for the arms G. The vertically reciprocable plate 2704 is also seen in its various stages of movement within the rectangular guide aperture 2747, being driven by the eccentric crank arm structure 1704 as actuated by the end of shaft 734, as seen in FIG. 20.

Examining the successive stages specifically illustrated in FIGS. 22–25, FIG. 22 illustrates the normal, bin-defining positions of the fingers G with the central support finger 703 in its uppermost position and with the deflection pins 732 as well raised to the uppermost position by their support bars 1733 and 1734 which are carried by the plates 2704.

The deflection rollers B and the associated rotary drive solenoid C and other related structures are removed in FIGS. 22–25 for clarity of illustration of the deflection and card insertion elements. However, FIG. 22 shows in phantom lines a card being deflected into the bin and, in solid lines, the rest position of the card in the bin, supported on the tips GBL of the fingers G.

In progressing from FIG. 22 to FIG. 23, shaft 734 has rotated cam F, but follower 771 has followed along a constant radius of cam F and thus lever arm 1771 has remained stationary. Plates 2704 have descended, lowering the deflection pins 732 through their associated support bars 1733 and 1734, respectively. Fingers 703 remain stationary, directly supporting the central portion of card 102 along with the tips GBL of arms G. The tips LT of the deflection pin 732 at this position are almost engaging the card 102 at the corresponding, diagonally opposite corners.

Progressing to FIG. 24, rotation of cam F has caused maximum deflection of follower 771 and lever arm 1771, pivoting the support bar 704 and rotating arms G to remove the tips GBL from the card 102. The continued downward motion of plates 2704 and support bars 1733 and 1734 has caused deflection pins 732 to move downwardly, their respective tips LT now engaging and depressing the diagonally opposite corners of card 102, the central portion thereof remaining supported on the finger 703. The card corners project into the form apertures, as shown, corresponding holes in the underlying support structure (not shown) accommodating the projecting corners. Linkage 1768 remains in its abutted position, bearing the load imparted on fingers 703 during this card deflection step.

Progressing to FIG. 25, cam follower 771 continues on a constant radius of cam F and thus arms G remain in the outwardly pivoted position. Motor 763 is now energized, link 1768 is driven to its opposite position abutting the wall 748, and simultaneously the fingers 703 are lowered, permitting each of the deflected cards 102 to assume its normal planar shape, the two diagonally opposite corners extending along the opposite side of, and securely engaging the card to the form.

As can readily be visualized, continued rotation of the shaft 734 and the cam F will permit follower 771 through bias spring 7110 to return to the shorter radius portion of the cam F, and thus pivoting lever arm 1771 back toward a more vertical position whereupon the arms G will rotate back into the bin-defining position of FIG. 22. Moreover, the eccentric crank arm structure 1704 (see FIG. 20) will raise plates 2704 and the associated bars 1733 and 1734 with their associated deflection pins 732 back to the upper position. Fingers 703 remain in the lowest position as shown in FIG. 25 until form 502 is advanced out of the insert station, following which the drive motor 763 is energized to rotate link 1768 and raise fingers 703 to the initial position shown in FIG. 22.

The position of the deflection pins 732 is important to proper flexing of the card and accordingly for different size cards, they must be adjusted. FIG. 18 illustrates at X the bracket which permits adjusting the spacing between the pins 732. These pins are shown fixed in position on their respective arms 1733 and 1734; the variations in card dimensions as to the longitudinal length are not so great as typically to require movement of pins 732; however, additional holes can be provided in the bars 1733 and 1734 to permit adjusting the longitudinal separation of the pins 732 if desired. Other elements defining the bins correspondingly are adjustable as generally indicated in the views, for example, the supports 704 for the arms G can be adjusted with the support plates 712 and 713 and the like so as to establish the proper bin size for a different size card to be handled. Photosensor detectors are employed for monitoring and timing functions, as earlier referenced. FIG. 18 illustrates timing disc TD and detector H for monitoring the position of the main shaft 734. The detector H output therefore indicates to the computer the current state of operation of the insert module 1700. FIG. 21 shows two additional detectors 792-1 and 792-2, the outputs of which indicate the position of the central support fingers 703. As before noted, photo detectors H are positioned in each bin to detect whether a card has passed through that bin or stopped within it. In this regard, a further detector H adjacent the entrance to the card reject hopper as well indicates whether the card has advanced into the reject hopper, treating the latter effectively as a fifth bin.

Figure 26:
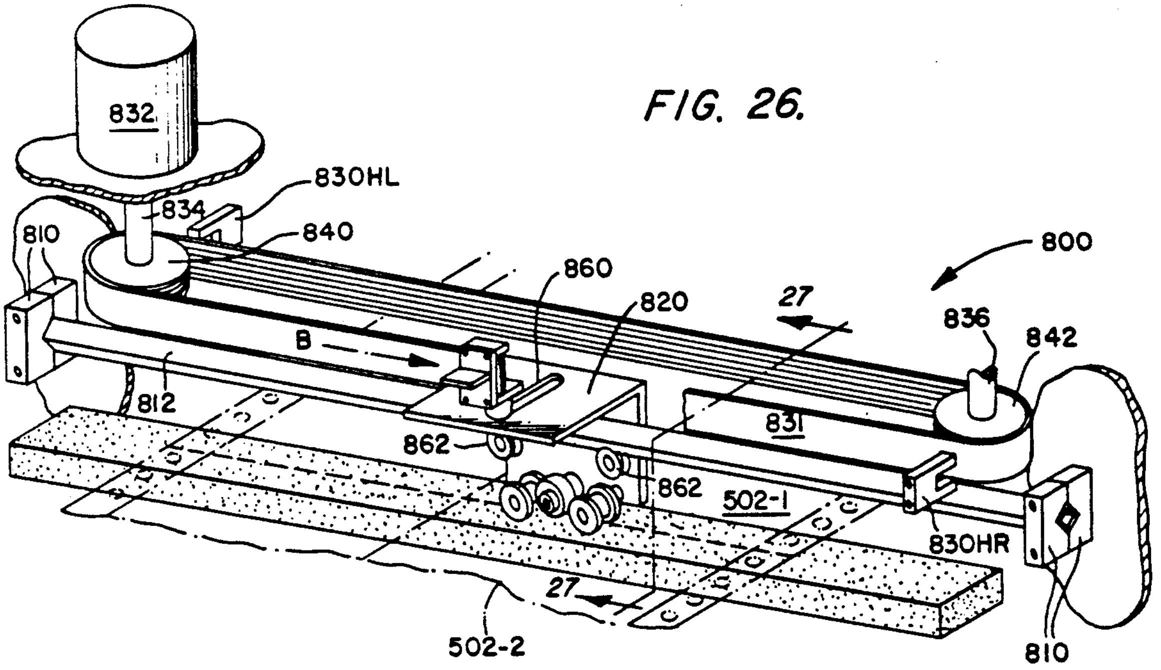
FIG. 26 is a perspective view of the bursting structure for separating serially connected, successive fanfold forms into individual forms.
Figure 27:
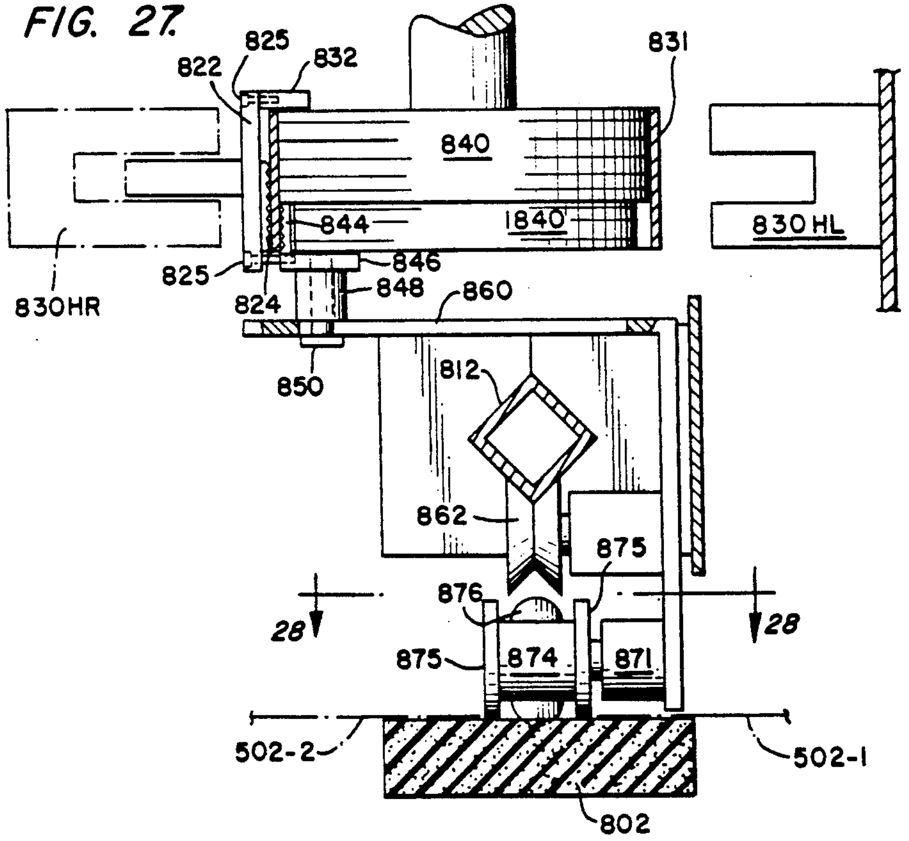
FIG. 27 is a right side elevational view of the form slitter, taken partly in cross section generally along lines 27—27 of FIG. 26.
Figure 28:
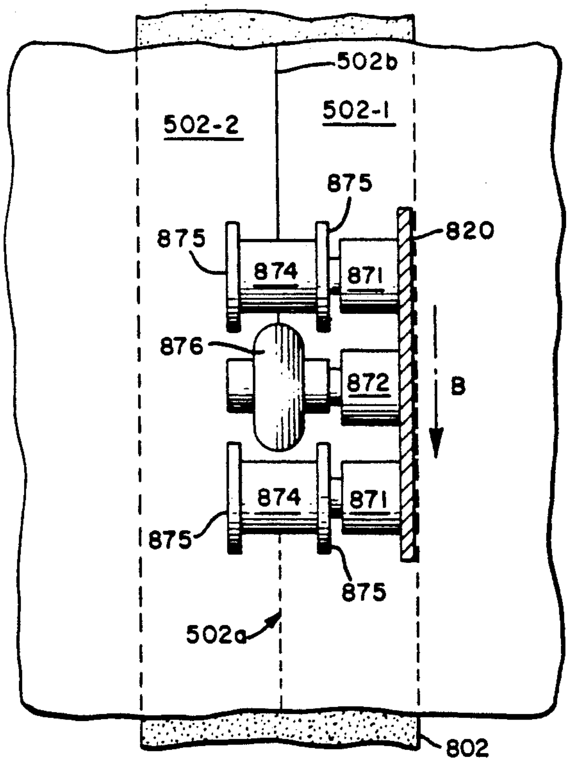
FIG. 28 is a top plan view of the slitter, taken partly in cross section along line 28—28 of FIG. 27.

Next to be described is the burster structure 800 of FIGS. 26, 27 and 28. A pad 802 of a resilient, firm material, such as hard sponge rubber is received in a support surface (not shown) so as to present a flush surface therewith, over which the forms are transported. A form 502-1 is shown in part, which has advanced into the insert station and in fact the leading edge thereof has already advanced into the folder station 900 as noted in relation to FIG. 8. Form 502-1 remains attached at this juncture to form 502-2 which currently is positioned in the insert station 700. The burst line 502A is centrally disposed on the pad 802, delineating between the forms 502-1 and 502-2. As will be recalled from FIG. 8, drive rollers 516, 518 and 1874, 1875 engage the respective forms 502-1 and 502-2, maintaining the same taut at the burster station 800 to facilitate the burst operation.

Carriage 820 supports the burst rollers seen in FIG. 26 and discussed in more detail in relation to subsequent figures, the latter rollers directly engaging the surface of the forms 502-1 and 502-2 to perform the burst operation. These rollers as well support the weight of and guide carriage 820. Guide rollers 862 ride on the undersurface of guide bar 812 of square cross section to maintain alignment, bar 812 being supported at its opposite ends in brackets 810. An additional guide roller or two (not shown) may also be provided above bar 812 to provide additional guidance and to partly support the carriage weight if desired.

With concurrent reference to FIGS. 26 and 27, bracket 822 is mounted by slide elements 848, 850 in a slot 860 in the bracket 820 and is clamped to drive belt 831 as mounted on pulleys 840 and 842 having respective shafts 834 and 836, pulley 840 being driven by a unidirectional motor 832. The motor drives the belt in the direction indicated at B in FIG. 26.

Looking at FIG. 27, the attachable connection between the drive belt 831 and the traverse carriage 820 is shown. A plate 822 has provided on the inner surface thereof a smaller member having a plurality of teeth or extending projections 824 for gripping engagement with the face of belt 831. At the top of plate 822, another guide plate 832 is suitably secured thereto by means of screws 825. Similarly at the bottom of the plate 822 another guide and drive connecting plate 846 is adjustably and tightenably secured by similar screws 825. An upwardly extending projection 844 on the gripping plate 846 is also provided with teeth on the belt side thereof so that when the plates 822 and 844 are drawn together by means of the lower screws 825 the drive belt 831 may be securely fastened between the teeth 824 and 834. The drive pulley 840 has a recessed portion 1840 to receive plate 844 as it passes around the pulley. Idler pulley 842 has a similar recess (not shown).

FIG. 27 shows the detail of pin 850 received in slot 860 with spacer 848 supporting plate 846 slidably on the carriage 820.

With concurrent reference to FIGS. 27 and 28, shaft mount 871 supports the flanged rollers 874 and shaft mount 872 supports the crown roller 876; another shaft mount 863 supports the guide rollers 862 which engages the guide bar 812. The crown roller 876 is of larger diameter than the flanged rollers 874 such that its extremities are received slightly within the space defined between the spaced flanges 875 of the two channel rollers 874. Guide rollers 862 also are similarly spaced.

The flanges 875 of the two channel rollers 874 slightly depress the paper into the pad 802 and maintain the adjacent forms 502-1 and 502-2 taut along the perforation line 502*a*. As the carriage traverses the form in the direction B indicated in FIG. 28, the crown roller 876 depresses the adjacent forms along burst line 502*a* into the pad in cooperation with the channel rollers 874 and bursts the form along the perforation 502*a*, the burst condition being indicated by a solid line 502*b* in FIG. 28. This technique of bursting permits a tolerance of at least 1/16 of an inch and even greater in the alignment requirements of the perforation line 502*a* with the burster structure, minimizing the precision of positioning of the burst line as contrasted with prior art bursting techniques and provides burst without moving or pulling the form at the insert station. Most burst techniques rip forms apart by pulling them apart at high speed.

As noted, motor 832 is unidirectional, and thus relatively inexpensive. After traversing the forms in the direction B, of course, the carriage 820 must return. This is accomplished by the sliding engagement of bracket 822 at the far end travel of the belt 831 around the respective pulleys 840 and 842 which, in each case, permits the bracket 822 to follow with the belt and the carriage 820 to remain in its position on guide rail 812, bracket 822 sliding along slot 860 from one extreme to the other as it passes around the pulley.

Photosensors 830HR and 830HL at the right and left extremes of travel of the carriage 820 and respective adjacent pulleys 842 and 840 detect a flag element 821 carried by the bracket 822 at its extremes of travel. Their respective output signals indicate to a computer the current position of the carriage.

In operation, when the forms are positioned for bursting, the computer energizes motor 832 to drive the carriage in its transverse, bursting operation in the direction B. The output signal from detector 830HR terminates the motor drive and the carriage comes to rest. The computer then signals the folder mechanism to withdraw the burst form, after which the computer energizes motor 832 to cause the carriage return to the left. Detection of the flag 821 by detector 830HL then signals the computer to terminate energization of motor 832, leaving the carriage at the left initial position, preparatory to a subsequent burst operation. The carriage goes in one direction for the first form and the opposite direction for the second, etc.

Figure 29:
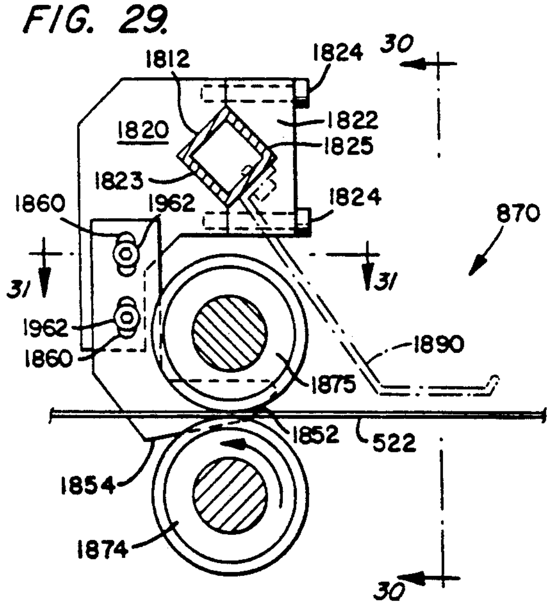
FIG. 29 is a side elevational view of the slitter.
Figure 30:
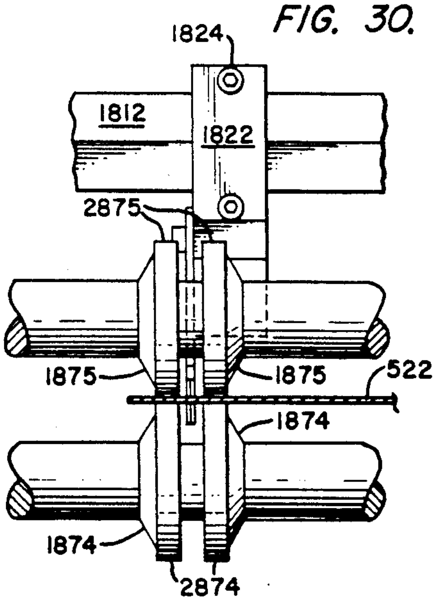
FIG. 30 is a front elevational view taken generally along line 30—30 of FIG. 29.
Figure 31:
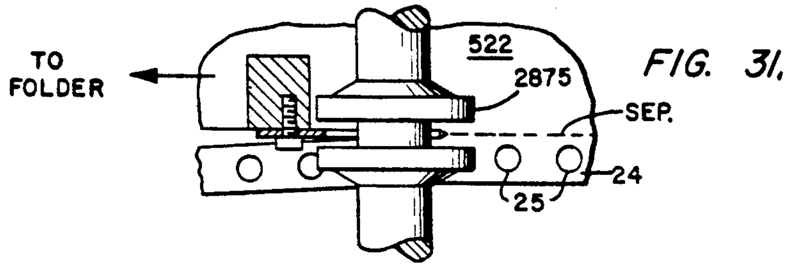
FIG. 31 is a top plan view taken partly in cross section and generally along line 31—31 of FIG. 29.

The burster station 800 further includes longitudinal slitters 870 as shown in FIGS. 29, 30 and 31. Support rod 1812 as seen in FIG. 7 extends transversely of the advancing forms and carries edge slitters LS and RS for removing the left and right sprocket marginal portions of the forms and a central slitter CS which separates the side-by-side forms. Each of the structures RS, LS, and CS is substantially identical as illustrated in FIGS. 29–31. As indicated in FIG. 7 and better seen in FIG. 29, the slitter structures are directly associated with the form feed rollers 1874, 1875. For this purpose, at each of the LS, RS and CS slitters, the rollers include double flanges 2875 spaced apart so as to include in the spacing the longitudinal perforation to be slit. FIG. 31 illustrates this perforation line SEP adjacent a marginal portion 24 bearing the sprocket holes 25, disposed in a space between the flanges 2875.

In FIG. 29, bracket 1820 is adjustably mounted on support rod 1812 by clamp 1822 and screws 1824. The slitter knife 1850 is adjustably secured to bracket 1820 by screws 1862 received in slots 1860, the latter permitting height adjustment of the knife 1850. The cutting edge of the knife 1850 includes a leading portion 1852 and a trailing portion 1854 which may be relatively blunt but which serves very effectively to perform the slitting due to the taut condition of the form in the region of the perforation, as maintained by the double, spaced flanges 2875 and 2874 of the respectively associated rollers 1875 and 1874.

A guide element 1890 shown in phantom lines in FIG. 29 may be attached to the support rod 1812 to prevent the paper form from lifting for enhancing the slitting operation. Such a structure is particularly desirable for the slitter CS which separate the side-by-side forms. Element 1892 may be of ¼ to ⅜ inches in width and formed of a suitable resilient material such a spring metal.

FIGS. 32–38 comprise schematic views of the folder mechanism of folder station 900. A form 502, burst by burster station 800 from any prior form still engaged by rollers 516 and 518 and remaining in the insert station 700 is advanced by rollers 1874 and 1875 through the double clutch mechanism 953 by motor 901 as shown and discussed in relation to FIG. 8. The slitter station 1870 is associated with these rollers 1874, 1875. The remaining rollers 912 and 914 of the folder are driven by the belt system discussed in relation to FIG. 8.

The folder mechanism 910 includes, in addition to these rollers which may be of like sort to those previously described, first and second doors 920 and 930 which are movable between the solid and dotted lines positions to accommodate selectively 3-, 2-, and 1-part forms. The solid lines positions are for folding a 3-part form which will be described. Numerals 925 and 935 designate the pivotable mounts for doors 920 and 930, respectively. With door 920 in the dotted line position in FIG. 32, a single fold for a 2-part form is accomplished and if door 930 is moved to its dotted line position, the folder merely transports a single form directly to the folder outfeed station 1000, with no folds being required and accordingly none being performed.

Figure 32:
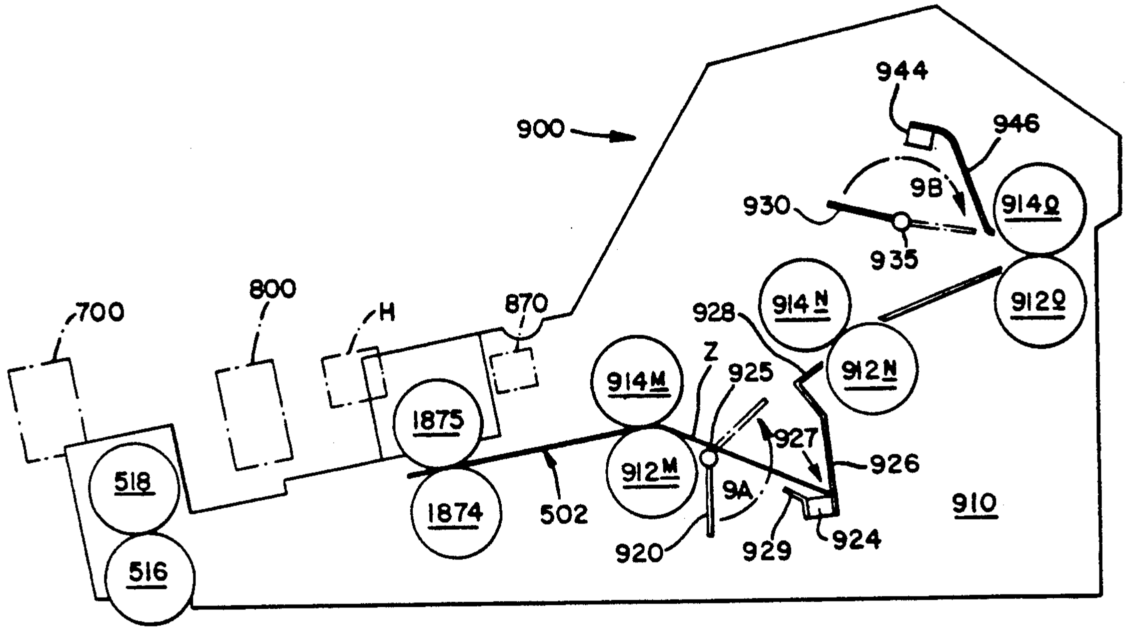
FIG. 32 is a side elevational view in schematic form of the folder mechanism of this invention, illustrating pivotal doors which are selectively positioned for accommodating forms of different fold-types.
Figure 33:
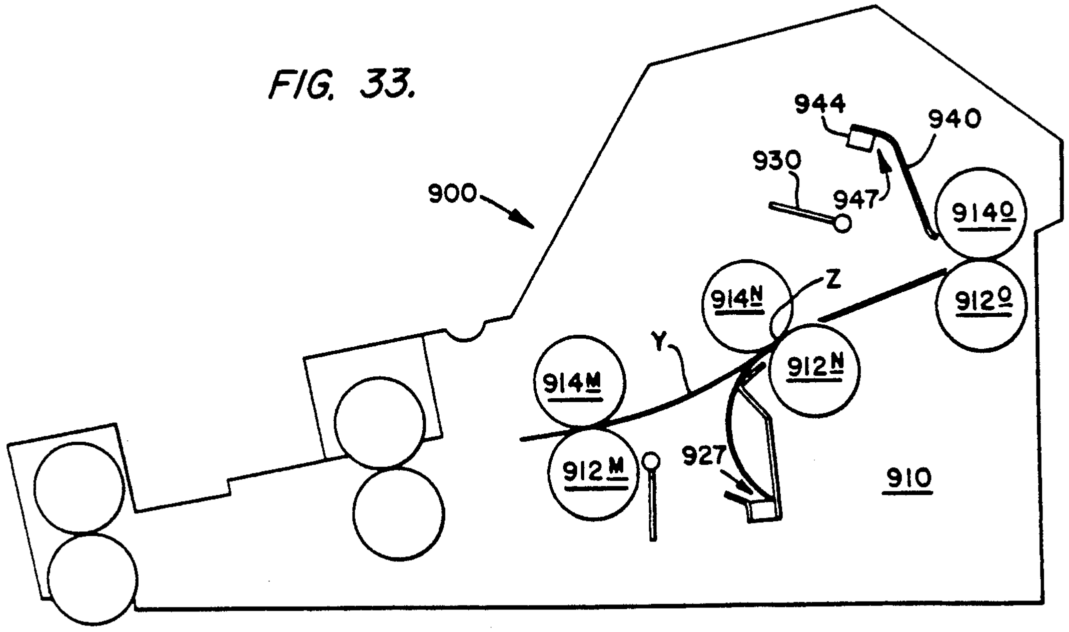
FIG. 33 is a side elevational view in schematic form with the pivotal doors positioned for folding three-part forms at the two fold lines thereof.
Figure 34:
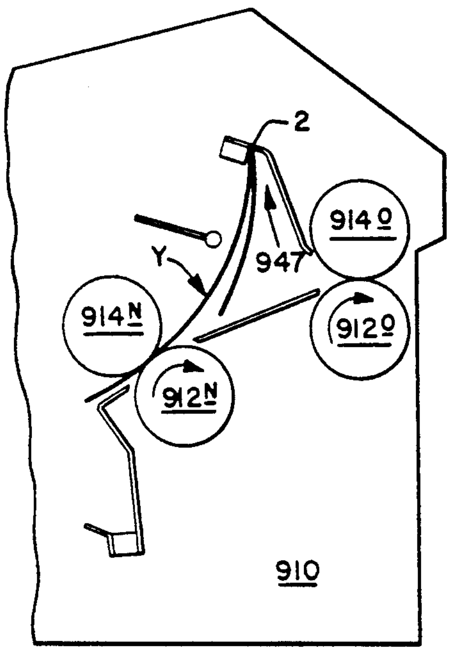
FIG. 34 is a fragmentary portion of FIG. 33, showing the completion of the first fold.
Figure 35:
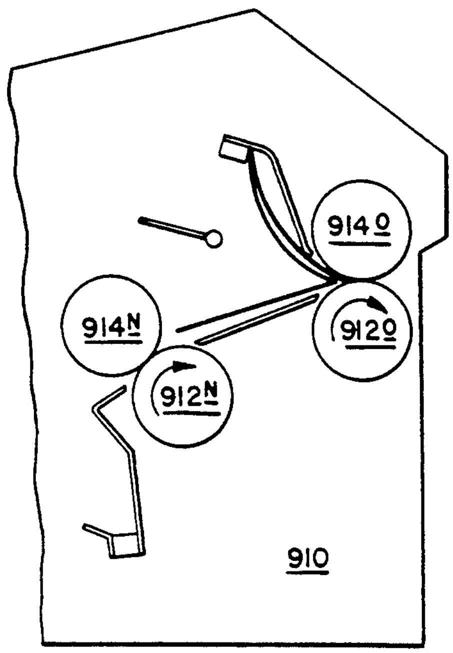
FIG. 35 is a fragmentary portion of FIG. 33 showing the first step in making the second fold.

In performing two folds in a 3-part form, with the doors 920 and 930 in the solid line positions, FIG. 32 illustrates the form advancing into the folder structure 910 with the leading edge having engaged baffle 926 and being directed thereby into a pocket 927 formed by a transverse bar 924 and a smaller baffle 929. With the leading edge thus retained, the rollers 912M and 914M advance the form, causing it to fold along a preformed fold line Z which is directed by the bent surface 928 of baffle 926 into engagement by rollers 912N and 914N. The latter advance the once-folded portion of the form to direct the fold line Z against baffle 946 and into the pocket 947 formed therewith by transverse bar 944. Continued driving of the form by rollers 912N and 914N produces a second fold along pre-formed fold line Y of the form, with that fold line being directed into engagement by rollers 9120 and 9140, the latter then withdrawing the completely folded form from the folder 910 and advancing same to the folder outfeed station 1000. It is believed apparent that movement of the baffle plates will accommodate a single fold or no fold at all as before described. It is also believed apparent that the folder mechanism 910 transports therethrough and accordingly folds as required a pair of side-by-side forms as separately received from the burster slitter station.

Figure 36:
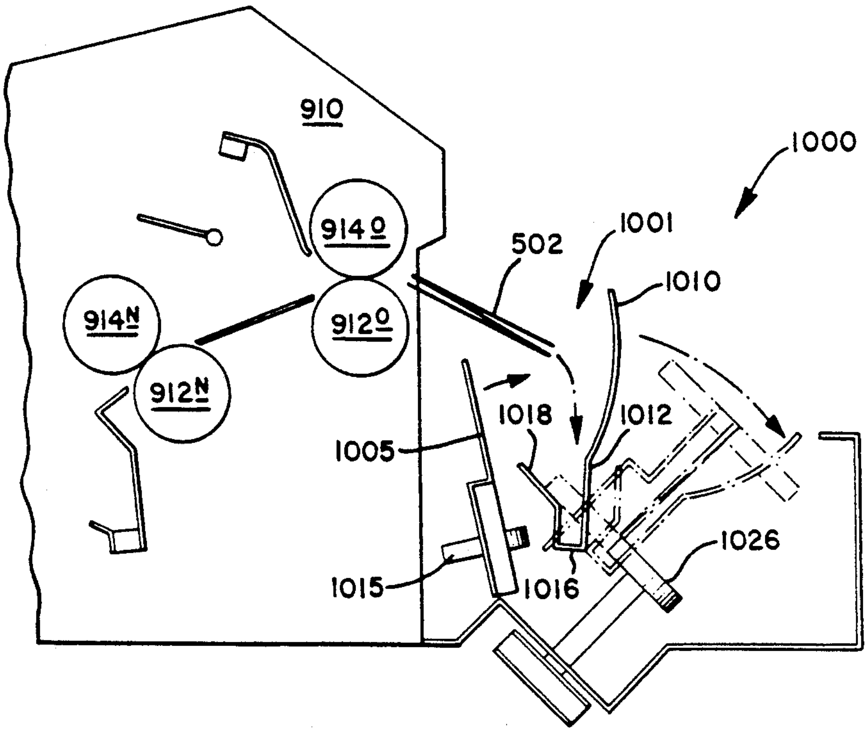
FIG. 36 is a fragmentary portion of FIG. 33, showing the completed, folded form being fed to the output feed.
Figure 37:
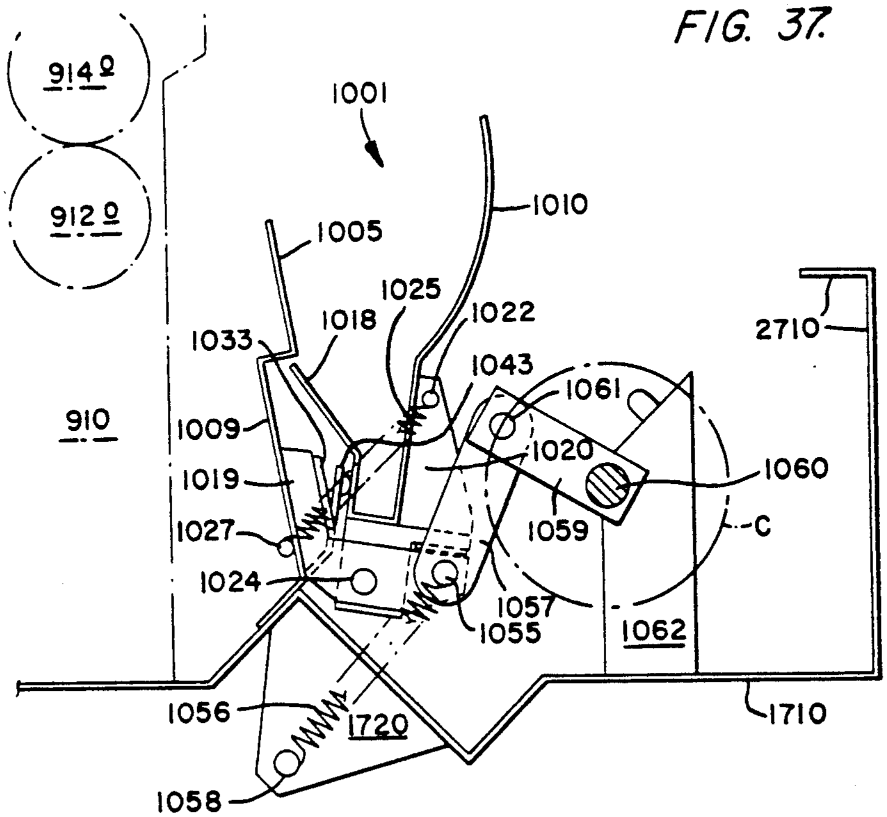
FIG. 37 is a right elevational view in schematic form, of the reception guide of the folder outfeed in the "up" position, ready to receive folded forms from the folder station.
Figure 38:
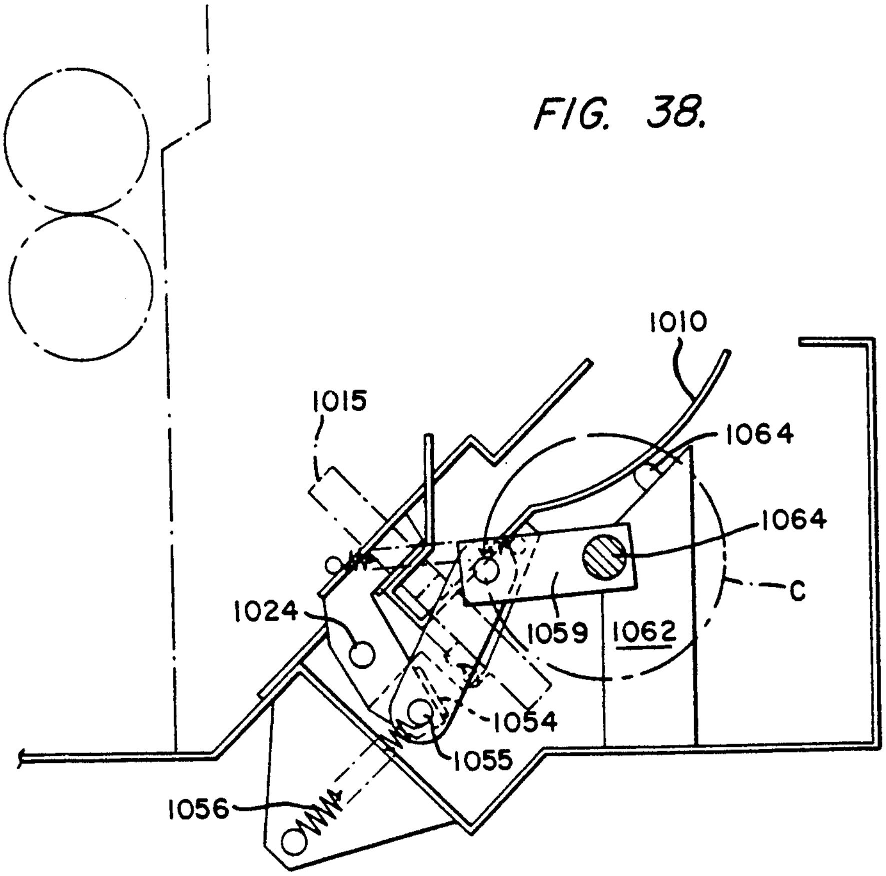
FIG. 38 is a view similar to FIG. 37, but with the reception guide in the down position ready to feed the folded forms to the outfeed transport.
Figure 39:
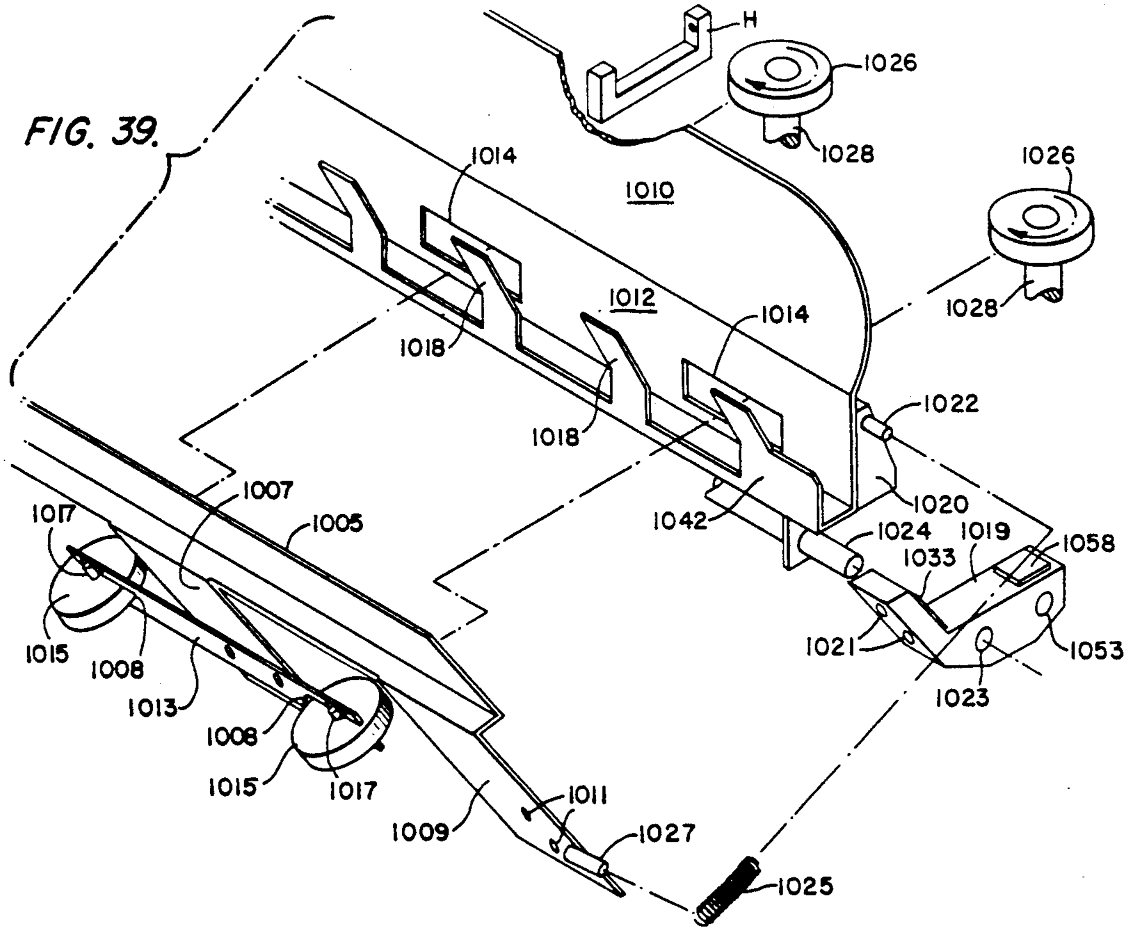
FIG. 39 is a perspective view of the folder outfeed.

The outfeed station 1000 is shown in various stages of operation in FIGS. 36 through 38 and in a detailed perspective view of its structure in FIG. 39. The folded form 502 exiting from the folder structure 910 advances into a receiver 1001 defined by a straight front plate 1005 and a curved back plate 1010. In FIG. 39, windows 1014 permit monitoring for the presence of forms by photocells H. These photocell outputs as well provide an indication of the successful completion of the folding function, since the presence of forms should be detected within a predetermined time period (200 ms.) after the start of the fold cycle. For this purpose, the output of photocell H of FIG. 32 which indicates the departure of the trailing edge of the form into the folder 910 in FIG. 32 identifies the initiation of the time cycle of folding and the outputs of photocells H in FIG. 39 identify the completion of folding within the predetermined time period.

The plates 1005 and 1010 are normally in the up position as shown by solid lines in FIG. 36 for receiving the forms from the folder mechanism 910 and after receipt of forms, are moved to the retracted or down position shown in dotted lines for advancing same to the output feed transport. FIG. 37 shows these structures in somewhat more detail in the up position and FIG. 38, in the down position. The structural configuration is now discussed with concurrent reference to FIGS. 37 to 39. In FIG. 39 and for purposes of the following description, only the portion of the folder outfeed mechanism 100 for receiving the right hand form, as viewed from the front of the machine, is shown and discussed. The left hand portion for receiving the left form is of like sort.

The front plate 1006 has a depending extension 1007 to which is secured a spring steel element 1013 for supporting idler rollers 1015 at associated axles 1017 at its opposite ends. In the down position of the plates 1005 and 1010, the idler rollers resiliently engage the drive rollers 1026 with the form therebetween to cause the form to be driven out of the receiver.

With reference to FIG. 36, the receiver 1001 actually is defined by the back plate 1010 which includes a back wall panel 1012, a bottom edge support panel 1016 and a forward panel 1018 which define a channel into which the form is deposited. The front plate 1005 principally assures that the form is directed into and remains within that channel where the two plates 1005 and 1010 are moved together. As previously noted, the form received in the channel formed by elements 1012, 1016 and 1018 thus is driven out of the folder outfeed mechanism.

Fixed shaft 1024 carries rotatable supports 1036 to which the back plate 1010 is secured. Actuating element

1019 is also rotatably mounted on shaft 1024 through its aperture 1023. Plate 1005 is attached through its depending flange 1009 at apertures 1011 with the bracket 1019 at its mating holes 1021. Plate 1005 thus may rotate relatively to plate 1010 about shaft 1024. Member 1019 further includes an aperture 1053 and a resilient shock pad 1058 associated with the actuated mechanism, to be discussed. A block 1020 secured to the back of plate 1010 carries a pin 1022 and a mating pin 1027 as provided on the extension 1009 of the front plate 1005, spring 1025 coupling the pins 1022 and 1027 to urge the corresponding plates 1010 and 1005 into engagement.

FIGS. 37 and 38 illustrate a link mechanism attached by pivot shaft 1055 received in aperture 1053 of the element 1019. A rotary solenoid C mounted to the frame 1710 carries on its rotary shaft 1060 link arms 1059 and 1057 pivotally connected at 1061. Spring 1056 is connected to pin 1058 attached to bracket 1720 at one end and at the other end to the shaft 1055. Solenoid C, when energized, rotates in the clockwise direction to actuate the linkage 1057, 1059, rotating the element 1019 upwardly about shaft 1024 and rotating front plate 1005 in the counter-clockwise direction to its forward, open position, spring 1025 pulling the backplate 1010 to move in a counter-clockwise direction similarly and into an upright position as seen in FIG. 37. When deenergized, spring 1056 returns the back plate 1010 to its down position, engaging stop 1064; as seen in FIG. 38.

In moving to the up position, whereas front plate 1005 is positively driven, plate 1010 follows only by the action of spring 1025 and thus the stop engaged by the back plate 1010 prevents its further forward motion to open and thus define the receiver 1001 as seen in FIGS. 36 and 37 for receipt of a folded form. The stop 1043 attached to the support 1710 engages the back plate 1010 to prevent its further forward motion under influence of spring 1025 as the front plate 1005 moves forward. Cushion pad 1033 in FIG. 37 serves as a stop for plate 1005 when engaging panel 1042. (c.f. FIG. 39)

Now looking at FIGS. 36-38, the overall operation of this outfeed receiver structure will be described. The rotary solenoid C when energized from the computer, rotates shaft 1060 in the clockwise direction and through linkages 1059, 1061, 1057, 1019, and 1009 effects movement of the short front plate 1005 towards the left. Through the connecting spring 1025 the curved backplate 1010 is caused to move upwardly and to the left until the stop 1043 engages with panel portion 1042 to prevent any further movement thereof. The front plate 1005 continues movement to the left until L member 1019 and resilient bumper pad 1058 thereon engage with the block 1020 to limit further movement of the front plate. However, the front plate has moved further than the rear one, opening up a wide mouth for reception of the forms. Because of the relative position of the structure in relationship to stop 1043, the front plate 1005 will be much nearer the back of the folder than the curved backplate 1010 will be. Thus, when the forms 522 are fed out of the final folder rollers 9120 and 2140 the forms will be fed into the wide mouth receptacle 1001 of the receiver. Upon the rotary solenoid being deenergized, the spring 1056 which is presently under tension, will effect a movement of all of the above linkages so that the plates 1005 and 1010 move toward the right, see FIG. 38. A fixed stop 1064 prevents further movement of curved backplate 1010, while the L member 1019 provided with a cushion pad 1033 functions as a stop for plate 1005 when pad 1033 engages with panel 1042.

When the receiver is in the down or right most position as seen in FIG. 38, the folded forms will be engaged between the driven rollers 1026 and the idler rollers 1015. These rollers then cause the folded forms to be moved out of the outfeed receiver, towards the left thereof in FIG. 39.

Figure 40:
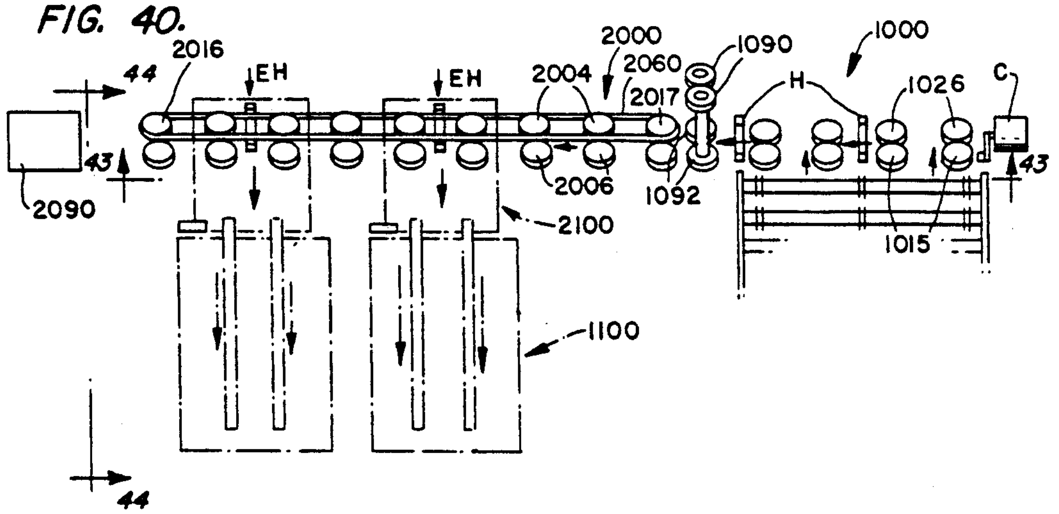
FIG. 40 is a top plan, schematic diagram of the folder outfeed and the outfeed transport which carries folded forms to the output ejectors and stackers.

FIG. 40 depicts in schematic form this operation. Numerous photocell sensors H are spaced adjacent the various rollers as indicated, and send information to the computer to indicate the presence of folded forms, or the lack thereof. Also, a photocell in this transport path detects the leading edge of the second form to assure that both have left the receiver and are on their way to the output stacker. Additional driving rollers, in pairs 1090 and 1092, are provided closely adjacent to the outfeed receiver output as shown in FIG. 40, to assure positive movement of the folded forms from the outfeed receiver 1000. These pairs of rollers also perform another function and that is to assure that the forms are properly creased along the fold lines. Each of these pairs of rollers are spaced and aligned so that they engage the folded forms directly along the crease lines thereof to positively assure that each crease is completed satisfactorily. They also provide for a positive feed of the forms into folded form transport 2000.

Figures 43, 44, 45:
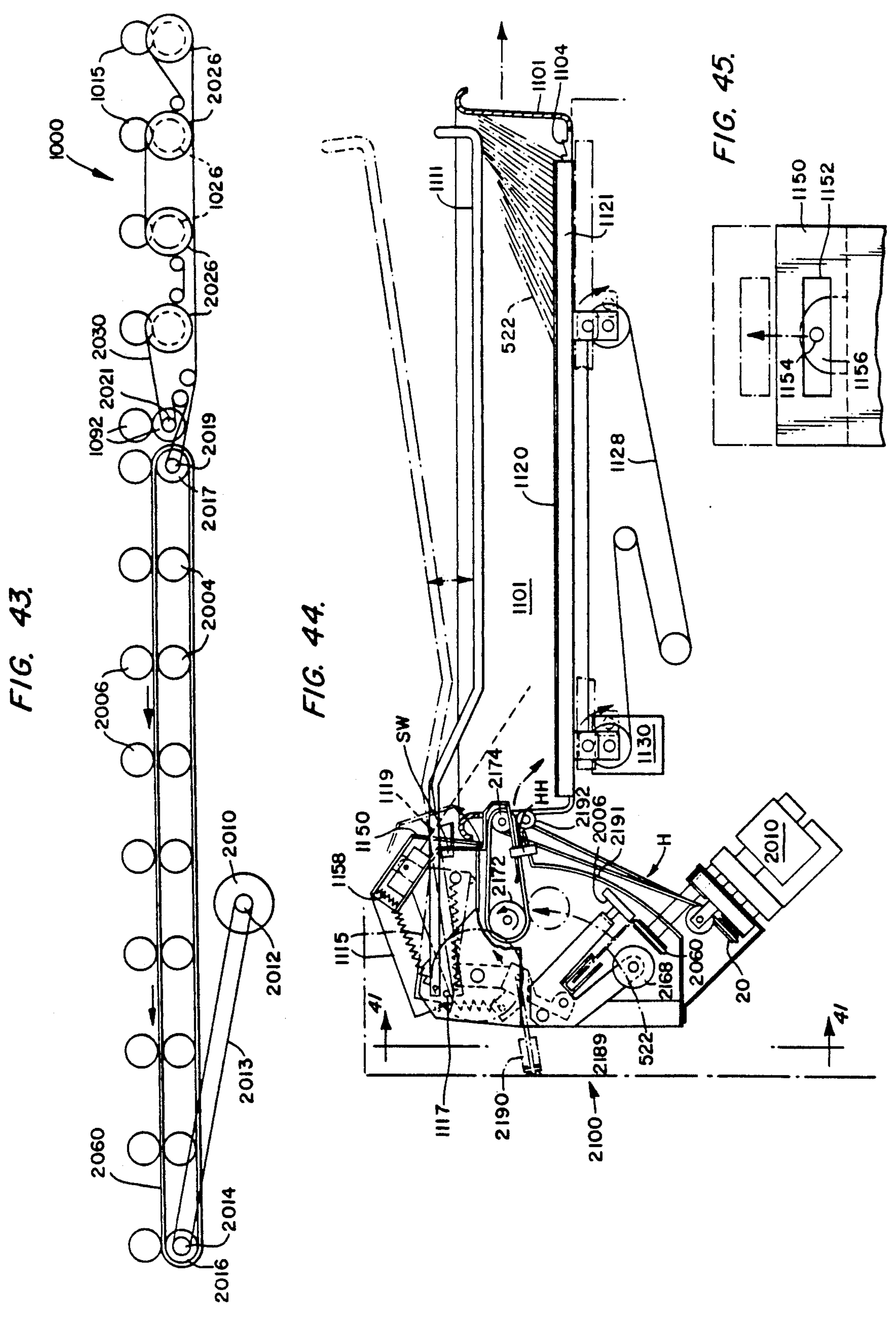
FIG. 43 is a schematic showing of the drive arrangement for the folder outfeed and the outfeed transport.
FIG. 44 is a side elevational view, partly in cross section, of the ejector feed and output stacker as viewed from the right of FIG. 41.
FIG. 45 is an enlarged view of the photoelectric sensor and window structure of FIG. 44.
Figure 46:
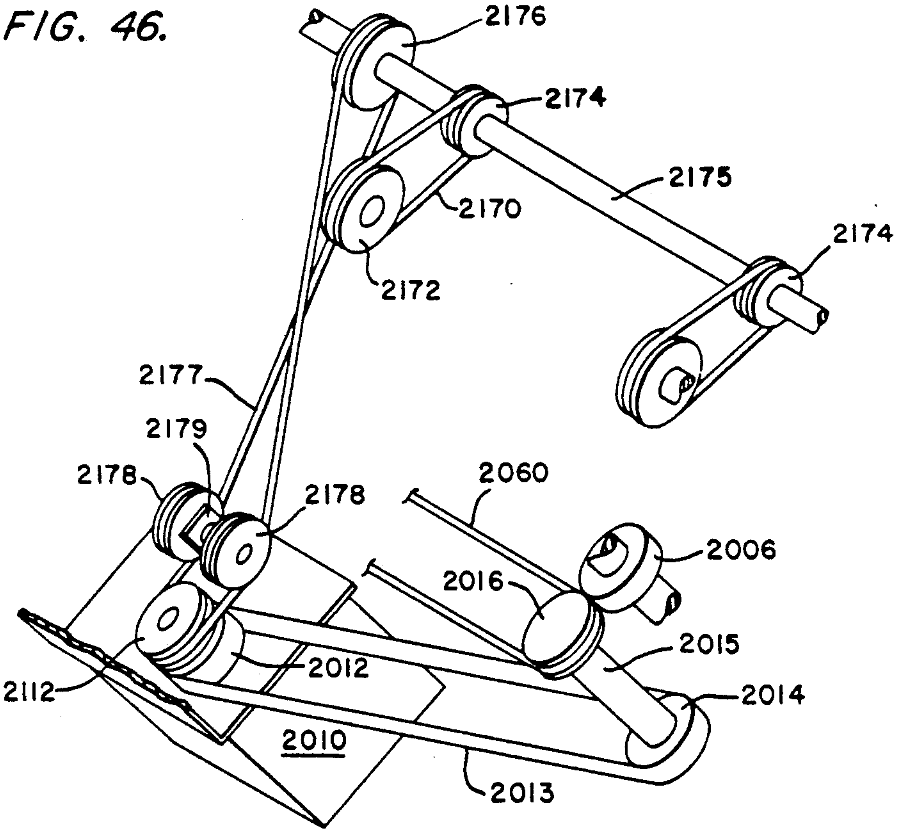
FIG. 46 is a perspective, schematic view of the drive arrangement for the ejector feed.

The folded form transport mechanism 2000 is shown in a top schematic view in FIG. 40 and in a bottom schematic view in FIG. 43. From the positive outfeed rollers 1090 and 1092, the folded forms are transported by a high friction belt 2060 which is supported by the plurality of rollers 2004. The left end roller 2016 is driven by its associated pulley 2014 from belt 2013 which in turn is driven by pulley 2012 on the motor 2010. The forms are maintained in engagement with the belt 2060, idler rollers 2006. The right most roller 2017 is mounted on a common shaft with a smaller pulley 2019 which in turn drives the drive belt 2030. This drive belt 2030 in conjunction with pulley 2021 positively drives the creasing rollers 1090 and 1092 while simultaneously driving pulleys 2026 which are drivingly connected with the outfeed receiver rollers 1026. Thus, the motor 2010 operates all of the folded form transporting system from the folder output to the stacker tray input.

FIG. 40 shows a top view of the folded form ejector mechanism for receiving the folded forms from the form transport belt 2060 and for positively moving or ejecting these forms into output stacker trays 1111. Photo-electric sensors EH for the ejectors 2100 sense the presence of folded forms. The system does not automatically reject forms with cards in them but typically will automatically reject a form that does not have cards in it—e.g., where there is no account number on the form, such as at the end of a run or the like, and therefore the machine is just discarding needless forms. Forms with cards are rejected only under operator control as a result of some error mode having been initiated by the computer system, or by direct operator intervention.

When forms with cards in them are sensed by either of the two ejector photoelectric sensors EH in FIG. 40, the correct one of the pair of ejectors 2100 corresponding to the selected output tray is selected will be properly actuated. Forms are advanced on the belt 2060 from the folder outfeed and creasing rollers 1090, 1092 toward the pair of ejectors 2100. There the output of the photocell for the selected one of the two output stackers 1100 is monitored to detect that a form has entered into its respective area. When the form is detected, the rotary solenoid of the selected ejector lifts the eject mechanism to align the form track with the corresponding output stacker tray. The form is then fed from the ejector mechanism into this selected output stacker tray. Photocells HH (FIG. 44) are present in the eject station to sense the transfer of forms to the output stacker. If a form detected as entering the ejector mechanism by photocell EH is not detected as entering the corresponding stacker tray by its associated photocell HH the system will indicate outfeed error and go into the outfeed error mode.

The outputs of those same ejector photocells HH also cause an advance mechanism in the output stacker trays to be advanced another step in order to move the previous forms towards the front of the tray, as well as moving the immediately ejected form forward in the tray. This structure is of the "walking beam" type in order to provide proper positive form stacking. After whichever tray is currently being filled reaches the full point, it then can be removed by an operator after switching the output feed to the other tray automatically or by operator lifting stacking arm 1111 which will indicate to the computer that said tray is not available, and then the full tray replaced with another empty one. FIGS. 41-44 and FIG. 46 show the ejector mechanism and drive therefore. The drive motor 2010 for the folded form transport as well as the outfeed feed rollers is also used to drive the ejector mechanism. Pulley 2012 drives belt 2013, which in turn drives pulley 2014, shaft 2015, and driven pulley 2016 for in turn driving the round belt 2060 which directly engages with the folded forms and transports them in conjunction with the idler pulleys 2006. Secured adjacent to pulley 2012 and affixed to the same motor shaft, or even integral with pulley 2012 is another drive belt pulley 2112. This pulley drives round belt 2177 which in turn drives pulley 2176 affixed to rotatable shaft 2175. Suitable idler and tensioning pulleys 2178 on a support 2179 keep belt 2177 under suitable tension. Rotatable shaft 2175 has affixed thereto ejector outfeed belt drive pulleys 2174. These pulleys 2174 in turn drive belts 2170 and idlers 2172. Each ejector moves the forms from the folded form transport belt 2060 up into contact with belts 2170 where they are in turn ejected into the respective stacking trays.

Figure 41:
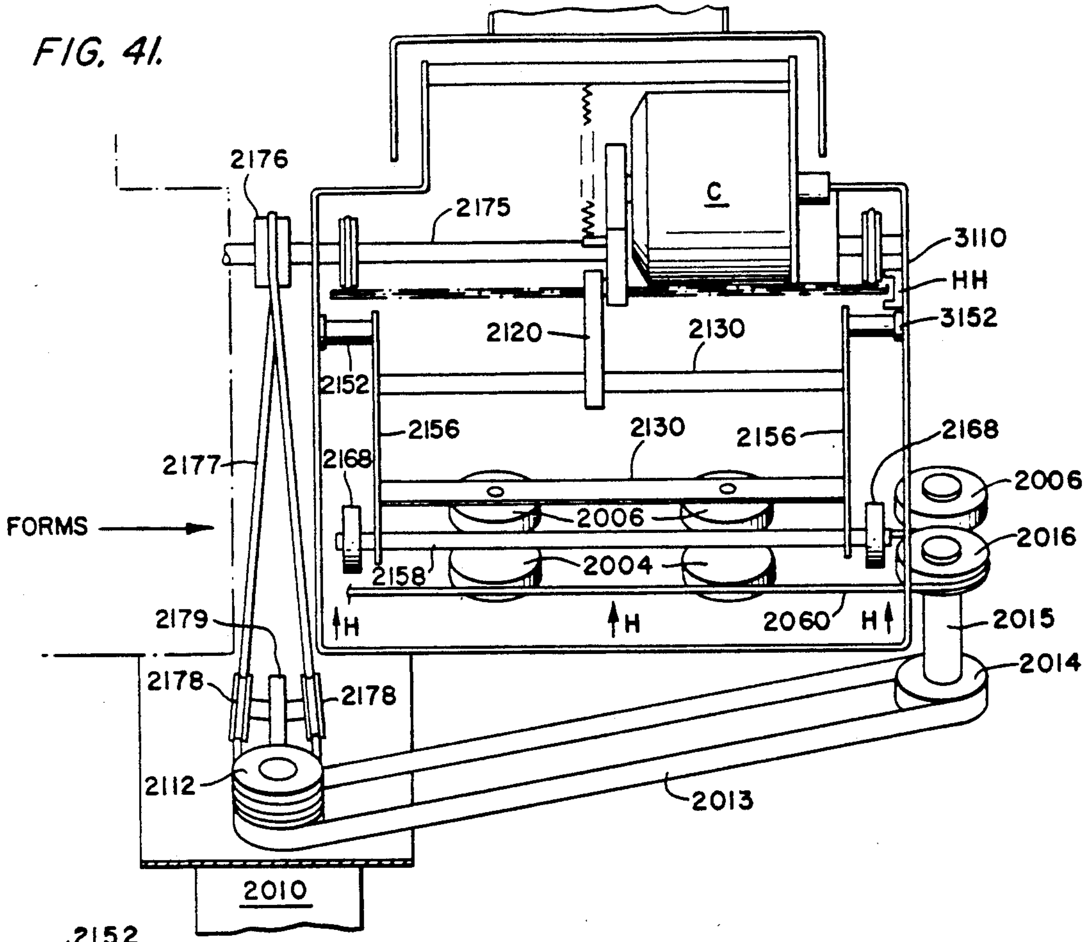
FIG. 41 is a rear elevational view of the ejector feed which receives folded forms from the outfeed transport and ejects same into the output stackers as viewed from the left of FIG. 44.
Figure 42:
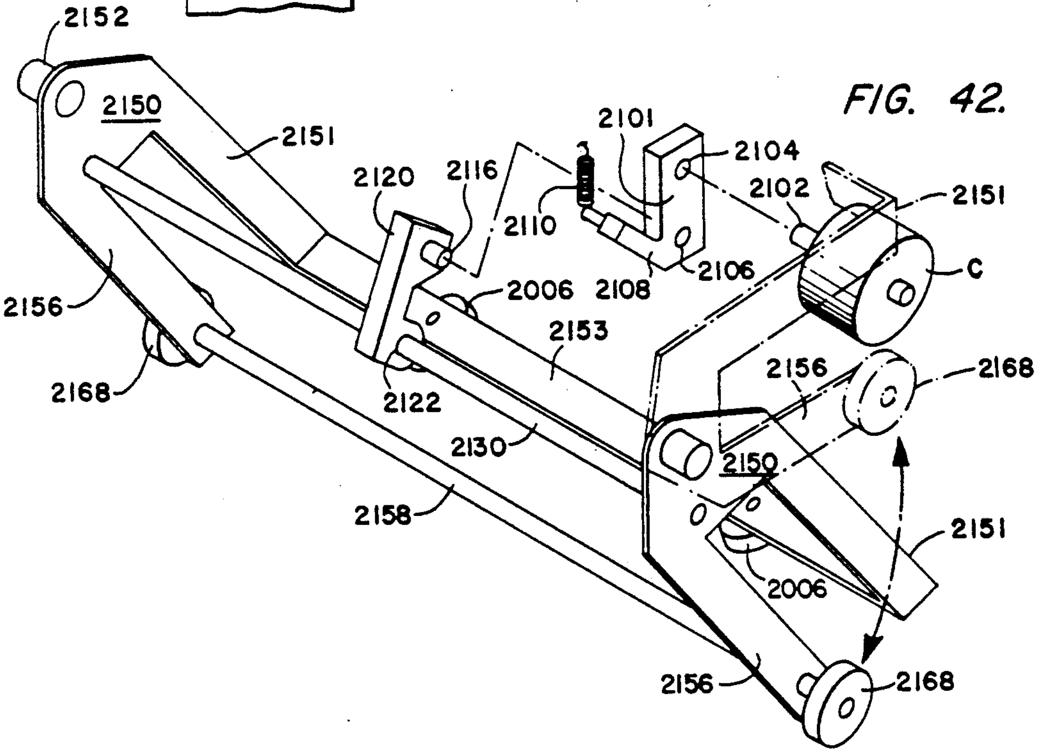
FIG. 42 is a perspective, exploded view of the actuating mechanism of the folded form ejector.

The portion of the ejector mechanism which moves the respective folder forms from transport belt 2060 up to engagement with ejector belts 2170 is best seen in FIGS. 41 and 42. Two inverted U shaped members 2150 have pivot pins 2152 extending from the closed portions thereof, while the open end 2151 of each member is connected by plate member 2153. Supported upon this plate member are two idler rollers 2006. From the opposite open legs 2156 of the inverted U members is supported a shaft 2158. This shaft 2158 is provided with form engaging idler rollers 2168 at each end thereof. In order to be able to pivot the double U shaped mechanism just described about the pivot pins 2152, another rod 2130 is provided a short distance from the pivot points for actuation by a link member 2120, suitably pivotally mounted on shaft 2130 by means of an aperture 2152. The other end of this linkage has a pin 2116 extending laterally therefrom for engagement with the aperture 2106 of actuating link 2101. Actuating link is in turn affixed by means of aperture 2104 and suitable lock and set screw structure to the output shaft of the rotary solenoid C. This rotary solenoid when energized actuates link 2101, and when de-energized returns same by use of a suitable return spring 2110. Spring 2110 is connected at one end to a suitable pin from the extension 2108 on member 2101 and the other end thereof is fixed.

FIG. 41 shows how this mechanism of FIG. 42 is supported from the basic support structure 2110. The pivot pins 2152 are suitably mounted in pivot support bearings 3152 on the support frame 3110. FIG. 41 is the view from the back of the ejector mechanism as taken along 41—41 of FIG. 44. When a properly folded form reaches a position on the transport belt 2060 between pulleys 2004 and idler pulleys 2006, the photoelectric sensor H for that station and position of the form will provide a signal to energize rotary solenoid C to pivot the ejector mechanism of FIG. 42 about the pivot pins 2152. Rollers 2168 then will engage the respective ends of the folded form and lift same quickly up into engagement with the ejector outfeed belts 2170. As best seen in FIG. 44, in the dotted line showing of the rollers 2168, when the folded form reaches this upward ejector position, and because of the rapidly rotating pulleys 2172 and 2174 with the ejector outfeed belts 2170, the form will be ejected into the stacker tray 1101. Dash pot 2190 is connected to the rotary solenoid linkage mechanism 2101 and 2120 to damp (shock absorb) the movement thereof.

FIG. 44 also shows the switch SW for actuation by the tray rod 1111 as described earlier. In conjunction with this electric switch SW is the photosensor device 1154 mounted on support 1156, which senses reflection of light from the forms at the back of tray 1101 as indicated by dotted lines A in FIG. 44, and also reflection of light from the back side of the movable plate 1150 attached for pivotable movement at 3158. Spring 1158 biases plate upward when the rear of tray 1101 is not in the position shown, i.e., the tray is removed. This plate 1150 is provided with a window 1152 as best seen in the enlarged view of FIG. 45. Thus, the photosensor device 1154 will sense when a tray is full of stacked forms, as well as sensing when the tray 1101 has been removed.

The end of lift rod 1111 closest to the ejector mechanism is connected to a spring 1113 which in turn is connected to a pivot block 1115. This pivot block 1115 is pivotally mounted at a pivot point 1117. A stationary pivot point 1119 for the lift rod 1111 completes this over-center type control for the lift rod. Thus, with this mechanism, the lift rod 1111 will stay in either its closed position just above the tray as shown in solid lines in FIG. 44, or the dotted line position to permit tray removal and also to properly actuate the switch SW. With the tray removed the light reflecting plate 1150 will lift, and a light-reflecting surface on the back of plate 1150 will be placed in the line of sight of the LED 1154, producing an apparent tray-full output indication. As before noted, the outputs of the LED 1154 and the switch are logically related to provide a tray-unavailable indication, whether due to tray-full, -missing, or other condition.

Figure 47:
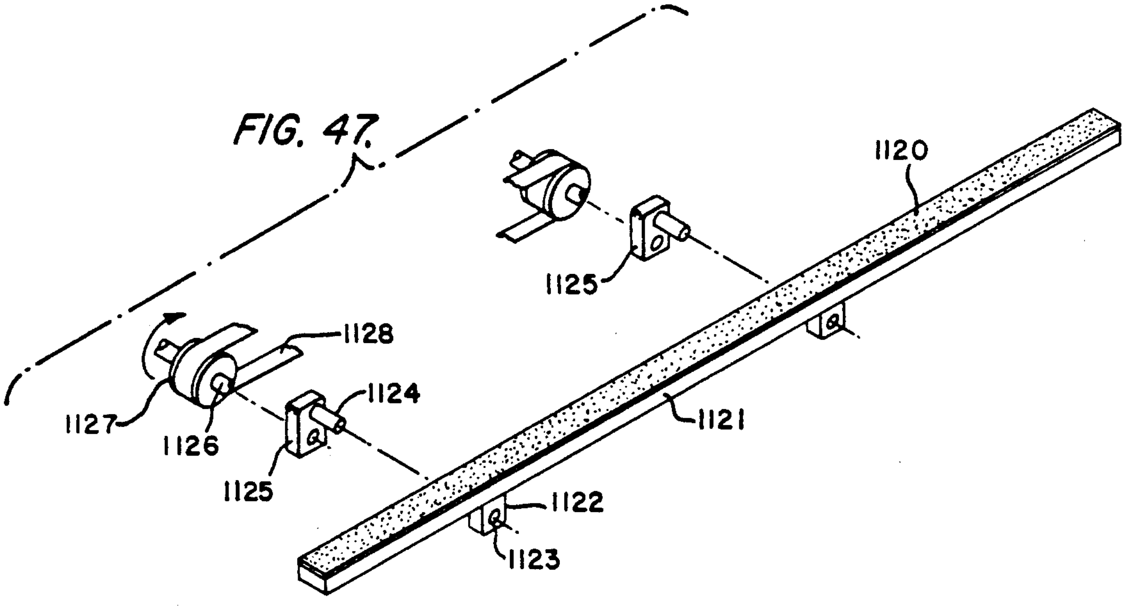
FIG. 47 is a perspective, broken-away view of the output stacker tray form advance mechanism.

In order to ensure that the folded forms as ejected into the end of the tray at the rear of the machine will be moved toward the front of the tray in a positive manner, mechanism as best seen in FIGS. 44 and 47 is provided. This mechanism consists of saw tooth like projections 1104 provided in the tray bottom itself which function in conjunction with walking beam structure 1121. This walking beam structure, at least two per tray, but more may be provided if desired, is actuated so as to alternately lift and then drop the bottom edges of the folded forms 522. A high friction surface 1120 is provided on the top of each walking beam 1121. Members 1122 extending from the bottom of each member 1121 through suitable holes 1123, eccentric members 1125 having pins 1124 to complement with holes 1123, and driven shafts 1126, alternately lift and move forward each of the walking beam members 1121, 1120 A belt 1128 and rollers 1127 suitably connected to drive motor 1130 effect the walking beam action. As can be visualized by looking at FIG. 44, as the bottom of the forms 522 are lifted, moved forward, and then dropped, the saw tooth edges 1104 in the tray bottom will prevent the backward regression of the forms and maintain same in position as moved toward the front of the tray. Thus the tray can be completely filled and stacked with the folded forms in a positive secure manner. FIG. 44 also shows that the window plate 1150 has associated therewith a spring 1158 to assure operation of this part of the mechanism.

As noted in FIG. 40 and also as indicated schematically in FIGS. 41 and 43, appropriate photoelectric sensors H are provided at numerous points along the folded form transport path, in order to detect the presence and absence of forms at these various points and provide outputs to the computer for monitoring and control purposes.

Figure 48:
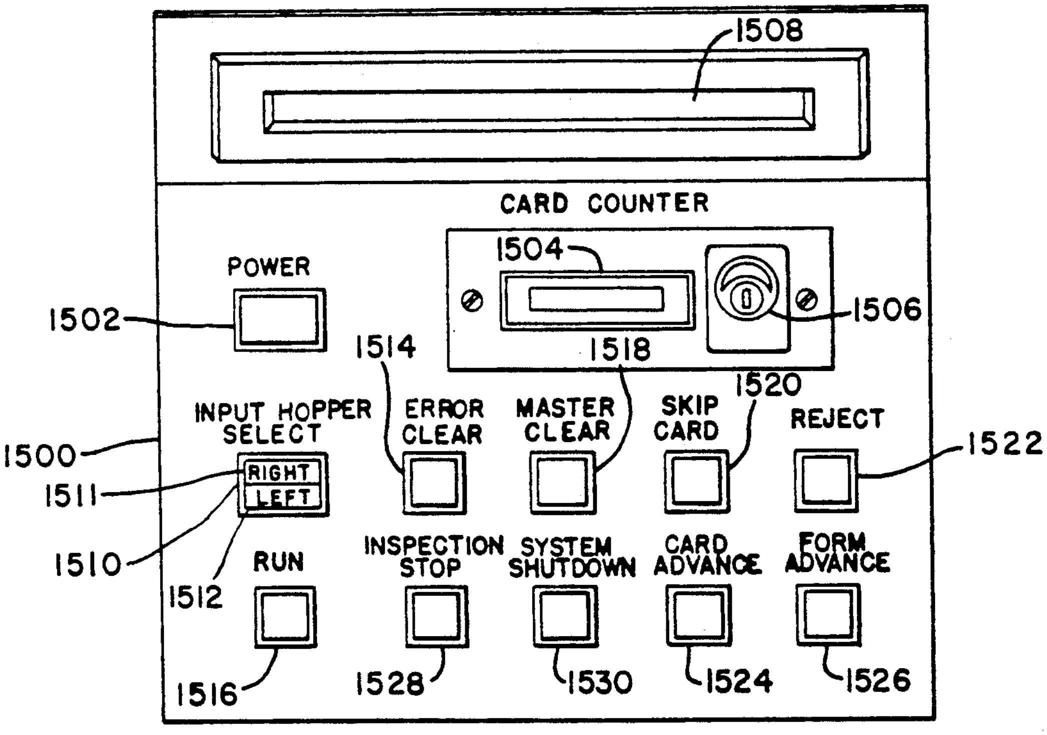
FIG. 48 is a detailed, plan view of the control panel 1500.

FIG. 48 shows the control panel 1500 in greater detail. Power switch 1502 is depressable to provide on/off power control, its indicator illuminating when power is "on". All of the pushbutton switches 1510 through 1530 are momentary pushbutton switch/indicator devices which typically illuminate when the button is pushed or as well may be illuminated by automatic computer-controlled operations typically in a situation requiring some operator intervention. The various pushbuttons place the system into various modes, which, generally, may also be entered automatically by the system during operation as a result of various conditions to be discussed. Accordingly, reference will be made concurrently to FIG. 48 and to the mode chart of FIG. 49 in the following CARD COUNTER display 1504 indicates the number of cards which pass through the ECR reader 400 and enter the insert module 700. Switch 1506 permits manual reset of the card count. Display 1508 provides a 32 position single line alphanumeric display of various messages hereinafter discussed. INPUT HOPPER SELECT switch 1510 includes dual indicators 1511 and 1512 which are illuminated selectively in accordance with the selection of one of the left and right input trays 110 and 112 as seen in FIG. 1; the pushbutton switch 1510, upon entering permits manual override of the automatic selection of the left hopper by the system, as above described.

A horn or other audible sound producing device is caused to sound as a warning for various error conditions. In addition, a message is provided in display 1508. For example, if the input trays 110 and 112 are empty, the horn will sound and the display will indicate the message "HOPPER ERROR".

The ERROR CLEAR pushbutton switch 1514 includes an indicator which illuminates to indicate detection of an error or an input/ouput condition requiring operator attention; such a condition causes the horn to sound and the display to provide a message to the operator for assisting and correcting the condition. Depressing pushbutton 1514 once deactivates the horn, permitting the operator to clear the error.

A minor error is correctable by operator intervention without either the error or the correction thereof by operator intervention so disrupting the system that re-initialization is necessary. For example, empty/full conditions of card input/stacker output trays can be remedied readily by the operator; as well, data-match errors typically are correctable by operator intervention, the operator by manual controls, to be described, re-establishing the proper, matching form/card sequence. The inserting operation then is resumed by depressing ERROR CLEAR pushbutton 1514 a second time.

A major error, discussed more fully hereinafter, typically arises due to jamming of forms or cards, and typically requires, after operator intervention to clear the error, that the system be re-initialized as in an initial master clear mode of operation. Herein, the operator depresses the ERROR CLEAR pushbutton 1514 a second time, which master clears the system, and then depresses the RUN button 1516.

For the special case of a data-match error, depressing ERROR CLEAR button 1514 deactivates the horn and puts the system in the inspection stop mode. The display 1508 indicates the account number of the last card read. The operator must resynchronize the cards and forms, after which the inserting operation is resumed by depressing the RUN button 1516.

The MASTER CLEAR pushbutton 1518, when depressed, initializes the system logic, rejects all forms in the burster/folder stations 800 and 900 and all cards in the card transport 300, and repositions the fan fold paper 510 at the load point in the transport station 500. Any cards remaining in the insert module 700 must be removed manually.

Holding the MASTER CLEAR pushbutton 1518 depressed freezes all system functions until it is released; its indicator is illuminated by the system being in the master clear mode. Master clear (MCL) is acknowledged in all system modes.

The SKIP CARD button 1520, when depressed, enters a "phantom" card into the next available position in the insert module. All cards in the card transport 300 remain in place. Its actuation is acknowledged in the inspection stop mode; its function is for resynchronizing the cards with the forms, and it works only until all necessary cards have been placed in the insert module.

REJECT pushbutton switch 1522 is used in conjunction with either the CARD ADVANCE button 1524 to reject a card currently at the card inspection station 450, at the output side of the card reader 400, or with the FORM ADVANCE button 1526 to reject the double width form under the inspection window 720. The forms are rejected into the forms reject bin 1200 either after RUN or FORM ADVANCE buttons 1516 and 1526 is depressed. The REJECT indicator 1522 illuminates when the selected one of the second switches, 1516 or 1526, is actuated. Reject is acknowledged in the inspection stop mode.

RUN pushbutton 1516, when depressed, starts or resumes the inserting operation and puts the system in the run mode. Run is acknowledged in the ready mode in which the display 1508 indicates "READY . . . HOPPER SELECTED" and in the inspection stop mode. Depressing RUN button 1516 while the system is in the run mode with cards being fed into the insert module and releasing same as soon as the insert pins 732 move down toward the cards, interrupts the insert cycle just before the insertion operation and allows inspection and adjustment of the insert mechanism. Depressing RUN button 1516 again resumes the cycle.

INSPECTION STOP button 1528, when depressed, halts the inserting operation and positions the double width forms under the inspection window 720 to allow the operator to visually verify that the information on the pre-addressed form matches the information on the cards inserted in the form. When a data-match error occurs, the system goes into the inspection mode automatically when the ERROR CLEAR pushbutton 1514 is depressed. The inserting operation is resumed by depressing RUN. Both upon depressing button 1528, and upon the automatic entry into the inspection stop mode, the indicator of the button 1528 is illuminated.

SYSTEM SHUTDOWN button 1530, when actuated, terminates the inserting operation and clears all completed forms from the system. Picking of cards 102 ceases, and any cards remaining in the transport 300 are inserted into the proper forms; if necessary, additional cards are picked to satisfy the requirements of the forms in the insert module. All completed forms, including those in the insert module at the time of depressing the SYSTEM SHUTDOWN button 1530, are burst, folded, and fed into the selected output tray and the fan-fold forms 510 are advanced to the load point. The indicator illuminates while the system is in the system shutdown mode and extinguishes when the above operations of that mode have been completed. System shutdown is acknowledged in the run mode and the input hopper empty condition (wherein display 1508 indicates HOPPER ERROR) of the error mode.

CARD ADVANCE button 1524 advances each card by a prescribed distance to a next successive position in the card transport 300. The card at the card inspection station 450, at the output side of the card reader 400, is moved forward and either placed in the insert module 700 or rejected (if REJECT button 1522 was previously depressed) and another card is fed through the card reader 400. Actuation of the CARD ADVANCE button 1524 is acknowledged in the inspection stop mode. Its function works only until all necessary cards have been placed in the insert module for the associated form.

The actuation of the FORM ADVANCE button 1526 is acknowledged in the ready mode (display indicates READY . . . HOPPER SELECTED?) and in the inspection stop mode. Depressing the FORM ADVANCE button 1526 with the system in the ready mode moves the forms (one form length) to the next top-of-form position, and bursts, folds and feeds one set of forms into the forms reject bin 1200. In the ready mode, the function may be used as many times as desired. Depressing FORM ADVANCE button 1526 with the system in the inspection stop mode moves the forms that are visible through the inspection window 720 either into an output tray 1101 or 1102 or into the forms reject bin 1200 (if REJECT 1522 and FORMS ADVANCE 1526 were previously depressed) and advances the next double-width form by a predetermined amount (one-third of the form length) to the inspection window. This form must be completed by using the CARD ADVANCE and SKIP CARD functions. In the inspection stop mode, FORM ADVANCE may be used only once.

The display 1508 provides indications of various normal and/or error conditions occurring during operations, and instructions to the operator. The previously noted message, "READY . . . HOPPER SELECTED?", indicates the system is in the ready mode, ready to begin or resume the inserting operation. Depressing RUN button 1516 causes the system to start, or to resume, operations. Other operator actions may be performed by depressing of appropriate buttons, such as selecting the input hopper for overriding the automatic selection, advancing and thereby rejecting one set of forms, initializing the system logic by depressing MASTER CLEAR thereby to reject forms in the burster/-folder, to reject all cards in the card transport, and to reposition the paper at the load point. In the run mode, the display indicates the number of cards to be inserted in each half of the double-width form in the insert module 700.

Various minor error conditions are displayed. "NO PAPER" may indicate the lack of forms or improper loading or jamming of forms. "HOPPER ERROR" indicates, variously, empty card input trays 110, 112, card jamming, or improper positioning or operation of the input hoppers. "STACKER FULL ERROR" generally indicates that neither of the output trays 1101, 1102 is ready to receive forms, which may result either because the trays are full or due to improper positioning of the trays, jamming or similar circumstances. "PICK ERROR" may indicate that a card is stuck in the tray 110 or 112 or jammed in the picker throat area 231–234 of the card transport 300. "OUTFEED ERROR" indicates that a form did not exit all three areas of the outfeed mechanism and thus that a form may be jammed variously in the folder 900, the folder outfeed mechanism 1000, or the ejector mechanism 2100 to the output trays 1101, 1102. "TRANSPORT ERROR" indicates there are more than five cards in the card transport 300 between the card pick 200 and the insert module 700, usually a result of jammed cards.

"DATA-MATCH ERROR" signifies that the data read from a given card does not match the data read from the intended, associated form. In this error mode, the form is advanced to the inspection station, the card just read remains at the card inspection station, and the display displays the account number of the last card read. A question mark in the account number shown on display 1508 indicates that the reader was unable to read the number in that position. This is one source of a data-match error. The card reader 400 as well may have misread the data on the card. Likewise, the OCR form reader 611 may have misread data on the form. A card may be missing from the sequence, or an extra card present. In general, the operator compares the account numbers of the forms under the inspection window 720, the card at the inspection station 450, and that shown by display 1508 to determine the action required. If a card is missing, SKIP CARD 1520 button is depressed to electronically insert a phantom card into the next available position in the insert module, and CARD ADVANCE 1524 is depressed once for each card required to complete the double-width form under the inspection window. If an extra card is present in the sequence, it is rejected and then the CARD ADVANCE button 1524 depressed once for each card required to complete the double-width form under the inspection window. Here, the extra card may be one out of sequence or an extra card for the prior, already completed form now already beyond the burster and into the folder. Since the error occurred as a result of that extra card not matching the form currently in the inserter, the operator control essentially manually completes that present form by overriding the system error mode which had terminated inserting activities.

An extra form causing the error, i.e., one for which no cards are available, is rejected by depressing REJECT 1522 and then FORM ADVANCE 1526—this attaches a "reject status" to both double-width forms at the inspection window, and they are rejected into the reject bin 1200 after the run mode is resumed. The reading of data from a card or a form as well can be overridden where the account numbers in fact match, by manually depressing CARD ADVANCE button 1524 once for each card required to complete the form. Following these operator override controls, by depressing RUN 1516, the system may resume the run mode.

An OCR data error display indicates an error in the data format or an invalid character as actually read, and the operator restarts the system for re-reading the forms. If the error occurs again, the operator inspection procedures are followed. If the match is satisfied, the operator manually supplies the necessary actual or phantom cards under controls as above discussed; if not, the error and reject operations are followed.

An "OCR ERROR" display indicates that the OCR reader 400 did not complete reading a form, which can arise due to jamming of the forms or the OCR reader itself.

All of the foregoing errors are characterized as "minor errors". With the majority of these errors, the operator undertakes the necessary steps to supply cards or forms, or correct whatever other conditions exist which caused the error.

"FORM ADVANCE ERROR" and "INSERT-/BURST ERROR" are designated major errors; in the first, the paper transport was unable to complete a form advance because of form jamming at a location between the load point and the folder whereas the latter error arises due to jamming of cards in the insert module or of a form in the burster. The operator takes the necessary corrective steps, and then must reinitialize the system before system operation can be resumed.

Figure 50:
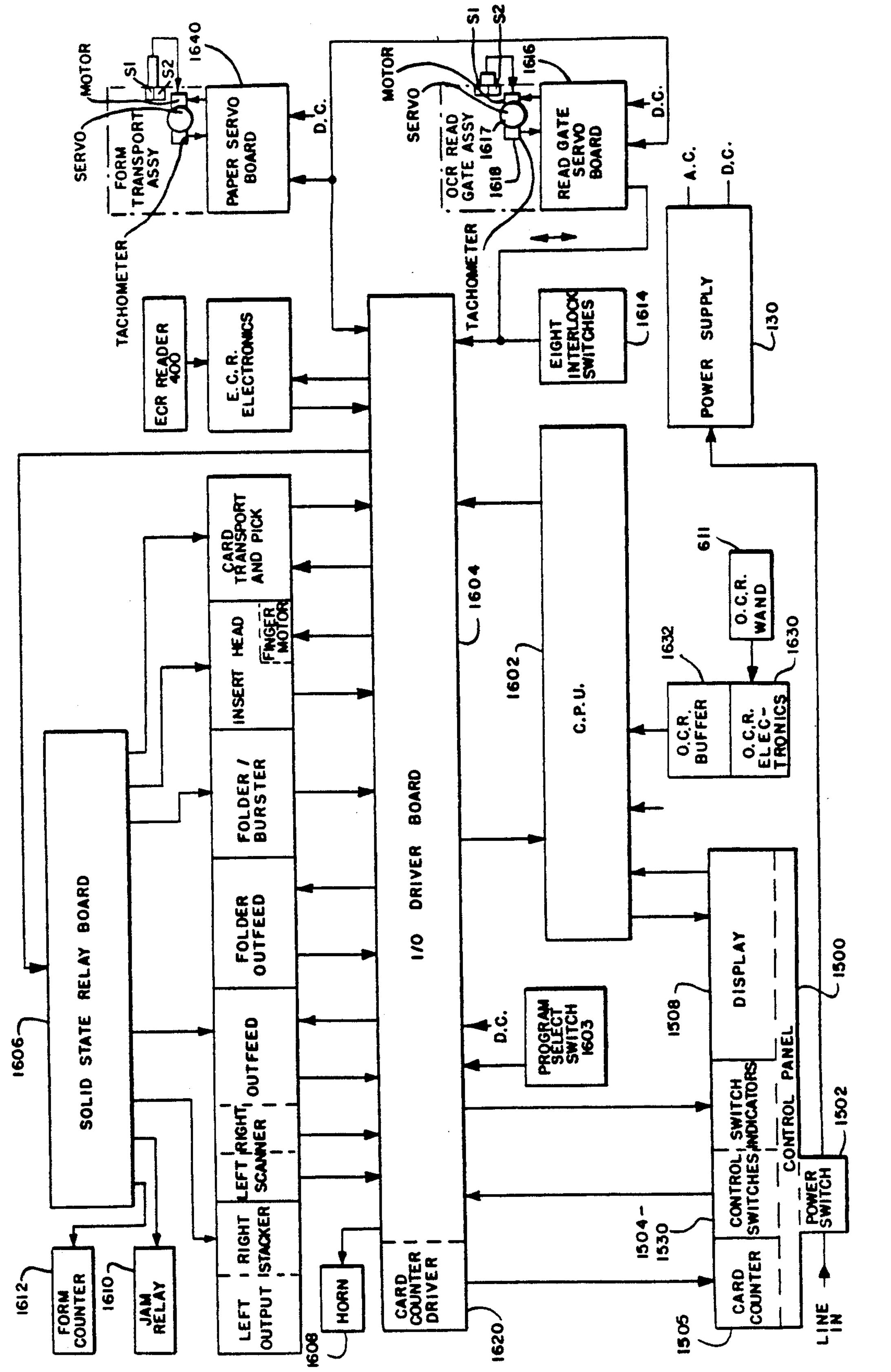
FIG. 50 is a detailed block diagram of the system electronics, computer, control, and sensor devices and subsystems.

FIG. 50 is a general block diagram of the system of the invention; by way of comparison to FIG. 2, FIG. 50 emphasizes the structural organization and interrelationship of the various subcomponents of the system. The labels in the various blocks and the identifying numerals correspond to those elements and subcomponents of the system previously discussed. FIG. 50 illustrates the interconnections and communication paths between the central processing unit (CPU) 1602 of the computer, previously generally referenced by the numeral 1600 and the various subcomponents of the system, particularly by means of an input/output (I/O) driver board 1604 which in turn communicates through a solid state relay board 1606 with various specific subcomponents. Program select switch 1603 permits selection of any of various programs, which afford differing types of system operation. As later shown, when set, e.g., to =0, the data-match function is selected for governing inserting operations. If set to=1, inserting without data-match requirements is selected. Other programs may be provided for maintenance purposes, such as for selectively and independently operating any of the modules in accordance with their respective operating routines (to be discussed) but without operating the other modules. FIG. 50 specifically shows the horn 1608 mentioned in reference to FIG. 48 and additionally a jam relay 1610, which cuts off A.C. power to drive motors when a jam is detected, and a form counter 1612. The eight safety-interlock switches 1614 (e.g., for power-down upon opening cabinet doors) supply their outputs to the I/O driver board 1604.

The read gate servo board 1616 for controlling the energization of the drive motor 638 for the OCR wand 611 is seen to include a servo loop 1617 and a tachometer 1618 for controlling through the servo board 1616 the energization of the OCR wand drive motor and hence the wand position.

The card counter 1505 associated with the counter display 1504 of FIG. 48 is driven by the card counter driver 1620 of the I/O driver board 1604 for providing the card count display as before referenced.

A suitable power supply 130 supplies necessary levels of AC and DC power to the various operating components of the system.

The OCR wand 611 provides its output to the OCR electronics 1630, in turn, to the OCR buffer 1632 for supply to the CPU 1602.

Figure 49:
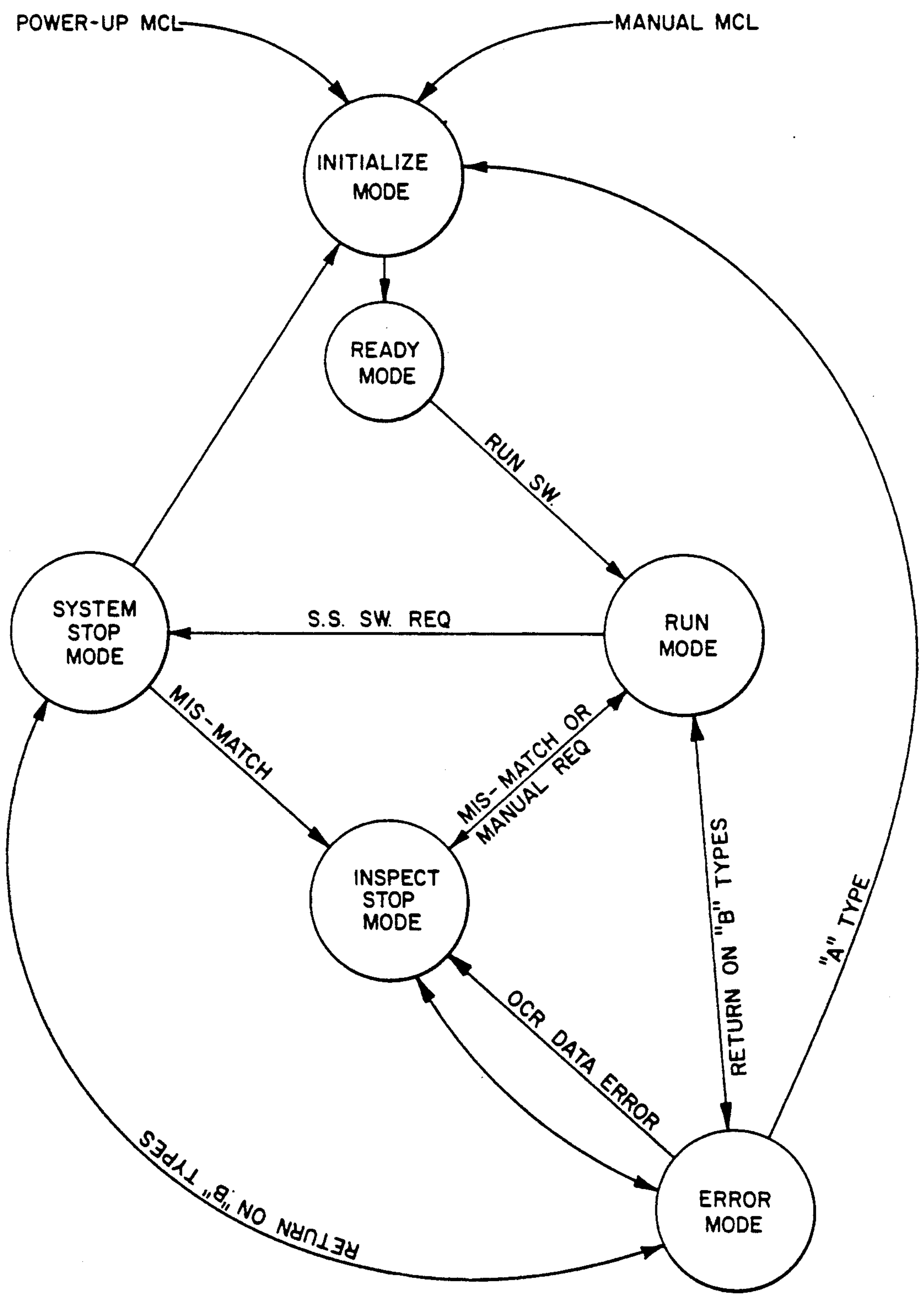
FIG. 49 is a chart of the major modes of the system operations.

FIG. 49, the basic mode interaction chart, defines the major operational modes of the system and as well the manner or sequence of proceeding from one mode to another, and illustrates certain of the basic conditions which cause the system to go from one mode to another mode.

Master clear (MLC), performed automatically upon power up or when selected manually, causes the system to perform certain initialize functions, generally to clear the entire system and to prepare it for normal operation. The microprocessor (CPU 1602) performs various inherent initialize operations which include, for example, initializing its input/output ports, presetting certain software timers and performing other, generally internal, microprocessor functions. The system further performs essentially all operating subroutines, with certain exceptions not here pertinent.

A first initialize operation is to drive the OCR wand reader 611 to its home position, and to clear the OCR buffer 1632.

The inserter head deflection pins 732 are checked for being in their "up" position and, if not, are driven to that position; this function as well closes the bin arms G to their normal bin-defining positions. Likewise, the inserter support fingers 703 are checked as to position and if not in the normal "up" position, are driven there.

The drive motor 501 for the paper form transport system 500 also is driven to a "home" position. With reference to FIG. 12, paper transport motor 501 is driven through its servo 1640 (FIG. 50) so as to position the disc 1510 at its reference position with regard to sensing photocells. The paper sensor microswitch 500SW (FIGS. 7 and 9)—in the form transport station 500 is monitored to determine if any paper is present and, if so, the drive motor 501 is driven through a complete form drive cycle, i.e., sufficient to reverse transport the form strip 510 by one complete form length, until such time as no form 502 remains in the inserter head and the paper transport drive system returns to the top of form condition. If a supply of forms 510 in fact is in the system, this initialize operation results in the top of the first form 502 moving to the load, or alignment position 1502 seen in FIG. 9.

The CPU/microprocessor 1602 also operates all remaining paper transport mechanisms, e.g., the burster 800, folder 900, outfeed 1000 and output transport 2000 mechanisms, as well as the card transport mechanism 300, to clear any forms or cards from the system. Certain components as before described, e.g., the burster 800, if not at the home and instead at some intermediate position, at power-up, inherently will cause energization of the respective drive motor and driving of that component to a home position. Similarly,.the drive motor for the support fingers of the insert head inherently will be energized if at an intermediate position at power-up, driving the fingers to one extreme or the other and if that extreme is not the "up" position, will be driven to the "up" position. Any forms or cards, whether separate or already assembled, if within the system at power-up, will be passed inherently to the respective output reject hoppers, since the system as yet is not capable of providing a positive indication that correct data-match operations occurred as to those forms or cards.

As a final function in the initialization mode, the CPU 1602 checks the state of the form sensor microswitch 500SW in the form transport system 500; if forms are present, the microswitch 500SW is closed and provides an appropriate indication. If none is present, the system displays "NO PAPER" and remains in the initialization mode until forms are loaded. This display is not accompanied by the usual alarm/error conditions, since it is merely an indication of the condition at power-up, when typically the operator is still preparing the system.

The automatic selection of the left input card hopper tray 110 also is made during initialization; however, the CPU 1602 does check the status of the INPUT HOPPER SELECTION switch 1510 for responding to manual selection of a hopper tray by the operator. Likewise, the preferential selection of the right output stacker tray is made and that stacker tray tested for readiness to receive, or availability for receiving, completed forms. If the normally first-selected card (left) tray or (right) stacker tray is not ready for use (essentially an error check) the system automatically selects the alternate one, and tests for readiness. If error results from the latter tests, meaning neither of the card hopper/output stacker trays is available, an error condition indication is displayed.

These latter initialization functions result in error indication displays and not errors in the normal operational sense since the system is only in the initialization mode, and hence once the tests are made and the necessary displays provided, the system passes to the ready mode.

The last function of master clear and the initialization mode will be to turn off the master clear light, and the system will exit the initialization mode and enter the ready mode.

In the ready mode, the microprocessor checks for the presence of paper in the tractor of the paper drive by monitoring switch 500SW (FIGS. 7 and 9); if no paper exists the system will display NO PAPER on the control panel display 1508 and remain in the ready mode until paper (forms) are loaded.

If paper is present, the ready mode automatically selects the left input card hopper tray 110 and the hopper is tested for the presence of cards—if none, the system will then automatically select the right input card hopper tray 112. This switching ability is, in essence, the performance of the hopper error test on the left hopper which, if not satisfied, causes selection of the right hopper. If no cards are present in the right hopper either, the "hopper error" display is made; this display, however, is not accompanied by the usual alarm conditions but is merely an indication of the condition. In a similar fashion, the right output stacker is preferentially selected first and tested for its readiness to receive or its availability for receiving forms, and if the error test conditions are not satisfied, the system will switch to the left output stacker; if the left output stacker is as well not available this again will constitute an error condition and a "stacker error" indication will be made. The system, nevertheless, will remain in the ready mode.

Thereafter, the system loops through further tests, checking the FORM ADVANCE switch 1526 and the RUN switch 1516 The FORM ADVANCE switch 1526 permits the operator to advance the forms if desired, such as to accommodate a leader or blank form at the beginning of a supply of fan fold forms being fed into the machine. It would also permit the operator to bypass forms printed with account numbers which the operator knows do not match the first account numbers on the cards available in the hopper.

With the system thus prepared, the RUN switch 1516 is depressed to place the system in the run mode, signified by the run indicator being illuminated.

In the run mode, the display 1508 is cleared (e.g., it previously having been displaying "READY") and the message "HOPPER SELECTED?" is displayed as a reminder to the operator to make a manual hopper selection, if desired, other than the automatic left hopper select of the system. The latter display thereafter is cleared in the run mode, in the absence of any error mode occurring, and the display 1508 displays the number of cards to be inserted into each of the double-width forms currently positioned in the insert module 700.

The first activity in the run mode is to activate the OCR wand reader 611 to read the first form 502, and thereafter to advance that form 502 into the insert module 700 and then return the OCR head 611 to home position.

Figure 51:
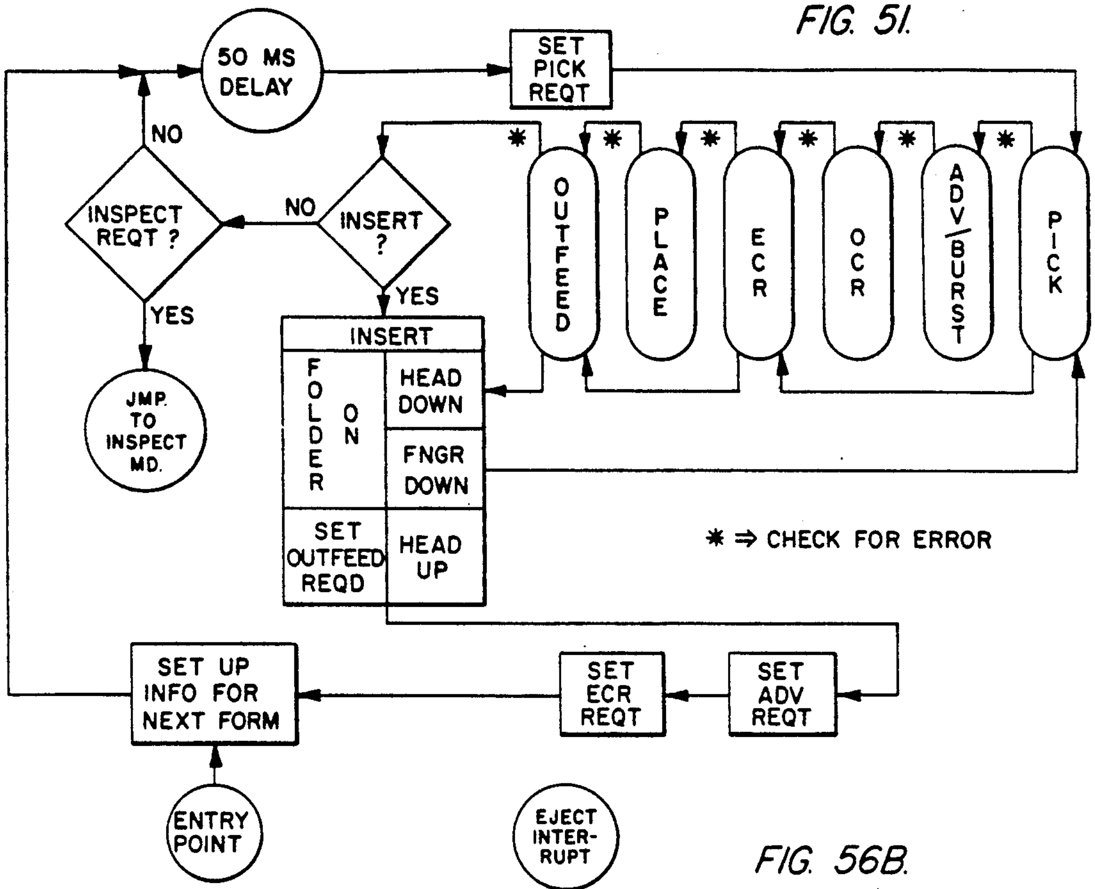
FIG. 51 is a flow chart of the main system loop.

At this juncture, the system is ready to enter the main system loop of FIG. 51 in which the system remains during successful operation. The system and thus the main loop, has a basic 50 millisecond (ms) cycle; this is much slower than the operating cycle requirements of the microprocessor (CPU) 1602 and other control electronics of the system (typically in the range of a few, e.g., 2–3, milliseconds) but is selected to avoid potential problems, such as responding to erroneous, apparent signals produced by contact bounce—i.e., this cycle time assures stablization of system electronics prior to signal processing and generation of controls in each cycle, while being compatible as well with mechanical operations of the system.

The PICK request therefore is set in each 50 ms. cycle repeat of the main loop.

In every 50 ms. therefore, the system enters the PICK module driver routine, automatically setting a PICK request. A PICK operation then will be performed, if other conditions are satisfied. Each of the successive six module driver routines is entered from the preceding one, as indicated, with the "outfeed" routine finally returning to the insert condition question, i.e., "INSERT?". In essence, the module drive routines operate independently, but only if a suitable request is made. The module driver routine, once entered, can perform its operation or control the operation of its associated apparatus, under the assumption that the request is present. As later seen, certain sensed conditions can inhibit the performance of that operation, in which case the system passes immediately out of the routine without performing the usual mechanical function of its associated apparatus.

Recall that in the main system loop, the PICK request is set every 50 milliseconds. Entry into this loop, however, follows the initialization mode in which the first form was advanced into the insert module. As a result, when entering the main system loop, the ECR request is issued for that first form, only, which form as noted was already advanced into the insert module. Accordingly, for this initial operation, the PICK request already exists. The PICK module driver routine is performed, but there is no form ADVANCE request, consistent with the fact that the form is already in the insert module.

The system next proceeds to the OCR module drive routine, wherein it reads the account number from the next form. The system then enters the ECR routine, which is the system "bookkeeper" and determines which card 102 belongs with which form 502. The ECR routine, therefore, receives the OCR data and compares it with the ECR data to determine satisfaction of the match condition as well as determining how many cards are to be supplied to each of the two, i.e., double-width, forms currently in the insert head. Assuming all the necessary conditions are satisfied, the system transfers the information to the "PLACE" routine which will then control the deflection rollers B in the insert module 700 for deflecting the required number of cards into their proper bins L1, L2, R1, R2 of the head aligned with the appropriate apertures on the forms. Since the system is still relating to the first form, the PLACE routine passes directly through the OUTFEED routine (which, since there is no OUTFEED request, has no function at this time) to the insert condition question "INSERT?" which is satisfied based on a number of conditions to be discussed. Assuming that the insert condition has been satisfied, the inserter is actuated, as indicated by the INSERT block, and sets both the ADVANCE request and the ECR request.

The module driver routines are rather complex routines and include many subroutines of their own. An important factor is that any of these module driver routines can be called, assuming necessary conditions are satisfied, in any of the various modes and they do not have to be called in any particular sequence.

The INSERT module driver routine has been broken out for the reason that it is a serial, real time routine and its entire function must be performed before the system can return to any other routine. However, throughout the INSERT routine, the OUTFEED routine is called continuously to take care of any documents which are in the outfeed portion of the system—this includes the receiver 1000 from the folder 900 as well as the transport mechanisms 2000 and the ejectors 2100. If the OUTFEED routine were not called continuously while doing the INSERT routine, the system would have to complete outfeeding of any document before it could begin a new INSERT cycle; this would introduce unnecessary and substantial reduction in overall feedthrough rates of the system. It is in this context that the system is characterized as asynchronous, since the various operating components perform at their own rates somewhat independently of the others but are constantly checked by calling the necessary routines—in this instance, between the INSERT routine and the OUTFEED routine.

Returning to the diagram of FIG. 51, the INSERT routine is shown performing the continuous function of calling the OUTFEED routine for the purposes above discussed; in the detailed view is shown a three segment breakdown in which, in a first portion, the insert module head deflection pins 732 are brought down (simultaneously the bin arms G are opened), in a second portion the card support fingers 703 are brought down (this permits the card 102 now to flatten out and complete its insertion into the form) and in the third section the insert head deflecting pins 732 are brought back up again (likewise returning the bin arms G to a closed position). After the filled form is moved towards the bursting station, the fingers 703 are again raised to the "up" position.

In the first two segments of the insert routine is shown the condition that the folder is on—i.e., a "folder on" command is produced, subject to the condition that when entering the insert routine the photocell in the form inspection area is checked to see whether a form currently is extending beyond the bursting station 800 and into the folder 900 such that it should be folded and therefore requires actuation of the folder—if this condition exists the folder is turned on. Thus, that previously-inserted form proceeds through the folder during the insert operation for the present form. INSERT also sets the OUTFEED REQUEST. The timing relations appear as follows—the insert head down operation (I/H DWN) takes 4/10 of a second and the finger down (FNGR DWN) operation following it takes 2/10 of a second for a total of 6/10 of a second. The folder operation is timed such that if the form was present and has passed through the folder 900, it has been folded and dispensed into the receiver portion 1000 of the outfeed system 2000 by the conclusion of 6/10 of a second.

The set OUTFEED request thus is produced at a time determined insert routine for a given form when the preceding, now folded, form has been deposited into the folder outfeed receiver 1000. The OUTFEED routine deactivates the solenoid C on the receiver 1000 causing its spring-biased loading to shift the receiver guide panels 1005, 1010 in line with the outfeed transport track. At this time the photocells H associated with the receiver 1000 will check to see if the two related forms are present in the receiver 1000.

For convenience, in the following discussion, "form" shall designate the double-width (dual) forms, unless otherwise noted. The ADVANCE routine simultaneously advances the form that received cards in the just-completed INSERT routine and as the next successive form which has just been read in the OCR routine, respectively, to the burster and inserter stations, the top portion of the form in the burster station moreover moving into the folder station 900; the BURST routine severs the latter form at its trailing edge from the top of the new, or next successive, form which is now in the insert station. At this juncture the routines, and thus their operations, repeat.

Certain principle functions of the PICK routine are to monitor the mechanics of the card pick operation to ascertain that a card is picked successfully, to monitor the number of cards actually picked and supplied to the card transport track (for transport to the ECR card reader and ultimately to the inserter), and to time each next successive pick operation (PICK ON). The latter two functions limit the number of cards in the card transport to less than five (5) to avoid card jams which could result from supply of new, successive cards at a faster rate than can be used by subsequent modules.

Figure 52:
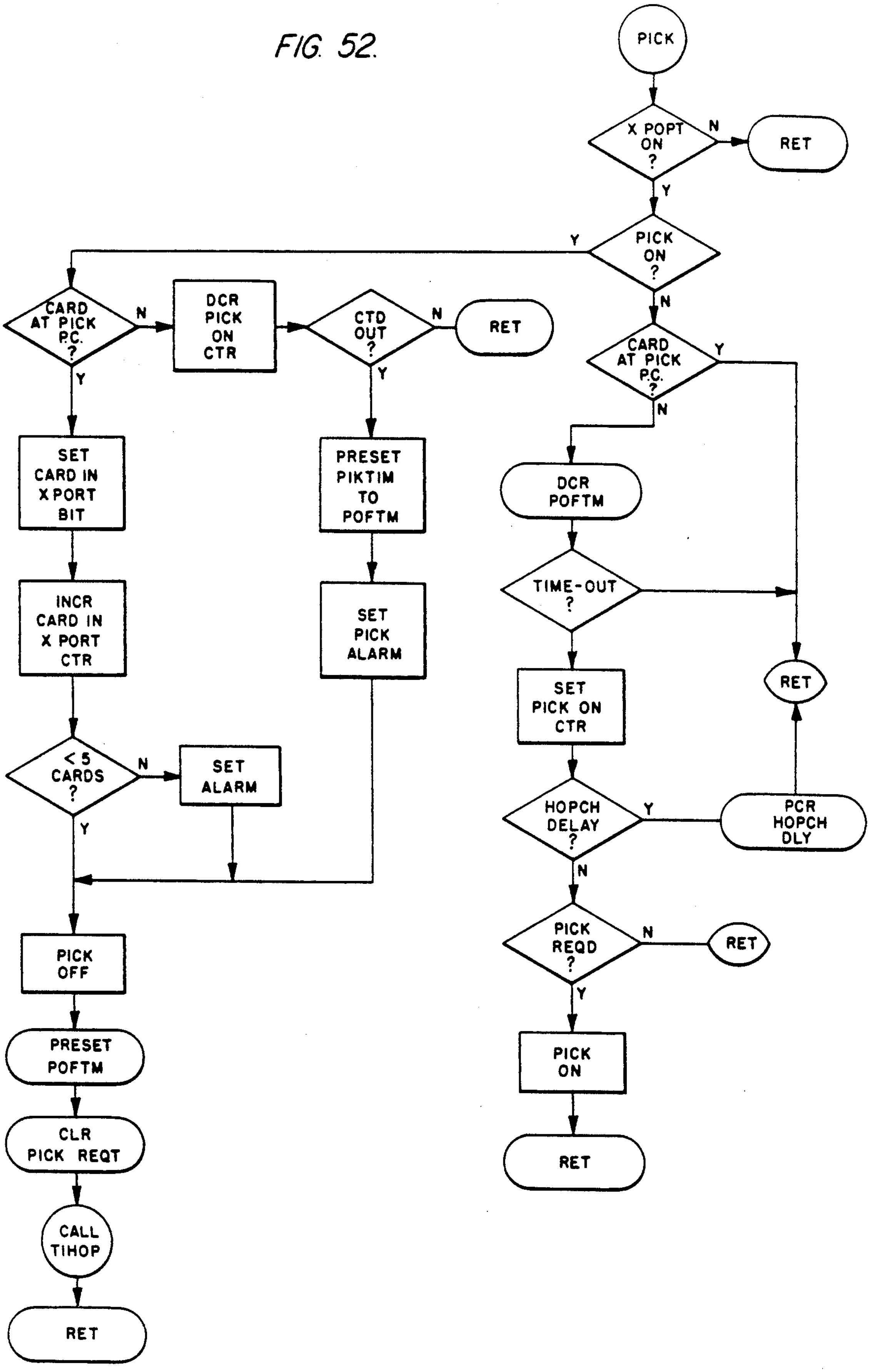
FIG. 52 is a logic flow chart of the PICK routine.

In the flow of FIG. 52, the card transport is normally on and thus the question XPORT ON? normally is answered yes and the question PICK ON? will determine whether the pick mechanism currently is operating. If not, the flow proceeds to determine if the pick should be turned on. Particularly, the question of whether the card is at the pick photocell (CARD AT PICK P.C.?) is asked and, if so, the flow returns. If not, the flow proceeds to decrement the pick off timer (DCR POFTM) and then check to see if that timer has timed out; if not, the flow returns and if yes, the flow proceeds to check if there is a hopper change delay (HOPCH DELAY?) which, if so, causes decrementing of that hopper change delay counter (DCR HOPCH DLY) and the flow returns. The hopper change delay is an automatic function resulting from the system sensing a full output hopper or an empty input card tray circumstance, requiring the automatic switching to the respective, other thereof and imposing a delay which the system automatically accommodates in this hopper change delay function. If there is no hopper change delay, the flow then proceeds to question if there is a pick request (PICK REQ?); if not, the flow returns but if yes, the flow proceeds to turn the pick on (PICK ON) and then returns. The turning on of the pick also turns on the pick on counter which sets the timing for the monitoring function to determine if a card was successfully picked.

Particularly, returning in the flow to the PICK ON? determination, the flow checks for an output from the card pick photocell (CARD AT PICK P.C.) which, if no, causes decrementing of the pick on counter and then checking if that counter has counted out (CTD OUT?) which, if not, causes a return. This circumstance would cover the card having been picked but not yet having moved far enough from the pick mechanism to be detected by the pick photocell. If the counter has counted out, this is an indication of either failure to pick or jamming of the picked card, with failure thereof to enter the transport mechanism, the flow then presetting the pick timer to its normal pick off time count value which will be utilized in the pick routine in a subsequent pick cycle), and setting the pick alarm for the present cycle to indicate this error condition. The flow then turns off the pick (PICK OFF), and clears any pending pick request (CLR PICK REQ) and returns, the system going into an error mode.

Conversely, if the card is detected at the pick photocell, the flow sets a card in transport bit (SET "CARD IN XPORT" BIT) and proceeds to increment the card in transport counter (INR CARD IN XPORT CTR) and then checks if that counter indicates greater than five (5) cards are present in the card transport. As will later be seen, in another routine, that counter is decremented by each card supplied to the inserter. If the count is less than five (5), the pick is turned off, the pick off timer is preset (PRESET POFTM), any pending pick request is cleared (CLR PIC REQ) and the flow returns. The pick off timer, thus set upon each occasion of turning the pick off, establishes the time before the pick can be turned on again. This assures that the proper timing is maintained between the successive picking of cards. As above noted, that timer is decremented on each cycle for the dual conditions that the pick is not on and that a card has not been detected at the pick photocell; only when that counter has timed out, and the further conditions are satisfied that there is no hopper delay and that there is a pick request, will the pick be turned on to pick a next successive card. If the counter has not timed out, the flow loops through the first branch discussed above and on each return decrements the counter until it has timed out thereby to permit turning the pick on to pick a next successive card.

Figure 53:
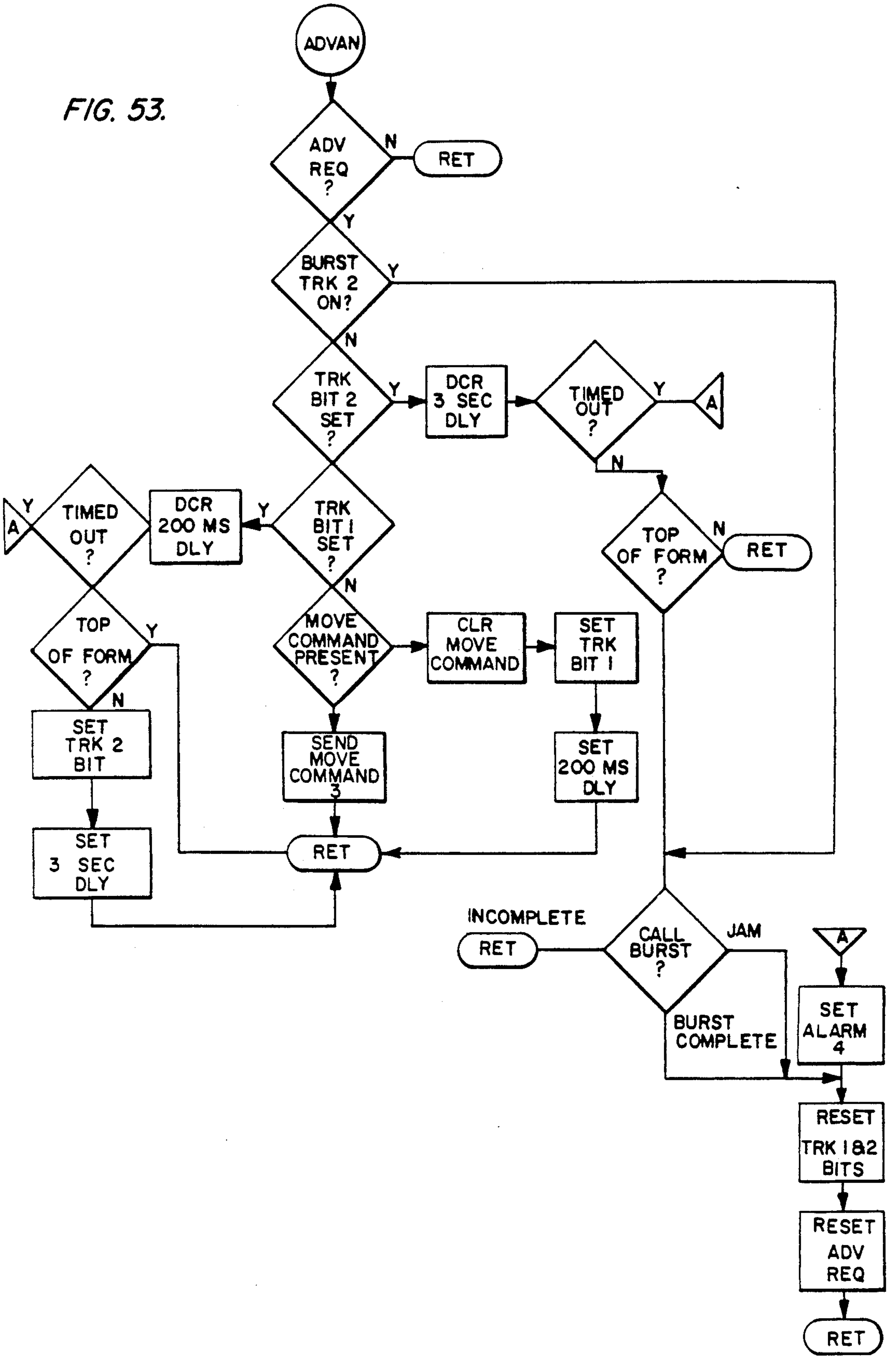
FIGS. 53 and 54 are logic flow charts of the ADVANCE and BURST routines.
Figure 54:
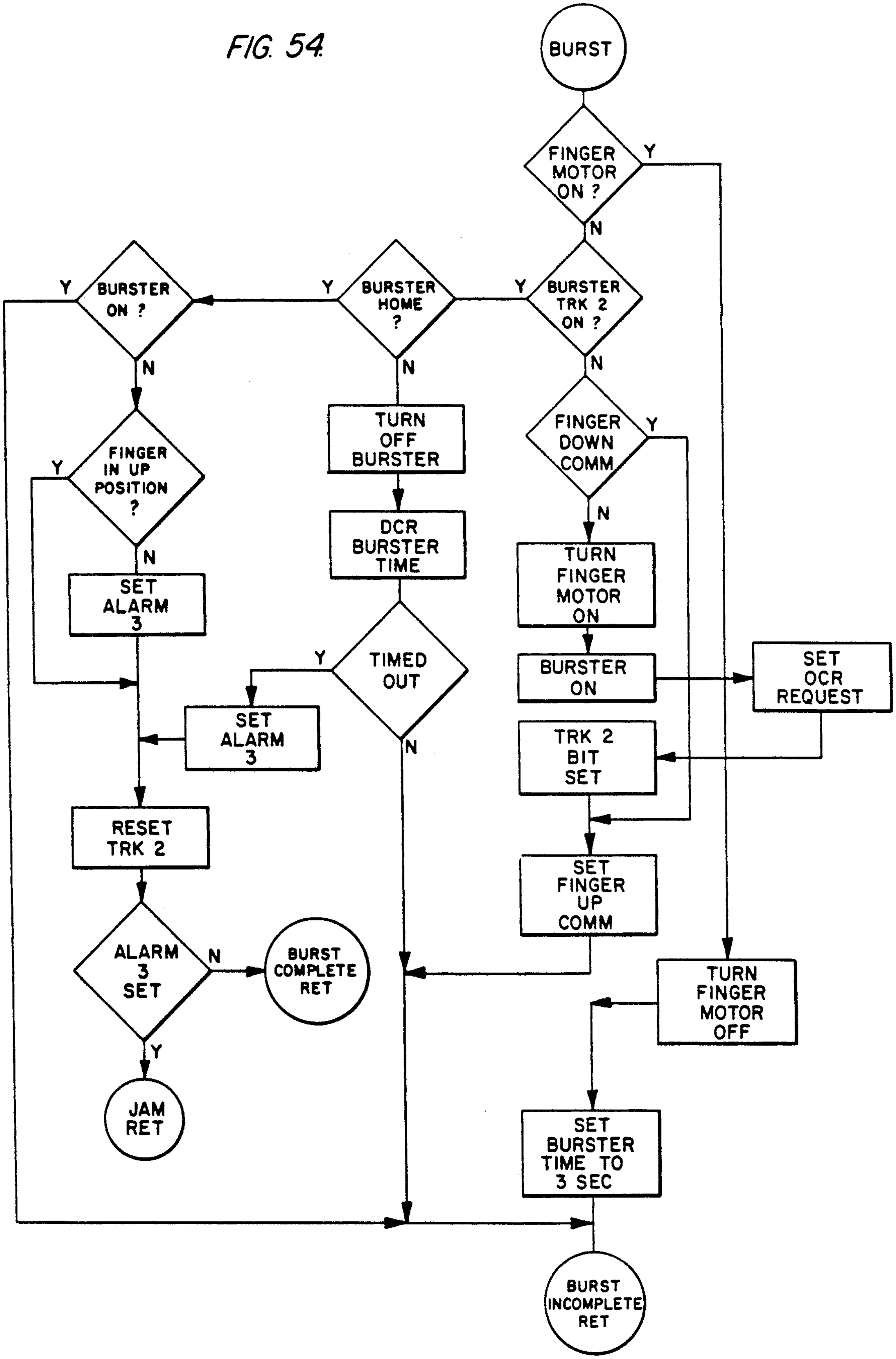

The flow charts for the form advance routine, which also includes the burst routine and some other functions to be described, are shown in FIGS. 53 and 54.

In the main system loop, or any other loops which should desire to call the form advance routine—if there is no advance request you immediately return from the routine. When there is a form advance request, a check is made to see if the burster is on. Upon first initiating this routine, the burster will be off since the burst operation is the second half of this routine, requiring that paper advance be completed. Thus, the flow falls through that question with a no. Next, a check is made to see if a move command is present—there will not be because the system has not initiated move yet, so then a move command is sent (SEND MOVE COMMAND) to move the form strip 510 by one complete form's length and return to the routine.

On the next time the routine is called, 50 milliseconds later, the flow comes down and detects that a move command was sent, thereupon to clear the command out, and also set a 200 millisecond counter (delay counter) and then return. Then on the next time of calling the routine, 50 milliseconds later, the delay counter is decremented and checked to see if has timed out. If it has timed out, the system will alarm, i.e., set an error. If it has not timed out, it will check to see if the form is still at top of form. If it is at top of form, the flow returns. This continues until either one of two things happens; either 200 milliseconds of time have elapsed and correspondingly an alarm is set, or the paper has left "top of form" and is advancing to the next top of form. This timer makes sure that the paper starts to move within the specified period of time.

This top of form just described is really the unique top of form timer disc 1560 of FIG. 12 which is correlated with the paper drive tractors. Upon detecting the form leaving the unique top of form, a 3 second delay is set and the flow returns. Now, the next time the advance routine is called, the 3 second delay is decremented and then checked to see if has timed out. Of course, it will not have timed out yet so a check is made for top of form and if there is no top of form, the flow returns. The flow goes through this leg on subsequent callings of the advance routine until one of two things has happened; either the next top of form is reached or 3 seconds of time has elapsed. If time elapses, the alarm is set: FORM ADVANCE ERROR. Under normal operation the paper will reach unique top of form in approximately 700 milliseconds so that when coming through this leg the 3 second delay will not have timed out; "top of form?" will be "YES", with the flow proceeding to call the burst half of the advance routine which is shown in FIG. 54 of the flow charts.

When the burst half of this routine is called, there are three ways to return from it; either a burst complete return; the jam return, or a burst incomplete return. If the return is on an incomplete status, the flow simply returns to the main system loop and continues to call the burst half of this section every 50 milliseconds whereupon sooner or later, at a subsequent call, either a burst complete return or a jam return will be made.

In FIG. 54, which shows the burst portion of this routine, the first test made is to see if the finger motor 763 is on. Upon the first entry into this routine, the finger motor will normally not be on, so the flow proceeds through the "no" leg of that question. The next thing tested is whether the burster is on; it would normally not be on during the first pass through this routine. The next question asked is, is there a finger down command. During normal machine cycle operation—and on the first pass through the burst routine—there would be a finger down command. The flow therefore goes through the yes leg which in turn sets the finger up command and takes a burst incomplete return. 50 milliseconds later the flow proceeds again to ask is there a finger down command. This time the answer would be no, so the finger motor is turned on, the burster is turned on, the OCR request is set and the finger up command is set. 50 milliseconds later on the next pass through the burst routine, the finger motor will be on so the flow proceeds down the leg to turn the finger motor off, set the burst time to 3 seconds and take a burst incomplete return. 50 milliseconds later on the next pass through the burst routine the finger motor will be off, the burster will be on and so the flow proceeds to test if the burster is home. At this point in time the burster will probably not have left its home position on its way to the other home position so that question is answered yes.

The next thing is to test to see if the burster is on; for this sequence, it is on ("YES") and the flow takes a burst incomplete return. On the next (50 ms.) pass through, the burster will be off home, and the answer is "no." The command is given to turn the burster motor off, but by virtue of the electronics it is kept on until it reaches the home position and covers the home photocell that it is destined for. The burster time is decremented and checked to see if it is timed out yet. This leg of the burst routine is repeated on subsequent passes until one of two things has occurred. Either the burster time is timed out, in which case the flow sets an alarm or the burster will have reached the home photocell that it was destined for. Normally, the latter occurs and therefore the flow proceeds to test to see if the burster is on; if it is not, that question is answered "no" because it was turned on in a subsequent pass. The finger is tested for being in the up position, where it should be by now. If it is not, an alarm is set.

The last test in this portion of the advance routine is to see if the burster/folder alarm was set. If it was set, the flow takes a jam return and if it was not set, a burst complete return. Then the flow returns to the advance portion of this routine, to reset the advance request which signifies that both a paper advance and a burst operation have been completed. If during any of this operation an alarm was set, it would have been recognized upon returning from this routine to the main system loop and processed in the error mode.

Figure 55:
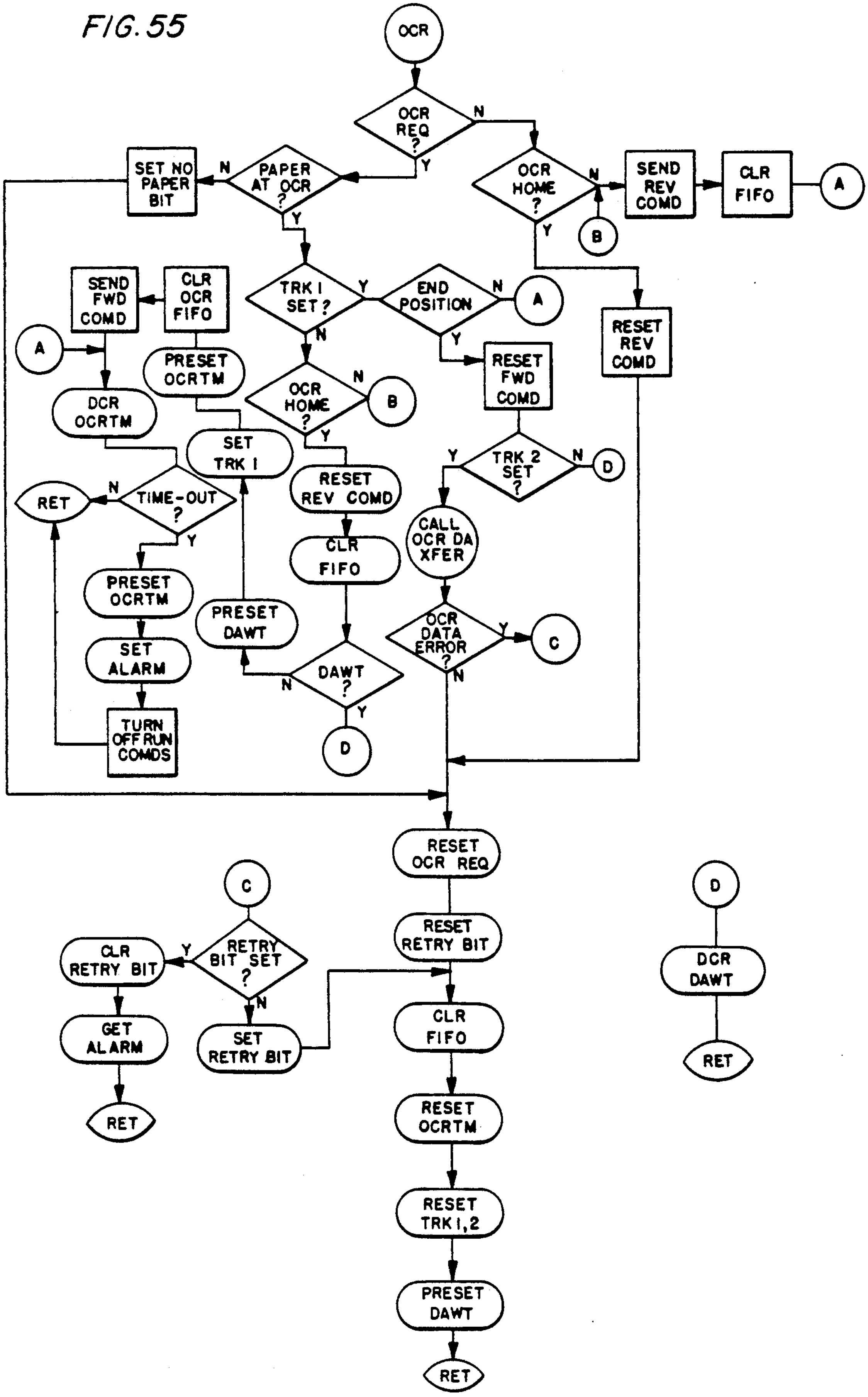
FIG. 55 is a logic flow chart of the OCR routine.

The logic flow chart for the OCR module driver routine is shown in FIG. 55, and operates as follows. Whenever it is called either in the main system loop or any other mode, the first test is whether there is an OCR request. If there is not a OCR request, the routine takes care of automatically assuring that the OCR wand is in the home position; if it is not in the home position, it will send a reverse command (SEND REV COMD) and will continue to try to return it to the home position upon subsequent passes through the routine without an OCR request. The flow proceeds to decrement an OCR timer (DCR OCRTM).

Upon subsequent passes, it will either reach the home position or the OCR timer will time out and an alarm will be flagged or set.

Upon calling the OCR routine with an OCR request for the first time, the flow proceeds to test if there is paper, i.e., a form, at the OCR module. The absence of "paper" at the OCR module will set a "no paper bit" flag which will be detected at the proper time in the machine cycle and an alarm will be set. Normally, since there is paper at the OCR module that question is answered "yes," and the flow proceeds to check if the OCR wand has begun moving in the forward direction. Since this is the first pass through with an OCR request, the question is answered "no." Assuming that the OCR is at the home position, the reverse command is reset and the OCR FIFO (OCR buffer 1632 in FIG. 50) is cleared; a delay of approximately 200 milliseconds, or four passes through this particular leg of the flow chart, is then performed until the data wait counter (DAWT) is counted out. At that time the DAWT counter again is preset to a count of 200 milliseconds. The OCR timer then is preset (PRESET OCRTM) for timing the travel of the OCR wand. The FIFO is cleared one more time to make sure that there is no unwanted data within the receiver FIFO on the CPU board and then the forward command is sent to the OCR servo electronics. On the next pass, after sending that command, the flow proceeds to test if the OCR want is at the end position yet. If not at the end position yet, and approximately a second remains to arrive there, the OCR timer is decremented and the flow returns from the routine. This particular leg of the routine is repeated until one of two things happens: either the timer times out and sets an alarm, or the OCR wand reaches the end position. Upon reaching the end position, the forward command is reset, which is being held or given to the OCR electronics and the flow proceeds through another 200 millisecond data wait (DAWT) leg. Thus, the flow proceeds for four more subsequent passes through the OCR routine and returns because the data wait counter (DAWT) has not counted out. Upon the pass through this routine where the data wait counter does count out, the OCR data is transferred from the FIFO into memory. At that time a check is made for a data error. If there is an error, a retry bit is set and through the same controlling method, or logic flow, sends the OCR wand to the home position and then forward again to try reading the form a second time. If upon the second time an OCR data error is again detected, an alarm is set. During normal operation the OCR data is accepted—i.e., has no error, causing reset of the OCR request which signifies completion of successful OCR read. The retry bit is also reset to enable the retry function when reading the next form, the OCR FIFO is cleared, the OCR timer is reset, and the data wait is preset, in preparation for the next operation of the OCR routine.

Figure 56B:
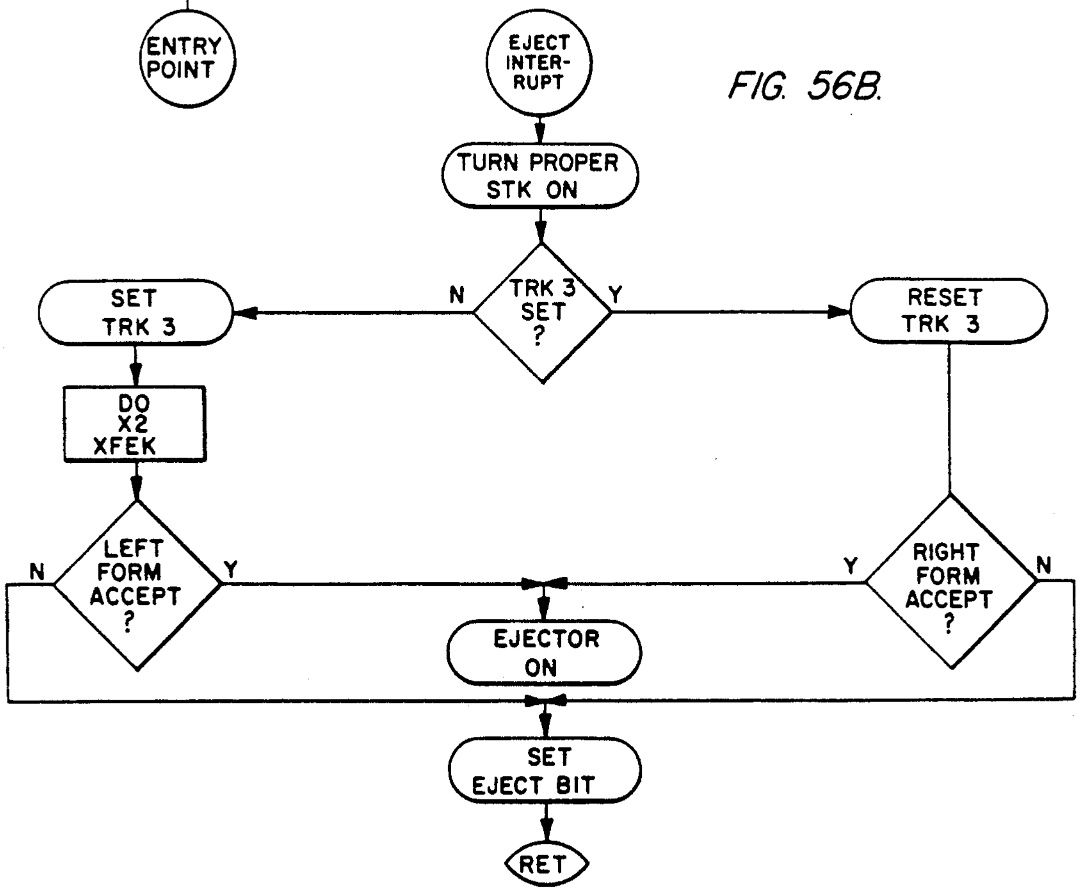
FIGS. 56A and 56B, taken together, are a logic flow chart of the OUTFEED routine.
Figure 56A:
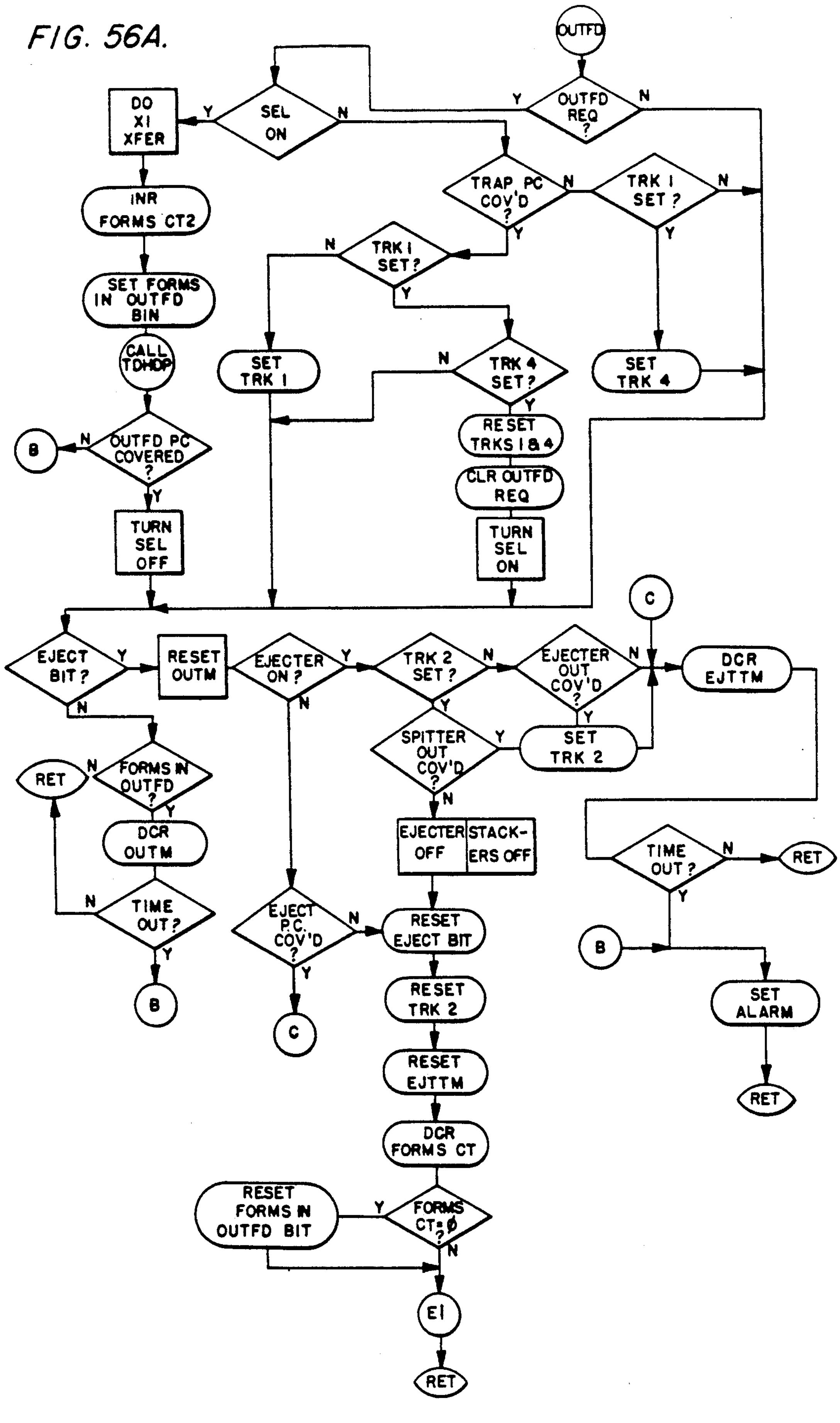

The outfeed module driver routine shown in FIGS. 56A and 56B can be thought of in two halves. The first half controls the folder outfeed mechanism. The second half controls the transport of forms to, and ejection into, the forms output stacker. Upon entering, or calling the outfeed routine, if there is no outfeed request, the logic flow goes directly to the question is there an eject bit? If there is an eject bit, this signifies that the system currently is in the process of ejecting a form, and the flow enters the second half of the routine. If there is no eject bit, the flow proceeds to ask the question, are there any forms in the outfeed? . (FORMS IN OUTFD?) If there are, the out timer is decremented (DCR OUTM) and the flow returns if it is not timed out. If it does time out the outfeed alarm is set. The flow continues through this leg until such time as the eject bit is set, signifying that the form in the outfeed track has reached the eject area, or the outfeed timer times out signifying that too much time has elapsed and sets the alarm.

In a normal operation, the eject bit would be set by the eject interrupt routine to be covered later and the flow would enter the second half of the routine.

The basic function of the first half of the outfeed routine is to process the receiving of forms into the outfeed module. The first time this half of the routine is entered, the flow proceeds to test whether the forms have been received properly, and if so the receiving zone solenoid is turned off. On the next pass through this half of the routine, and on subsequent passes, the outputs of the photocells between the folder outfeed and the stacker outfeed are monitored to count the two forms coming out, and when the system detects that the second form has cleared the receiving area from the folder outfeed, the outfeed request is cleared, signifying that the receiver is ready to receive another pair of forms, whereupon the receiver zone is turned back on, bringing it up to its receiving position behind the folder mechanism.

The second half of this routine's basic responsibility is to keep track of forms being ejected into the output stacker trays and to turn off the ejector mechanism when the form has cleared the eject mechanism. Again, a timer times the amount of time the form is taking to clear the eject mechanism. If it takes longer than approximately one second, an alarm is set. The eject solenoid is energized in the eject interrupt routine. This routine is entered via a hardware interrupt generated by the eject photocells. This routine can be entered while in any other part of the program at any time.

This eject interrupt routine determines whether the form to be ejected is the left form or the right form and subsequently tests to see if that form is to be rejected or ejected into the output stacker. If it is to be rejected, the eject solenoid is not energized. If it is to be accepted, the eject solenoid is energized and the form begins its travel into the output stacker.

Figure 57A:
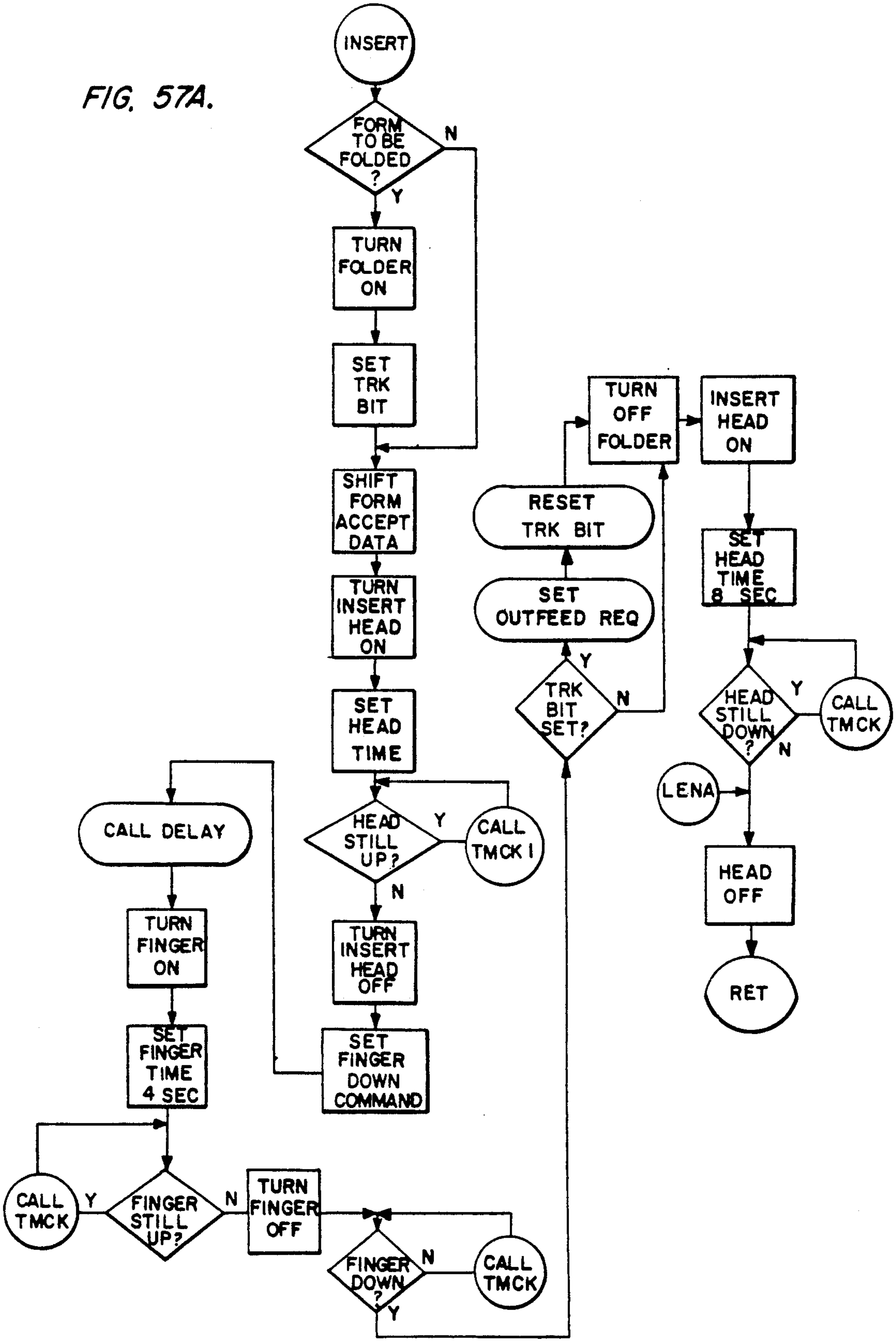
FIGS. 57A and 57B, taken together, are a logic flow chart of the INSERT routine.
Figure 57B:
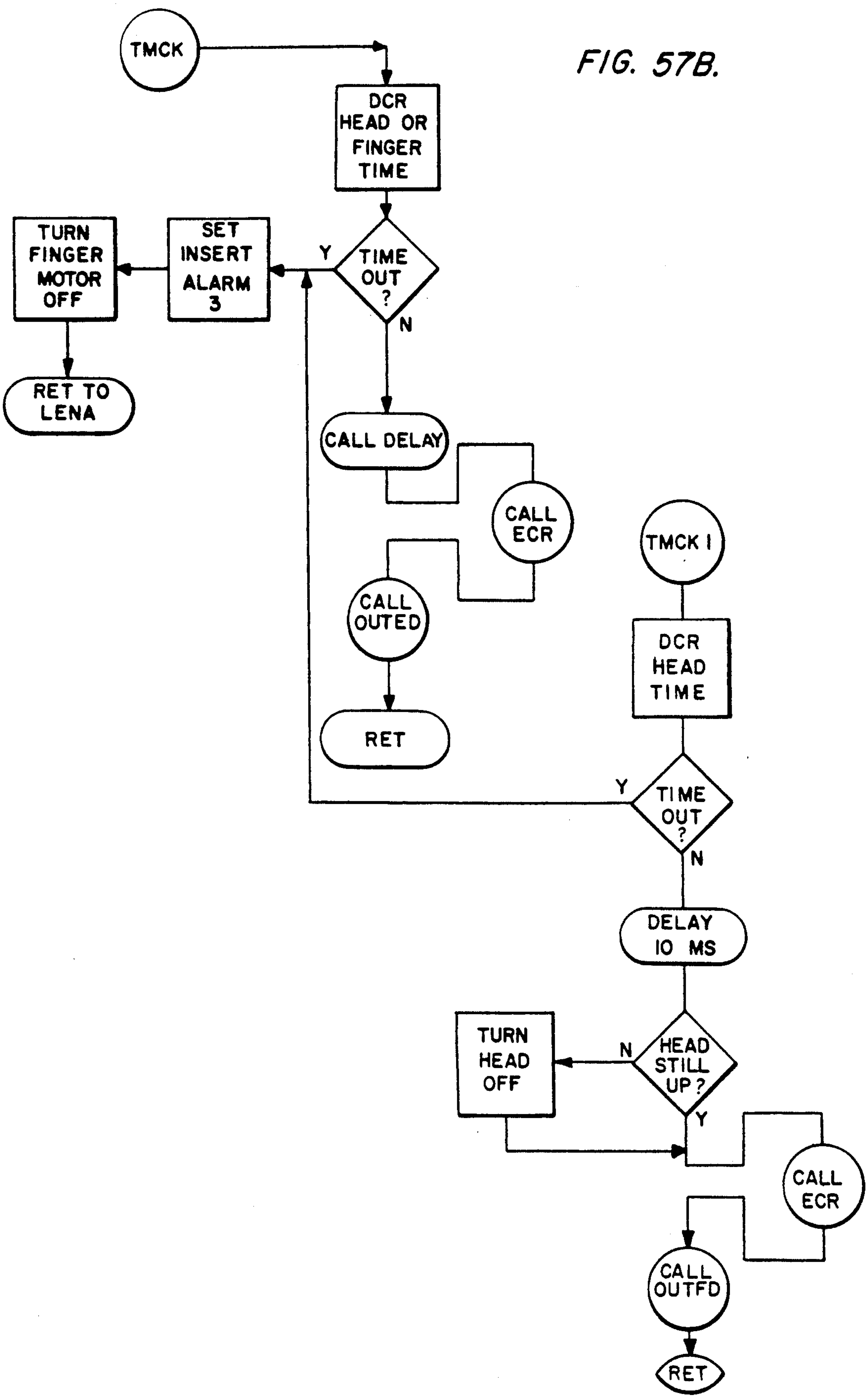

The logic flow chart for the insert head module driver routine is shown in FIGS. 57A and 57B. This routine is entered as shown in the diagram of the basic system loop of FIG. 51, after certain insert conditions are satisfied. It is considered a serial routine in which only one other major routine is called and that is the outfeed routine.

Upon entering the insert routine, a test is made to see if there is a form to be folded. If there is, the folder is turned on and this status is designated in memory. At this time, the logic shifts form accept data along so that when a form enters the eject area, the system can determine whether or not to eject it or reject it. Upon energizing the insert drive motor, a time delay register is set to 8/10 of a second, allowing that much time for the head to perform its downward movement. A loop is continuously performed, instructing the head to start moving down and checking to see if the head is still up. The up status remains registered until just before the head reaches the down position, at which time the down status is registered. If the head does not reach the down position within 8/10 of a second, the flow proceeds to set an error flag which is checked upon exiting the routine.

Assuming a no error condition exists, the insert head is turned off upon reaching the down position, and the finger down command is set. After a delay of 50 milliseconds, the turn finger on command is given, and the finger time register is set to 4/10 of a second; a loop is then performed, checking to see if the finger(s) is not "up". When the finger photocell registers detect that the finger(s) is not "up", the finger motor is turned off, but by virtue of its electronics it will remain on until the finger(s) reaches the down position. A loop is then entered where the routine waits for the finger(s) to reach the down position. If it does not reach the down position within 4/10 of a second, an error status is set. Assuming the finger is up, a test is made whether the folder folded a form. If so, the folder is turned off. An outfeed request is set for the outfeed routine. The insert head then is turned on, to bring it up in a similar manner as when brought down and a check is run to see if it comes up within 8/10 of a second. If it does not, an error status is set. If it does come up, the head motor is turned off and the flow returns to the start of the routine ending that cycle of the insert routine.

Figure 58:
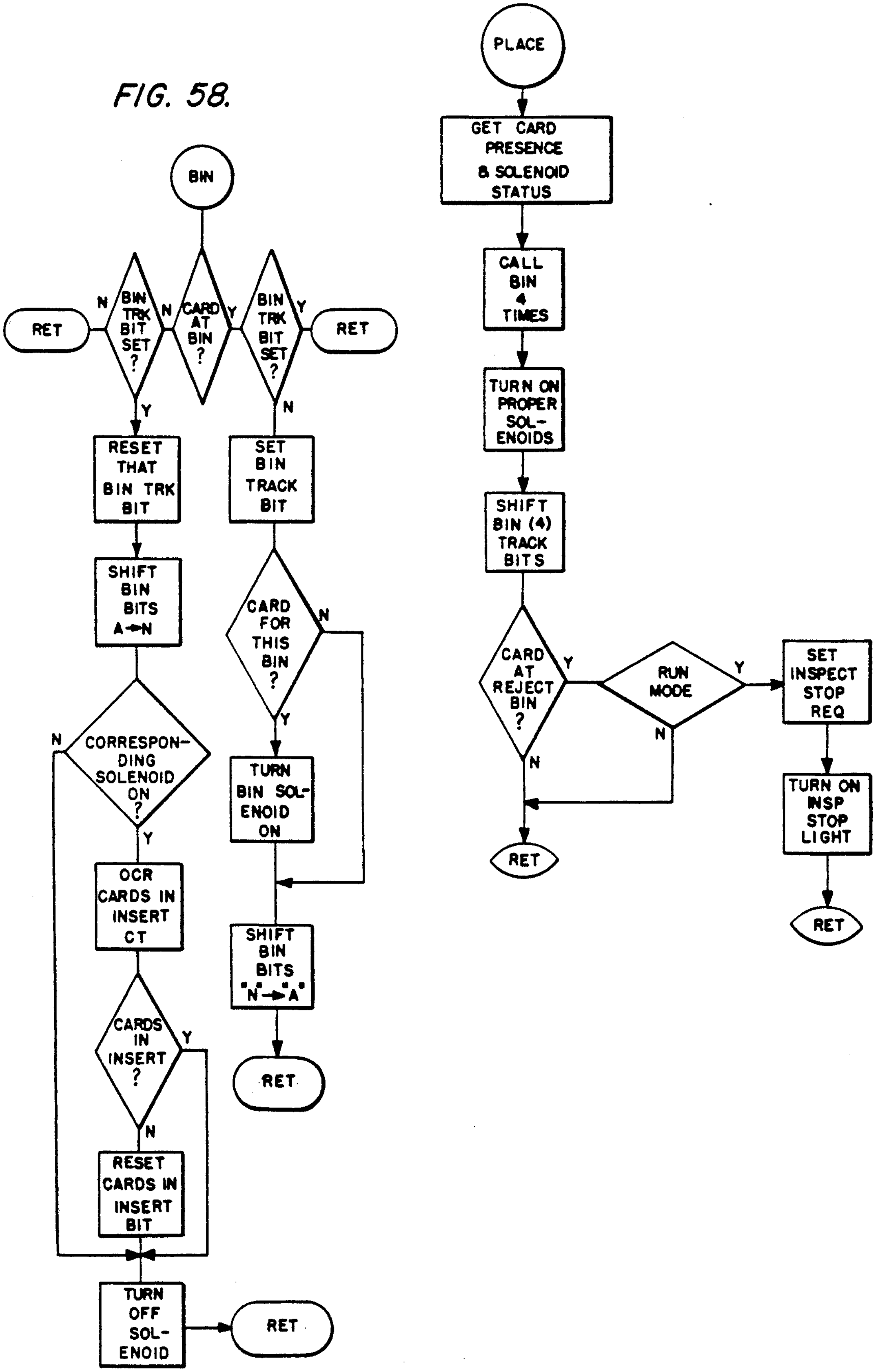
FIG. 58 is a logic flow chart of the PLACE routine.

The logic flow for the place routine, which controls placement of cards within the insert head module, is shown in FIG. 58. This routine takes data handed off to it from the ECR routine and uses it in conjunction with the photocell detector outputs for the cards progressing through the insert module, as each card covers and uncovers the photocell associated with each card bin, to place properly data-matched cards into the proper bins. When the photocell for the bin in which the card is intended is covered by that card, the deflector solenoid for that bin is energized and when that same photocell goes uncovered the deflector solenoid is de-energized; by that time, the card will have been deflected into the bin. Which card is placed in which bin is determined by the data from the ECR routine. One other responsibility of the place routine is to sample the reject bin photocell at the left-hand side of the insert module to check if that photocell is covered, signifying that a card has passed through the entirety of the insert module and into the eject bin—an illegal state in the normal, run mode When this occurs, the inspect stop request bit is set, essentially requesting an inspection stop mode of operation, having much the same effect as actuation of the inspect stop request button 1528 on the control panel 1500.

In the basic logic flow of the place routine, set forth in the upper portion of FIG. 58, the routine initially obtains information regarding the presence of a card from the monitoring photocells associated with the bins and the status of the solenoids for the deflection rollers associated with the bins. The step "call bin four times" corresponds to performing the bin subroutine shown in the lower portion of FIG. 58 four times, corresponding to the provision of four bins in the insert module. The bin subroutine initially inquires whether the card is at a given bin, in accordance with the photocell outputs above mentioned. A track bit is set to correspond to each card entering the insert module, for tracking that card through the four bins of the module. The bin subroutine initially questions whether the card entering the insert module is or is not at the bin for which the bin routine was called and in either instance further questions whether the track bit has been set and, if not, will set the track bit if the card is at the bin or will reset the bin track bit if the card is not at the bin.

If the card is at the bin, its track bit is set, and, further, if the card is intended to be deflected into that bin, the right portion of the bin subroutine turns the bin solenoid on for deflecting the card into the appropriate bin and then shifts the bin track bits and returns. Conversely, if the card is not at the bin but the track bit has been set, the bin track bit is reset and the bin track bits then are shifted. A test is made whether the corresponding solenoid for the bin for which the card is destined is turned on and if so the logic proceeds to the next step to question whether the card is in the insert bin (as confirmed by the absence of a photocell output for the photocell associated with the next bin). If the latter question is answered yes, the solenoid is turned off and the subroutine returns. If the answer is no, the logic flow resets the cards in insert bit, turns off the solenoid and returns.

Returning to the place routine, the general functions of turning on the proper solenoids and shifting the bin track bits for the four bins is more generally shown, corresponding to these more detailed steps of the bin subroutine. The place routine also shows the above discussed function of detecting if a card is at the reject bin; if not, the place routine completes and returns whereas if yes, and the system is in the run mode, the inspect stop request is set and the inspect stop indicator is turned on and the place routine returns. The inspect stop mode has been discussed previously.

The logic flow for ECR module driver routine is shown in FIG. 59. The ECR routine's primary responsibilities are: the control of cards going through the ECR track; the proper placement of cards, by handing off data to the place routine; and the data match function which matches the data from the card with the data from the form.

Figure 59A:
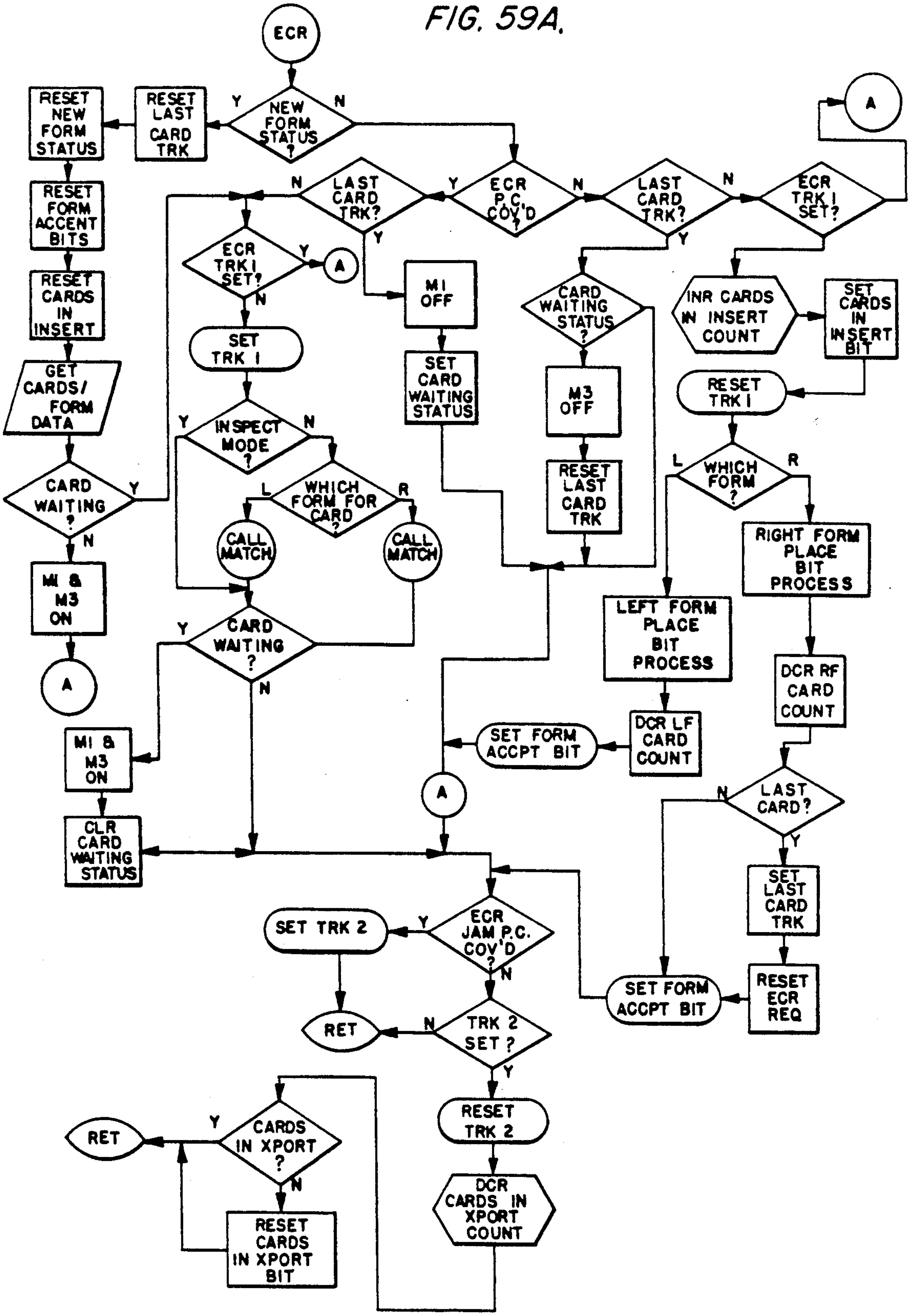
FIGS. 59A and 59B, taken together, are a logic flow chart of the ECR routine.
Figure 59B:
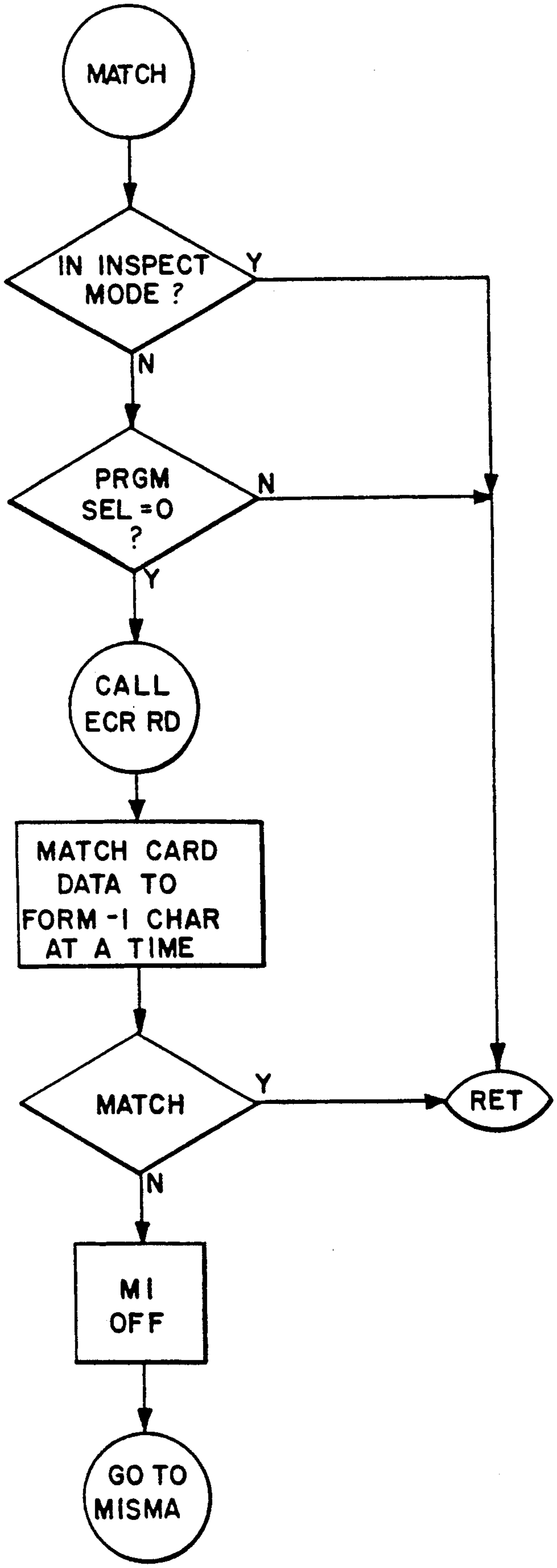

Certain status bit definitions are pertinent to the ECR routine flow chart of FIGS. 59A and 59B. A track bit designated TRK 1 designates that a card has been matched and a place bit has been set. A track bit TRK 2 designates that a card has covered the ECR JAM photocell (P.C.). CARD WAITING designates that the first card of a next form to be processed has covered the ECR P.C. A further track bit LAST CARD TRK designates that the last card for the current form has passed the ECR P.C. ECR REQ is set when insertion is completed and the main loop is started for a new form. This bit is reset when the last card track bit is set. Finally, the NEW FORM STATUS bit is set with the ECR REQ to denote a new form. This bit is reset on passage through the start-up leg of the ECR routine.

Upon entry into the ECR routine, a first check is made whether a new form is being processed by the "new form status?" inquiry. If "yes", the logic proceeds to reset the new form status bit, reset the status form accept bits (to designate that none of the cards is currently accepted as satisfying the form until proven to be so) and to reset the cards in inserter counter. The logic then acquires the cards per form data (i.e, the number of cards per form) and inquires whether a card is waiting—in this instance, signifying whether the first card for this new form has covered the ECR photocell.

At this juncture, it is pertinent to note that the ECR transport includes three separate card transports and associated drive controllers, the first (M1) transporting cards from the pick to the reader, the second (M2) transporting cards through the reader, and a third (M3) transporting cards from the reader into the inserter. Controllers Ml and M3 are under control of the ECR routine whereas M2 is under control of the ready mode. Also, the ECR photocell is located at the output of the reader and the ECR jam photocell at the input to the inserter.

Returning now to FIG. 59A, the logic proceeds to question whether a card is waiting and if not, turns on Ml and M3 and returns.

If a card is waiting, the logic then inquires whether the system is in the inspect stop mode and if not, ECR TRK 1 is set and the flow returns. If TRK 1 is not set, it is set or if in the inspect stop mode, the TRK 1 bit is set and the flow proceeds to inquire which form is to receive the card—i.e., the left or right form of the double-width forms in the inserter. Depending on that decision, the data match routine of FIG. 59B is called.

In FIG. 59B, the match subroutine passes through the questions of whether there is an inspection stop mode request and is the program select switch set=0. The flow will return if there is an inspection stop mode request, and if the program select switch is not set=0. If the latter is set=0, the system is in the data-match mode, and the flow proceeds to the matching step in which, for the appropriate form, the ECR characters read from the card are matched one character at a time with the OCR data read from the appropriate form. If a match is produced, the logic returns, but if not, the transport M1 controller is turned off and the logic proceeds to a mismatch data error condition.

Returning to the ECR routine, if the form is not a new form but one currently being processed, the alternate branch of the initial decision is followed, leading to the initial inquiry of the right branch of the logic flow, of whether the ECR photocell is covered. If so, the question last card track is asked which., if yes, means that the last card for the current form has passed the ECR photocell in which case drive M1 is turned off and the card waiting status bit is set. If the last card track bit is not set, the flow proceeds to the left through the common branch previously discussed in which the match subroutine is entered for matching the data from the card with the appropriate form.

Thus, for either new or old forms, following the match function, the logic proceeds to the inquiry of card waiting which, if answered yes, results in transport controllers M1 and M3 being turned on thereby to clear the card waiting status.

Returning to the top of the flow in FIG. 59A, if the ECR photocell is not covered, the question is asked whether the last card track (TRK) is set and if not, the inquiry is made whether the card track 1 (TRK 1) is set, designating that a card has been matched and a place bit has been set for that card. If the answer is no, the flow proceeds to loop in at position A in the main routine to be discussed. If the answer is yes, the TRK 1 bit is reset and the flow proceeds to inquire which form is to receive the card. Depending on that decision, the card count for the appropriate left or right form is decremented and the flow proceeds to the question of whether the given card is the last card for that form. If not, the flow proceeds in a manner to be discussed directly, and if yes, the last card track bit is set and the ECR request is reset.

The final branch of this flow shown at the bottom portion of FIG. 59A then proceeds through the inquiries regarding covering of the ECR jam photocell by a card and setting the TRK 2 bit or inquiring whether it has been set which, if not, causes the flow to return. If TRK 2 bit is set, the flow proceeds to reset the TRK 2 bit and to decrement the cards in transport counter. The flow then proceeds to inquire if cards are in the transport and if not, resets the cards in transport counter; if yes, the flow then increments the cards in inserter counter and sets the cards in inserter bit, and then returns.

Thus, the ECR routine provides not only for control of the card transport, with the exception of the ready mode but also control of the transport of cards through the reader itself, acquires the necessary data to branch into the data match subroutine for matching the card with the appropriate one of the two forms in the insert head, and, further, monitors the transport of cards through the transport station so as to determine the number of cards therein in any given time and as well the number of cards supplied to the inserter.

As can be seen, the ECR routine includes many conventional data handling functions and particularly that of the data match operation; accordingly, detailed explanation thereof is not deemed necessary.

Figure 60A:
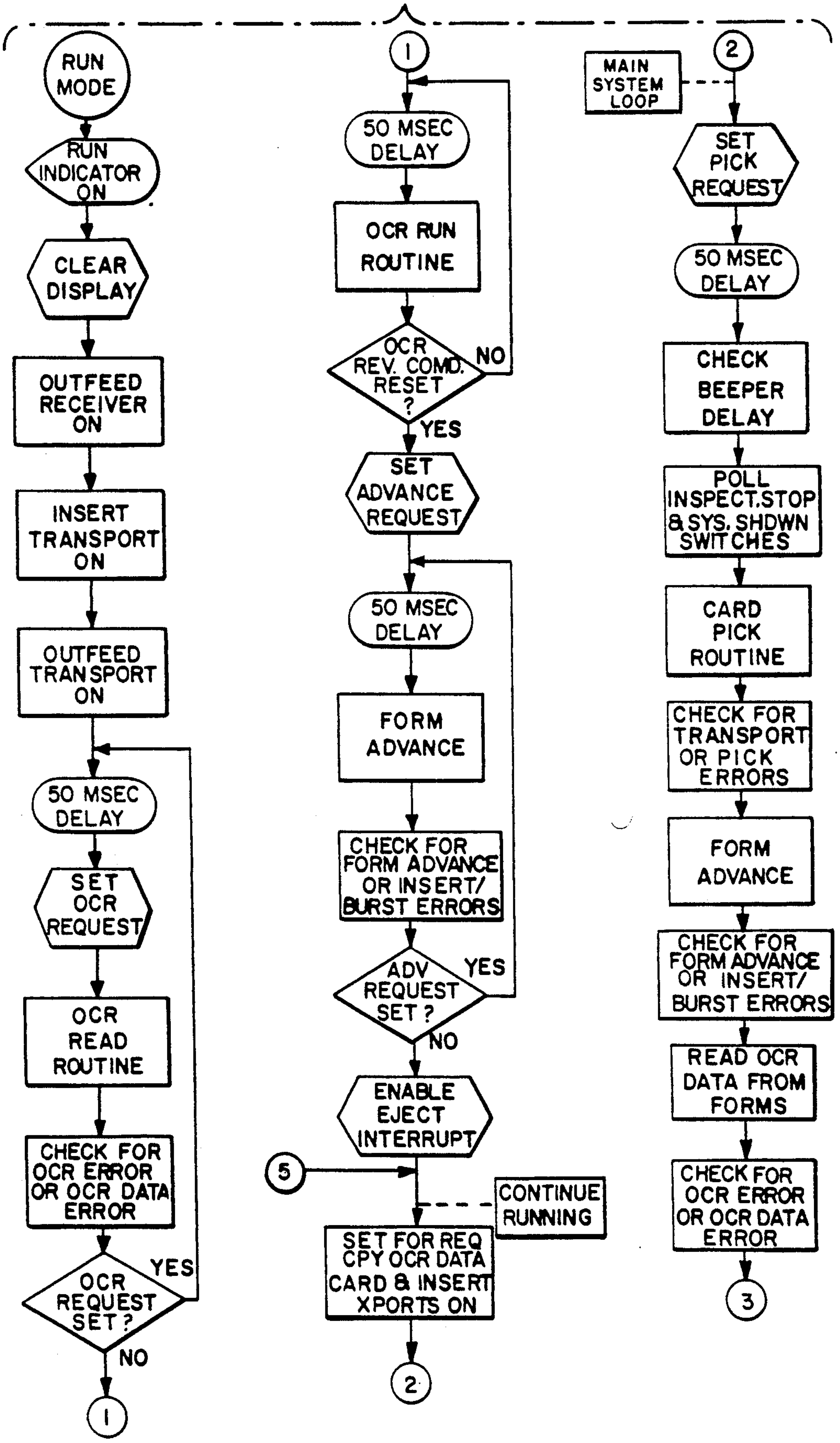
FIGS. 60A, 60B, and 60C, taken together, are a logic flow chart of the RUN made of the system.
Figure 60B:
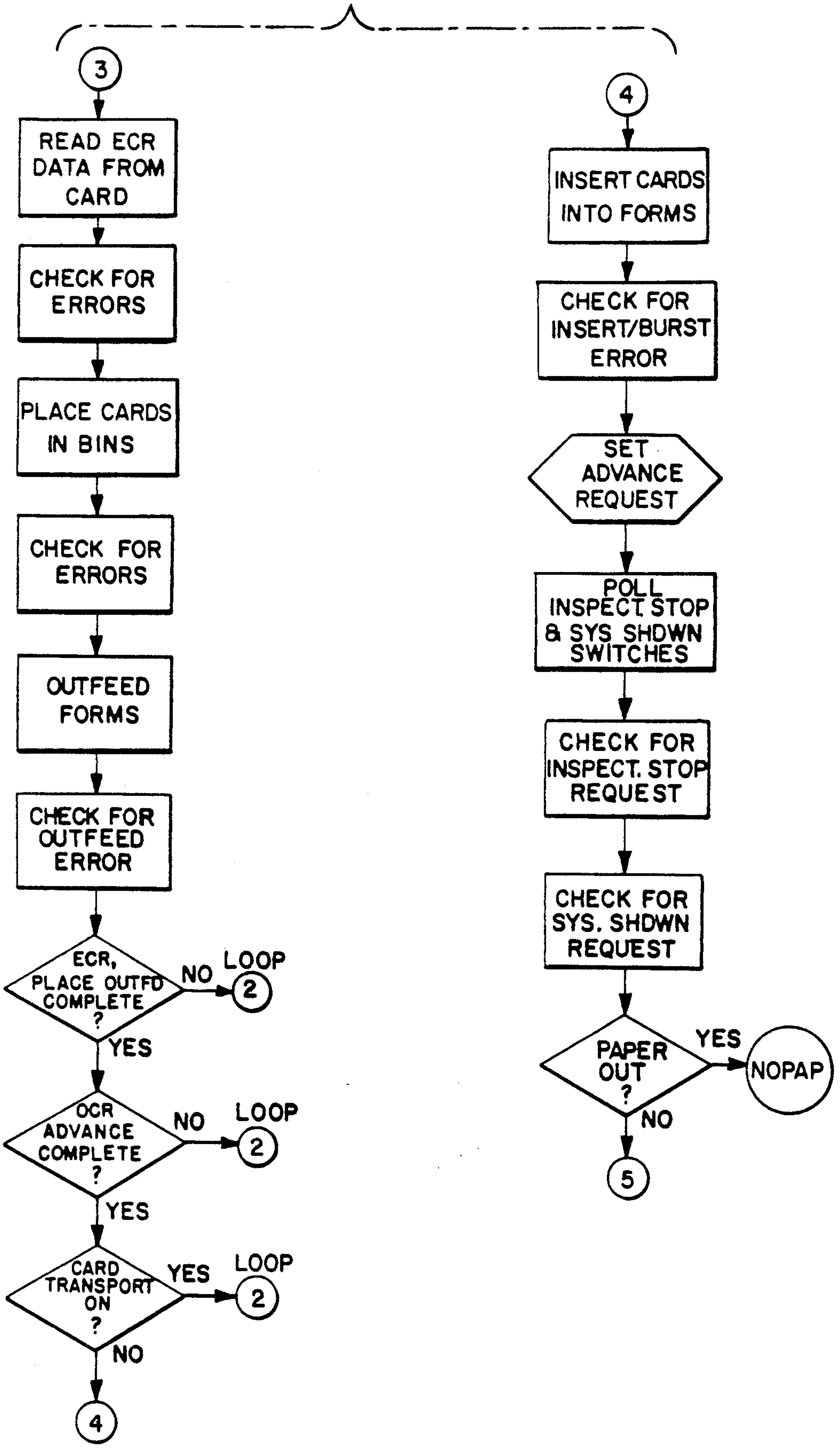
Figure 60C:
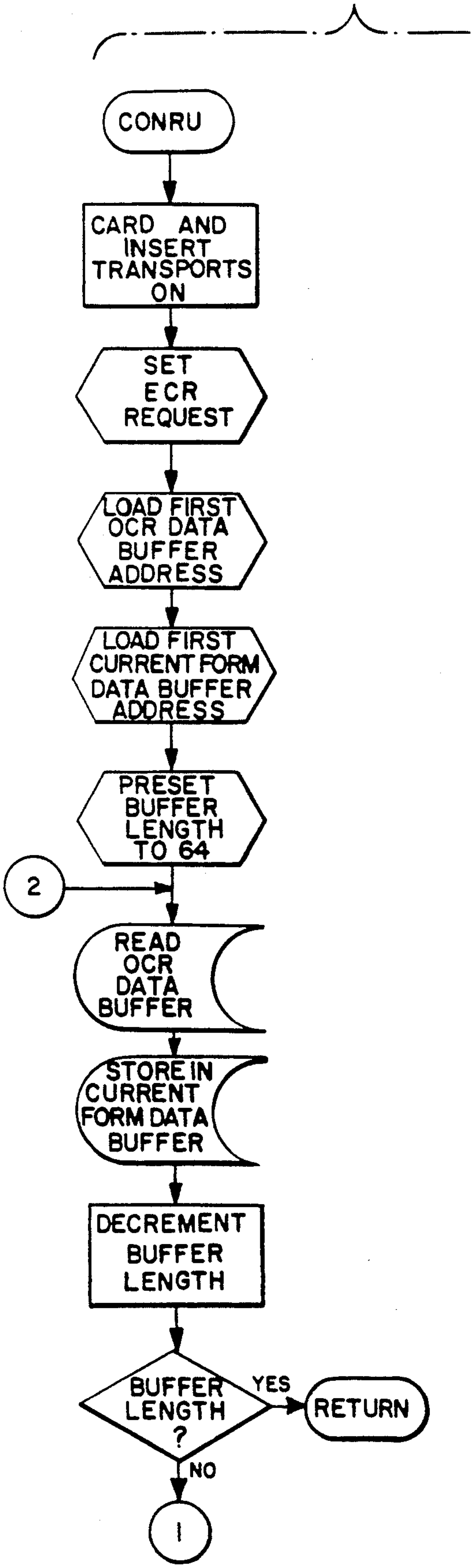

Of particular interest to the overall system operation is the logic flow chart of FIG. 60A through 60C. These flows illustrate the interrelationship of the main operational routines in the normal run mode operation of the system.

The system necessarily includes numerous additional routines such as for testing the input card hopper cartridges and the output stacker trays to determine their condition and ability to supply cards or receive folded forms, as is appropriate, a display routine, form advance and fold routines and numerous other routines for the various functions before discussed. As well, initialization and ready modes, system shut down, inspection stop and error modes all have their corresponding routines which are performed in those respective modes. Those of skill in the art can readily visualize the routines performed therein, taken in light of the detailed description hereinabove of the basic routines of the main system loop and system structure and operations. Nevertheless, for completeness, salient aspects of the routines in the system shut-down, inspection-stop and error modes are commented on briefly in the following.

The system shut-down mode can only be entered from the run mode, and is done by depressing the system shut down switch 1530 on the control panel 1500, thereby initiating a system shut down request within the program. The system shut-down request is sampled every insertion cycle. If it is true, the run indicator is extinguished and the process necessary to complete the system shut-down is begun. System shut-down produces system operations similar to those followed in the run mode, with the notable exception that the pick request is not set continuously. The reason for this, and the main purpose for the system shut-down mode, is to reach a point in time when there are no cards left in the ECR card transport 300 and there are no cards needed on a form underneath the insert head. When this point is reached, the system may be shut down, having fully completed any forms currently in process and not leaving any cards in the machine.

Thus, the shut-down routine calls each of the PICK, ADVANCE OCR, ECR, PLACE and OUTFEED routines and tests to see if there are insert conditions. In between the calling of each one of these module driver routines, the shut-down mode also checks or calls the error mode to see if any errors have occurred, and the flow returns to continue the system operations for completing shut-down.

If the test for insert conditions determines that inserter requirements for a form are not satisfied, the system further checks to see if the card transport track and the insert module card transport are cleared. If not, the various module driver routines are again called. If the tracks are cleared, the pick is tested; if the pick is on, the module driver routines are resumed. If the pick is not on, a test is made to see if the ECR bit is set; if set, the current form at the insert module requires one or more cards and thus the pick request is set to generate the picking of another card. The pick request is set only once in each cycle of this mode, since the pick routine itself resets the pick request every time a card is successfully picked. This allows a pick one-card-at-a-time function so that only the cards necessary to complete the form are picked.

When the insert conditions are met, the insert routine is called in a similar manner as in the run mode. When that is completed, a test again is made to see if the card transport tracks, including those of the ECR module and the insert head module, are cleared. If they are still not cleared, a check is made whether there is still a form at the OCR module. If so, the loop repeats, to set up conditions necessary to fill that form. The routine then returns to the main system shut-down loop, calling all the different module driver routines. Eventually the last insertion is completed and all the tracks are cleared. The form advance, burst, fold, and outfeed routines moreover are called until all completed forms are stacked in the output stackers. At this point the system may be shut down, having completed every form and operation and leaving no completed forms, or extraneous cards or forms within the system.

One other way to enter the system shut-down mode is when the machine is in the run mode and a natural end of run occurs. A natural end of run is defined as exhausting the supply of cards at the same time as the supply of forms, with the last pocket on the last form corresponding with the last card in the input hopper. This stage produces a natural hopper error. Since the cards advance through the system a little bit ahead of their respective form, correspondingly the last card will be picked out of the input hopper before a "no paper" error occurs. This produces a hopper error in the error mode, and the run mode exits into the error mode. The operator then instructs the machine that this is a natural end of run by depressing the system shut-down switch. This calls the shut-down routine for completing the last form under the natural end of run circumstance.

As a result, the end of run bit is set, the error light and horn (alarm) are turned off, the system shut-down indicator 1530 is turned on, and the no paper bit is cleared, if it has been set. A test is made to see if the ECR bit is set, to determine whether or not the requirements of the form at the insert module have been met. If the ECR bit is set, the card transport is turned back on again, the error routine having turned that transport off, to feed a few more cards to finish the form, and then re-enter the main system shut-down loop, perform the insert conditions test and perform the system shut-down routine as previously described.

The main purpose of the inspection stop mode is to enable the operator manually to inspect the forms to insure that the cards are in sync with the forms. The inspect stop mode also provides the option for the operator to operate the machine in a manual mode. Operating the card inserter in a manual mode permits supplying one card at a time into the insert module, and gives the operator the opportunity to re-sync the supply of cards with the particular form that is positioned for card insertion. This is done by either rejecting an extra card that is in the card track so it is inserted into the form or, if a card is missing, inserting a phantom card into the machine so that the subsequent cards will be in line with the subsequent forms, as previously discussed. There are three basic ways to enter the inspect stop mode: a manual request; a data match error entry; or a manual request from an OCR data error. A manual request typically is used while the system is running, to enable the operator to see that the cards are still in sync with the forms. By actuating the inspection stop button 1528 to request the inspection stop mode, and upon completion of the card insert following the inspection stop request, the machine will advance the completed form to the form inspection station, as previously described. If the cards are out of sequence, the operator would manually re-sync the cards. The same operations occur on a data match error, except that the system automatically requires the operator manually to complete the form currently in the insert module. The third way to enter inspection stop is a manual request from an OCR data error. This is required if a form is in the OCR station and cannot be read by the OCR reader, which places the system in an error mode. The operator again may press the inspection stop switch 1528, requesting the inspect stop mode and the above-discussed operations again occur. A detailed discussion of this mode was presented earlier in relation to FIG. 49.

The error mode performs a test for any errors existing within the system at the very beginning of its routines, and if no errors exist, the system returns directly back from the error mode. This permits calling the error mode at virtually any time during the system operation; in fact, it is generally called after every module driver routine has been called. This means that immediately after calling any one of those main system module driver routines, if an error has been flagged, the system will immediately exit into the error mode and process that particular error.

Errors in the inserter machine are classified as major or minor, as previously discussed, a major error generally involves jammed forms or cards, which must be physically cleared. The particular type of error is displayed on display 1508 of the control panel 1500 and the alarm is sounded. The operator acknowledges the alarm by depressing the error clear switch 1574 once, which merely turns off the alarm. Then the operator clears any mechanical jams, presses the error clear switch 1574 for a second time, and the system performs essentially the same functions as in response to master clear, entering the initialization mode and initializing the system.

Minor errors can be cleared .and machine operation thereafter continued, without having to reinitialize. These errors are acknowledged in a similar manner. The error is displayed on display 1504 of the control panel 1500 and the alarm is turned on. The operator acknowledges the error by depressing the error clear switch 1514 to turn the alarm off, and then clears or remedies the source of the problem, presses the error clear switch 1514 for a second time and the machine recovers from the error and continues on. However, an outfeed error requires one additional depression of the error clear switch 1514. After correcting the problem, depressing the error clear switch 1514 for a second time turns on only the outfeed transport, to facilitate clearing the outfeed track of all forms; depressing the error clear switch 1514 a third time restarts operation. In recovering from all minor errors, the system returns to whatever particular mode of operation it previously was in.

CONCLUSION

In conclusion, the detailed specification set forth hereinabove has taught the basic structural arrangement of the data match inserter of the invention including significant features of its many components and subcomponents. As well, the various operational modes have been specified and significant routines of the driver modules have been disclosed in flow chart form, sufficient to permit one of ordinary skill in the art to reduce to practice the present invention. As beforenoted, the card inserter operations may be employed independently of any data match requirement, or these functions, as in the preferred embodiment, may be combined in a single system. Further, the data match inserter of the invention may be an integral portion of a total automated system wherein cards are automatically embossed and supplied directly to the data match inserter which at the same time receives preaddressed mailer forms, the card embossing and the mailer form address printing being controlled by a common computer controller using, for example, a common master store containing the necessary account number and card recipient name and address information and the like. The data match inserter of the invention affords high reliability and speed, yet flexibility in its operations, while affording simplified operator controls both for normal operations and for correcting errors in the handling, i.e., transporting, of the physical forms and cards or in the reading of data from each, for performing the data match function.

The objects of this invention as set forth in the introduction to this detailed specification have pointed out the many features and advantages of the invention; other such features and advantages will now be apparent from the detailed specification and thus it is intended by the appended claims to cover all such features and advantages of the system which fall within the true spirit and scope of the invention.

What is claimed is:

1. An inserter system for attaching a card of generally planar, rectangular configuration to a form at a predetermined card attachment location thereon by inserting first and second diagonally opposite corners of the card into corresponding first and second card-corner receiving apertures provided in the form and defining the said card attaching location thereof, said apertures being spaced apart by a distance less than the diagonal dimension of the card between said first and second diagonally opposite corners thereof, comprising:

a card inserter mechanism including means for receiving and releasably retaining a card in a first position, means for positioning a mailer form with the said card attachment location thereof aligned with and substantially parallel to and displaced from said first position of the releasably retained card to be inserted therein, said inserter mechanism further including means for supporting said card in a central portion thereof and means for engaging said card adjacent said first and second diagonally opposite corners for deflecting said corners beyond said first position and towards said form, and means for actuating said receiving and supporting means to release said card and for actuating said deflection means to deflect said diagonally opposite corners of said card about said central support means to enable insertion of said first and second diagonally opposite corners of said card into the said corresponding apertures of the card attachment location of said mailer form aligned therewith, and for thereafter displacing said central support to permit said card to flex to its original planar configuration with the said diagonally opposite corners thereof projecting through the said corresponding apertures and underlying the form, thereby attaching the card to the form.

2. An inserter system as recited in claim 1 wherein said means for receiving and releasably supporting a card comprises:

a plurality of arms, at least a first and a second arm being in opposed relationship to receive therebetween opposite edges of a card, said arms each having a first end including an inwardly directed projection for retaining thereon a card received between said first and second arms, and first and second support elements, said second ends of said first and second arms being joined to said first and second support elements, respectively, for supporting said arms, and said actuating means actuates said first and second support elements to move said arms and withdraw said projections thereof for releasing a card retained thereon.

3. An inserter system as recited in claim 2 wherein:

said first and second support elements comprise elongated elements mounted for rotation at the ends thereof, said at least first and second arms being joined at said second ends thereof to respective ones of said first and second support elements intermediate said ends thereof and extending radially therefrom, and said actuating means rotates said elongated support elements thereby to rotate said arms to an inward, closely opposed relationship to receive and releasably retain a card on the inward projections of said arms, and rotates said support elements in an opposite direction to rotate said arms to an outward, displaced relationship thereby to release a card theretofore retained on the projections of said arms.

4. An inserter system as recited in claim 2 wherein said means of said inserter mechanism for supporting a card in a central portion thereof comprises:

a finger element disposed to extend parallel to the plane of a card received in said inserter mechanism, generally centrally of the card and transversely of the greater longitudinal dimension of the card, and said actuating means for displacing said central support means comprises means for selectively maintaining said support finger to extend underneath said card at said first position thereof for supporting said central portion of said card during deflection of said card by said deflection means, and moving said support finger to a position closely adjacent the surface of a form to which the card is to be attached, to permit the card to flex to its original planar configuration.

5. An inserter system as recited in claim 4 wherein:

said form positioning means is operable to withdraw a form from said inserter mechanism in a first direction transverse to said greater longitudinal dimension of said card, the opposite longitudinal edges of said card thereby defining leading and trailing edges of said card during said withdrawal, and said central support finger extends underneath said card from the trailing longitudinal edge of said card as thus defined, thereby to permit withdrawal of the form and attached card when said central support finger is positioned closely adjacent the form.

6. An inserter system as recited in claim 5 wherein said means for engaging said card adjacent said first and second diagonally opposite corners comprises:

first and second elongated deflecting elements, support means for supporting said first and second elongated deflecting elements to extend in a direction generally normal to the plane of a card supported in said first position in said inserter mechanism and displaced from the surface of the card, and said actuating means actuates said support means for said elongated deflecting elements for moving same from said first position displaced from said card surface to a second position engaging and deflecting the corresponding said diagonally opposite corners of said card when said card is supported by said central support finger, thereby to project said card corners through said corresponding apertures of said card attachment location of said mailer form, and said actuating means actuates said elongated deflection elements to engage and deflect said corners of said card after actuating said arms to said outwardly displaced positions for releasing said card from said projections thereof and prior to moving said central support finger from supporting the central portion of a card at the first position thereof to the position closely adjacent the form, said elongated deflection elements in said second, card-deflecting position thereof being displaced slightly from the surface of the credit card when said credit card is flexed to its original planar configuration upon moving of said central support finger to said second position closely adjacent a form.

7. An inserter system as recited in claim 1 wherein each said mailer form is provided from a fan-fold strip supply of plural said mailer forms and each said card is provided from a supply of plural cards arranged in sequence for attachment to corresponding forms, wherein said form positioning means selectively positions said plural forms in individual succession in said aligned position in said inserter mechanism for insertion of respectively corresponding cards in the attachment location of each thereof, further comprising:

means for selecting a predetermined number of cards from said supply of plural cards for attachment to a given said form, and means for supplying said cards selected for attachment to said form to said card inserter mechanism, and said receiving means of said card inserter mechanism is supplied with and receives up to at least two selected cards for insertion in a corresponding, single card attachment location of said form.

8. An inserter system as recited in claim 7, wherein each said form includes at least two card attachment locations thereon, and wherein:

said card inserter mechanism includes first and second means, each for receiving and releasably retaining up to at least two cards, and said inserter mechanism further includes in corresponding, respective association with said first and second receiving and releasably retaining means, first and second said means for supporting a card in a central portion thereof, first and second said means for engaging each said card adjacent said first and second diagonally opposite corners thereof, and said actuating means actuates, in common, each of said first and second releasable retaining means, said first and second deflection means, and said first and second central support means, thereby simultaneously to attach cards received in each of said first and second receiving means to the respectively associated first and second attachment locations of the aligned form to which the cards are to be attached.

9. An inserter system as recited in claim 8 wherein:

said inserter mechanism further includes a transport means for receiving a card and transporting same along a transport path adjacent said first and second receiving and releasably retaining means, and first and second deflection means normally positioned adjacent to, but displaced from said transport path to enable each said card to be transported past said first and second receiving means, and selectively movable into said transport path to deflect a card from said transport path into the corresponding receiving means, thereby to provide for selective receipt of cards in the respectively associated, first and second receiving means of said inserter mechanism.

10. An inserter system for automatically attaching pre-coded cards of generally planar, rectangular configuration to respectively corresponding, pre-coded mailer forms at predetermined card attachment locations on each said mailer form, by inserting first and second diagonally opposite corners of each card associated with the form into corresponding first and second card-corner receiving apertures provided in the associated form and defining the said card attaching location of said form, said apertures being spaced apart by a distance less than the diagonal dimension of the card between the said first and second diagonally opposite corners thereof, said mailer forms being supplied in a continuous fan-fold strip with each said mailer form pre-coded in accordance with the code of cards to be received therein and the number of such common-coded cards to be attached to said form, and said cards being provided in succession as to code and number thereof, in accordance with the succession of mailer forms, comprising:

a card inserter mechanism including means for receiving and releasably retaining in a first position, at least one card, means for advancing said fan-fold strip supply of mailer forms for selectively positioning each said mailer form, in succession, with the card attachment location thereof aligned with and substantially parallel to and displaced from said first position of the releasably retained, at least one card to be inserted therein, means for reading the pre-printed code of said mailer form for identifying the card code and the number of cards to be attached to each said mailer form, prior to said mailer form being advanced to said aligned position, means for picking cards, in individual succession, from said supply thereof, means for transporting said picked cards, means for reading each individual card, in succession as picked from said supply, said transporting means transporting each successively picked card past said reading means, control means for comparing the code read from each card and the number of cards bearing a common code picked in sequence from said supply thereof with the pre-printed code and card number read from a corresponding mailer form, to determine compliance of the picked cards as to code and the number of cards of a common code with the card code and number of card requirements of each said form, in individual succession for each of the plurality of forms and each of the successively picked cards, said transporting means transporting and supplying to said receiving means of said card inserter mechanism each successive said card which satisfies the requirements of a corresponding mailer form, said inserter mechanism further including means for supporting each said card received therein in a central portion of the card and means for engaging said cards adjacent said first and second diagonally opposite corners for deflecting said corners beyond said first position and towards said form, and means for actuating said receiving and releasably retaining means to release said card and for actuating said deflection means to deflect said diagonally opposite corners of said card about said central support means to enable insertion of said first and second diagonally opposite corners of said card into said corresponding apertures of the card attachment location of the mailer form aligned therewith, and for thereafter displacing said central support means to permit said card to flex to its original planar configuration with the said diagonally opposite corners thereof projecting through the said corresponding apertures and underlying the form, thereby attaching the card to the form, said control means controlling said actuating means in accordance with the codes read from said cards and the number of cards bearing that code complying with the preprinted card code and number of card requirements of the associated form.

11. An inserter system as recited in claim 10 wherein said card transport means for transporting cards from said picking means to said inserter mechanism is capable of containing therewithin a predetermined maximum number of cards, and wherein there is further provided:

means for detecting each card picked from said supply thereof and provided to said transport means, and means for detecting each card transported into said inserter mechanism by said transport means, and said controlling means responds to the detection of each picked card and the detection of each card delivered into said inserter means to determine the number of cards in said transport means and thereby to enable said picking means to continue picking of cards from said supply so as not to exceed the predetermined number of cards permitted in said transport means, and to control said transport means to continue to deliver cards to said inserter mechanism only for cards having codes corresponding to the card code and number of card requirements of a given mailer form positioned at said inserter mechanism for attachment of cards thereto, and to control said reading means for said mailer forms, to read a successive mailer form while the next preceding mailer form is at said aligned position at said inserter mechanism.

12. An inserter system as recited in claim 10 wherein: each said form includes at least two card attachment locations thereon, and wherein:

said card inserter mechanism includes first and second means, each for receiving and releasably retaining up to at least two cards, and said inserter mechanism further includes in corresponding, respective association with said first and second receiving and releasably retaining means, first and second said means for supporting a card in a central portion thereof, first and second said means for engaging each said card adjacent said first and second diagonally opposite corners thereof, and said actuating means actuates, in common, each of said first and second releasably retaining means, said first and second deflection means, and said first and second central support means, thereby simultaneously to attach cards received in each of said first and second receiving means to the respectively associated first and second attachment locations of the aligned form to which the cards are to be attached, and said controlling means controls said insert mechanism to selectively receive said corresponding cards in said first and second card receiving means thereof in a predetermined sequence in accordance with the total number of cards to be attached.

13. An inserter system as recited in claim 12 wherein said mailer forms are supplied in double-width of two side-by-side mailer forms, each mailer form having first and second card receiving locations thereon for attachment at each location of up to at least two cards, the fan-fold strip supply of mailer forms defining a predetermined sequence thereof in accordance with the said side-by-side relationship of two forms for each fan-fold section of said fan-fold strip, each said form being preprinted in accordance with a code card and a number of cards to be attached to that form, and said cards being supplied in corresponding sequence as to code number and number of cards, wherein:

said inserter mechanism includes four card receiving means respectively corresponding to the two card attachment locations of each of the side-by-side forms, and said controlling means controls the said four receiving means of said inserter mechanism selectively to receive, in predetermined sequence and number, the total cards to be attached to the corresponding form.

14. An inserter system as recited in claim 13 wherein said inserter mechanism includes:

means defining a transport path for transporting each card received therein from said transport mechanism past each of said receiving means of said inserter mechanism, means for selectively deflecting a card from said inserter mechanism transport means into a selected receiving means, means associated with each said receiving means of said insert mechanism for detecting the transport of a card into the vicinity of the receiving means, and said controlling means selectively controls said deflecting means of said plural receiving means of said inserter mechanism for deflecting cards into the respectively associated receiving means in accordance with the said predetermined sequence and number of cards to be received in each said receiving means for the total number of cards satisfying the requirements of the form, and receives the outputs of said detecting means to confirm that a card has been deflected and received into the intended receiving means of the inserter mechanism.

15. An inserter system for automatically attaching pre-coded cards of generally planar, rectangular configuration to respectively corresponding, pre-coded mailer forms at predetermined card attachment locations on each said mailer form, by inserting first and second diagonally opposite corners of each card associated with the form into corresponding first and second card-corner receiving apertures provided in the associated form and defining the said card attaching location of said form, said apertures being spaced apart by a distance less than the diagonal dimension of the card between the said first and second diagonally opposite corners thereof, successive said mailer forms being supplied in a continuous fan-fold strip with each said mailer form pre-coded in accordance with the code of cards to be received therein and the number of such common-coded cards to be attached to said form and said cards being provided in sequence as to code and number thereof, in accordance with the succession of mailer forms, comprising:

a card supply station containing a supply of plural cards arranged in sequence in accordance with the card code number and number of cards of a common code number to comply with the pre-printed code and number of coded cards of said successive pre-printed mailer forms, a pick station for picking cards from said supply station, in succession, a transport station and an inserter station, said transport station transporting cards from said pick station to said inserter station, a form supply and transport station for transporting the forms of said fan-fold strip individually and in succession into an aligned position at said inserter station, means for reading a code on each said card, said card transport station transporting each card in succession past said reading means, said form supply and transport station including means for reading the card code and number of cards pre-printed on each said form, an inserter station for attaching cards to a form aligned therewith at the inserter station, and control means for selectively controlling the operations of said pick station, said transport station, said form supply and transport station, and said inserter station to permit operation of each thereof in asynchronous relationship with respect to the others, said controlling means comparing the card code and number of cards read from each said form, in succession, with the code and number of commonly coded cards read by said card reading means for the successive cards to determine compliance of the sequence of cards with the requirements of each of the sequence of forms, in succession and for supplying the cards in individual succession to said inserter station for each card which satisfies the requirements of a corresponding form, and for actuating said inserter station to insert said cards into the corresponding form when said form is positioned at said inserter station, said inserter station including an inserter mechanism for receiving the cards supplied thereto and for deflecting diagonally opposite corners of the cards supplied to and received by said inserter mechanism into said receiving apertures of said form thereby to attach the appropriate cards to the corresponding form.

16. An inserter system as recited in claim 15, further comprising:

a burster station, said controlling means operating said form advance station to advance the fan-fold strip forms after completion of insertion of a form currently positioned at said inserter station to position the completed form at the burster station and simultaneously to advance the next successive form into said inserter station and to advance the further next successive form into position for reading by said reader means of said transport station, said controlling means controlling said burster station to burst the completed form from the form in said inserter station along a burst/fold line delineating successive said forms of the fan-fold strip.

17. An inserter system as recited in claim 16 wherein said forms are supplied in side-by-side relationship in said fan-fold strip, establishing a predetermined sequence of forms of said side-by-side and said fan-fold strip sequential relationship, said side-by-side forms being delineated by a perforation line for separating same into separate forms, and wherein:

said burster station includes a slitter mechanism for slitting said side-by-side forms along said perforation line to separate same, during withdrawal of said side-by-side forms, after bursting, from said burst station.

18. An inserter system as recited in claim 16 further comprising:

a folder station adjacent said burster station for receiving at least the leading edge of a completed form advanced into the burster station, said controlling means actuating said folder station to advance and withdraw said completed and burst form from said burster station during the completion of an inserter operation of said inserter station.

19. An inserter system as recited in claim 18 wherein said folder station comprises a folder transport mechanism selectively operable to fold said forms along at least one transverse fold line.

20. An inserter system as recited in claim 19 wherein said folder mechanism is selectively operable to fold each said form along at least two fold lines.

21. An inserter system as recited in claim 20 wherein said folder mechanism selectively operable to transport a form having no fold lines.

22. An inserter system as recited in claim 18, further comprising:

a folder outfeed mechanism for receiving forms from said folder mechanism, an outfeed transport station including an outfeed transport mechanism for receiving folded forms from said folder outfeed mechanism of said folder station and transporting same, and an output stacker station including an ejector mechanism for receiving folded forms from said outfeed mechanism of said outfeed transport station and ejecting same into an output stacker in sequence.

23. An inserter system as recited in claim 15 wherein said card supply station includes means for receiving first and second trays of coded cards arranged in said predetermined sequence in accordance with the requirements of the successive mailer forms, sensing means for detecting the presence of cards in each of said first and second input trays, said pick station includes first and second pick mechanisms respectively associated with said first and second trays of cards for selectively picking cards from the respectively associated tray, and said controller means selectively controls said first and second picker mechanisms to enable a selected one thereof to pick cards from the respectively associated one of the first and second trays.

24. An inserter system as recited in claim 23 wherein said controller means is responsive to the outputs of said detecting means for said trays to automatically enable the picking mechanism for a tray having cards therein upon depletion of the supply of cards from the other of said trays.

25. An inserter system as recited in claim 24 wherein said control means automatically enables a predetermined one said first and second picking mechanisms to pick cards from the respectively corresponding one of said first or second trays.

26. An inserter system as recited in claim 26 wherein there is further provided:

operator selection means for manually selecting the other of said first and second trays and overriding the automatic selection of said predetermined one by said control means.

27. An inserter system as recited in claim 22 wherein said output stacker station includes first and second ejector means, first and second output trays and corresponding first and second detection means for detecting the availability of the respectively associated first and second output trays for receiving ejected, folded forms from said first and second ejector means, respectively, and said control means automatically selects a first of said first and second output trays and selectively controls said first and second ejector means to enable a selected one thereof to eject folded forms into the thus correspondingly selected output tray, and is responsive to the detectors for said output trays to select the other of said trays when one thereof is not available to receive ejected forms.

28. A method for attaching a card of generally planar, rectangular configuration to a mailer form at a predetermined card attachment location thereon by inserting first and second diagonally opposite corners of the card into corresponding first and second card-corner receiving apertures provided in the form and defining the said card attaching location thereof, said apertures being spaced apart by a distance less than the diagonal dimension of the card between said first and second diagonally opposite corners thereof, comprising:

receiving and releasably retaining a card in a first position, positioning a mailer form with the said card attachment location thereof aligned with and substantially parallel to and displaced from said first position of the releasably retained card to be inserted therein, supporting said card in a central portion thereof and engaging said card adjacent said first and second diagonally opposite corners for deflecting said corners beyond said first position and towards said form, thereby to insert said first and second diagonally opposite corners of said card into the said corresponding apertures of the card attachment location of said mailer form aligned therewith, and thereafter terminating the support of said card in said central portion thereof to permit said card to flex to its original planar configuration with the said diagonally opposite corners thereof projecting through the said corresponding apertures and underlying the form, thereby attaching the card to the form.

29. A method for automatically attaching pre-coded cards of generally planar, rectangular configuration to respectively corresponding, pre-coded mailer forms at predetermined card attachment locations on each said mailer form, by inserting first and second diagonally opposite corners of each card associated with the form into corresponding first and second card-corner receiving apertures provided in the associated form and defining the said card attaching location of said form, said apertures being spaced apart by a distance less than the diagonal dimension of the card between the said first and second diagonally opposite corners thereof, said mailer forms being supplied in a continuous fan-fold strip with each said mailer form pre-coded in accordance with the code of cards to be received therein and the number of such common-coded cards to be attached to said form and said cards being provided in succession as to code and number thereof, in accordance with the succession of mailer forms, comprising:

receiving and releasably retaining a first position, at least one card, advancing said fan-fold strip supply of mailer forms for selectively positioning each said mailer form, in succession, with the card attachment location thereof aligned with and substantially parallel to and displaced from said first position of the releasably retained, at least one card to be inserted therein, reading the pre-printed code of said mailer form for identifying the card code and the number of cards to be attached to each said mailer form, prior to said mailer form being advanced to said aligned position, picking cards, in individual succession, from said supply thereof, reading each individual card, in succession as picked from said supply, comparing the code read from each card and the number of cards bearing a common code picked in sequence from said supply thereof with the preprinted code and card number read from a corresponding mailer form to determine compliance of the picked cards as to code and the number of cards of a common code with the card code and number of card requirements of each said form, in individual succession for the plurality of forms and picked cards, placing each successive said card which satisfies the requirements of a corresponding mailer form in alignment with a selected, card attachment location of the corresponding form, supporting each said selected and placed card in a central portion and engaging same adjacent said first and second diagonally opposite corners for deflecting said corners beyond said first position and towards said form, and releasing said card while maintaining said central support thereof and deflecting said diagonally opposite corners of said card about said central support position to enable insertion of said first and second diagonally opposite corners of said card into said corresponding apertures of the card attachment location of the mailer form aligned therewith, and thereafter terminating said central support thereof to permit said card to flex to its original planar configuration with the said diagonally opposite corners thereof projecting through the said corresponding apertures and underlying the form, thereby attaching the card to the form.

30. A method as recited in claim 29 further comprising:

detecting each card picked from said supply and incrementing a count for each thereof, detecting each card placed for insertion, and decrementing the count for each thereof, and controlling said picking so as to continue picking of cards from said supply only so long as said count does not exceed a predetermined value.

31. A method for automatically attaching pre-coded cards of generally planar, rectangular configuration to respectively corresponding, pre-coded mailer forms at predetermined card attachment locations on each said mailer form, by inserting first and second diagonally opposite corners of each card associated with the form into corresponding first and second card-corner receiving apertures provided in the associated form and defining the said card attaching location of said form, said apertures being spaced apart by a distance less than the diagonal dimension of the card between the said first and second diagonally opposite corners thereof, said mailer forms being supplied in a continuous fan-fold strip with each said mailer form pre-coded in accordance with the code of cards to be received therein and the number of such common-coded cards to be attached to said form and said cards being provided in succession as to code and number thereof, in accordance with the succession of mailer forms, comprising:

supplying plural cards in sequence in accordance with the card code number and number of cards of a common code number to comply with the preprinted code and number of coded cards of each of said sequence of preprinted mailer forms, picking cards from said supply station, in succession, transporting the forms of said fan-fold strip individually and in succession into an aligned position for card insertion, reading a code on each said card, reading the card code and number of cards preprinted on each said form, comparing the card code and number of cards read from each said form, in succession, with the code and number of commonly coded cards, as read from the successive cards to determine compliance of the sequence of cards with the requirements of the successive forms, placing the cards in individual succession in aligned positions for card insertion, for each card which satisfies the requirements of a corresponding form, inserting said cards into the corresponding form when said form is positioned in aligned position for card insertion by deflecting diagonally opposite corners of the placed cards into said receiving apertures of said form thereby to attach the appropriate cards to the corresponding form, and selectively controlling said pick, said form supply and transport, and said inserter operations to occur in asynchronous relationship.

32. A method as recited in claim 31, further comprising:

advancing the fan-fold strip forms after completion of card insertion into a given form to position the completed form for bursting away from the strip, and simultaneously advancing the next successive form into aligned position for card insertion and the further next successive form into position for reading, and bursting the completed form from said next successive form along a burst/fold line delineating successive said forms of the fan-fold strip in a common cycle while inserting cards into that next successive form and reading the further next successive form.

33. A method as recited in claim 32 further comprising:

folding the completed and burst form during the same cycle of card insertion into the said next successive form.

34. A method as recited in claim 31 further comprising:

supplying first and second trays of coded cards arranged in said predetermined sequence in accordance with the requirements of the sequence of mailer forms, detecting the presence of cards in each of said first and second input trays, and selectively picking cards automatically, initially from a predetermined one of said trays and thereafter automatically switching from a tray having no cards therein to pick cards, from the other of said trays.

35. An inserter device for attaching flexible cards of normally planar, rectangular configuration to respectively associated forms, said forms having spaced-apart apertures for receiving diagonally opposite corners of the cards when said corners are deflected toward said forms, comprising:

means for selectively positioning at least one form from a supply of plural said forms, in succession at a predetermined position for attaching a card thereto;

means for receiving and releasably retaining cards to be attached to a corresponding form when selectively positioned at the predetermined card attaching position;

means for selectively providing to said receiving and releasable retaining means, from a supply of plural cards, at least one card to be attached to a corresponding form, and means for actuating said releasable retaining means to release said selectively provided card and for deflecting said card to project the diagonally opposite corners of said at least one selected card into the receiving apertures of the associated form, and thereafter to terminate the deflecting of said at least one card to permit same to flex to a planar configuration with the card corners projecting through the apertures and underlying the opposite surface of the form thereby to attach the selected at least one card to the form.

36. An inserter device as recited in claim 35 wherein said releasable retaining means includes plural arms selectively disposed to engage opposite edges of the card for releasably retaining each card received therein, said arms being mounted for selectively controlled relative movement toward and away from the edges of said card, and said actuating means moves said arms away from said card edges to release said card during deflection thereof for attachment to said form.

37. An inserter device as recited in claim 36 wherein said deflecting means comprises a pair of projections for engaging the said diagonally opposite corners of said card to effect said deflection thereof.

38. An inserter device as recited in claim 37 wherein said deflecting means further includes a finger element extending centrally of the card along the surface thereof adjacent to said form, for supporting the central card portion during deflection thereof by said deflecting means to maintain said central portion bowed outwardly from said form during deflection of said card corners toward said form.

39. An inserter device as recited in claim 37 wherein each of said cards is pre-coded with data and said means for selectively supplying plural cards comprises:

an input card hopper containing a supply of plural cards;

means for picking cards, individually and in succession, from said supply hopper, a card transport for receiving picked cards and transporting same;

a card read station for reading data coded on said cards, and said transport means transporting said cards from said pick means through said card station and to said releasable retaining means.

40. The inserter device of claim 39 wherein each form is pre-coded with data, and wherein there is further provided:

means for feeding a supply of forms selectively to position a given form at said predetermined card attaching position for having a card inserted therein, means for reading data from each said form for determining the coding thereon, means for comparing the data read from the card with the data read from the form and means for comparing the data read from the card with the data read from the form to identify the cards correctly, corresponding to the form currently positioned for card insertion, said card providing means being responsive to said comparing means for selectively supplying to said receiving means the said correctly corresponding cards for attachment to that corresponding form.

41. The system as set forth in claim 40 wherein each said form is coded with a number of cards of a given code identification to be attached thereto, and said form reading means reads the data coded on each form, and there is further provided:

computer means responsive to the data read from the form and the data read from successively picked cards to control said card providing means to provide the number of cards of the given code identification as required by the corresponding form to said receiving means for insertion into said corresponding form.

42. A transport apparatus for transporting forms of a serial, continuous supply thereof, comprising:

means for engaging said serial form supply for feeding thereof in simultaneous, serial succession, motor means for driving and engaging means, encoding means associated with said motor means and driven thereby for establishing in each rotation thereof a basic timing cycle of said apparatus, further encoder means driven by said motor and having a predetermined ratio of rotation with respect to said first encoder means and producing an output in each complete rotation there of corresponding to transport of said serial forms by a distance corresponding to an individual one of said serial forms, form alignment means associated with said transport means for initial alignment of a top edge of a first form of said serial supply thereby to establish initial alignment of said serial form supply in synchronism with said further encoder means associated with said motor means, control means for initialing said transport apparatus to drive said motor for positioning said further encoder means at a top of form position, corresponding to initial alignment of a top of a first form of said serial supply with said top of form alignment position of said transport engaging means, and having further associated therewith means for supplying cards, an insert mechanism for inserting said cards into specially configured apertures on respectively corresponding, individual forms as each said form is positioned in said inserter mechanism, said form transport apparatus advancing said forms in individual succession into said inserter mechanism for insertion of cards into the apertures thereof, thereby attaching cards to corresponding forms, for plural association of said forms and cards in respectively corresponding succession.

43. Form transport apparatus as recited in claim 42, wherein individual ones of said serial supply of forms are delineated by transverse perforation lines for separating each said form from said serial supply thereof, further comprising:

burster means having a predetermined burster location corresponding to the form delineating perforation line of a form advanced out of said inserter station by said transport means when positioning a successive form in said inserter station, and said control means controlling said burster means to burst the advanced form with cards inserted therein from the next successive form in said inserter station during the insertion of cards into said form in said inserter station.

44. A card and mailer form apparatus comprising: positive feed means for inputting serially connected mailer forms into the apparatus for the purpose of having correct cards attached therewith, means for reading pre-provided information on each of said mailer forms, input means for supplying pre-coded cards, means for reading the pre-coded information on each of said cards, computer means for comparing the information as read on the mailer forms and the cards to initiate an operation if a proper match is made, insertion means for attaching the respective cards to the respective individual forms when initiated by said proper match operation, and form separating means to detach and prepare each filled mailing form ready for mailing.

45. The structure set forth in claim 44, together with folder means for folding each of said mailer forms with card attached therewith into a proper shape for the mailing thereof, said means for the positive feeding of the serially connected input mailer includes tractor means for positive engagement with mating tractor portions provided on said serially connected mailer forms, motor means for operating said tractor means, and timing cycle means operated by said motor means for providing control signals to the computer means.

46. The structure set forth in claim 45, wherein said timing cycle means includes a basic timing cycle cam, associated photosensor structure connected to the computer means and responsive to said basic timing cycle cam, and geared down form timing structure also operated by said motor means for controlling the feed and positioning of said mailer forms by the positive feed means therefore.

47. The structure as set forth in claim 44, wherein said means for reading the pre-provided information on the mailer forms includes a read head, means for supporting said read head for traversing movement across the path of movement of said serially connected mailer forms, and sensor means for controlling the traverse movement of said read head mounted at each of the ends of said path of traverse movement.

48. The structure set forth in claim 47 wherein said sensor means includes two photosensors, associated flag structure mounted at each of the ends of said path of traverse movement, and appropriate connections to said computer means for effecting said traverse movement under the control of said photosensors.

49. The structure set forth in claim 44, wherein the input means for pre-coded cards includes an individual card selector structure and a card transport structure, and read means closely associated with said card transport structure for reading the pre-coded information on each of said individual cards as transported thereby.

50. The structure as set forth in claim 49, wherein said read means includes an optical card reader structure, said pre-coded information is embossed on each of said individual cards, and said optical card reader obtains the desired information by reading said embossed characters.

51. An apparatus for attaching data cards to corresponding carrier forms for a plurality of accounts, each said card having account information encoded thereon, and said carrier forms being supplied as a continuous web of successive forms, each said form having account information thereon and information on a predetermined number of cards to be attached thereto for the respective account, comprising:

(a) means for supplying a continuous web of said carrier forms;

(b) means for supplying a plurality of said data cards in individual succession;

(c) means for reading account information from said data cards;

(d) means for reading information from said carrier forms of the continuous web, including account information and the predetermined number of cards to be attached thereto for the corresponding account;

(e) means for comparing information read from said data cards and from said forms of the continuous web and identifying said data cards for attachment to an associated form of the continuous web having corresponding account information, for each form in succession;

(f) data card collecting and attaching means for collecting data cards identified by said comparing and identifying means for attachment to an associated form of the continuous web and then simultaneously attaching said predetermined number of data cards to the associated form on the continuous web in response to said predetermined number of cards having been identified and collected for the associated form; and (g) control means for stopping the supply of a data card from said data card supplying means to said data card collecting and attaching means when said comparing and identifying means determines that there is a mismatch of the information read from a data card and the associated carrier form of the continuous web.

52. The apparatus of claim 51, further comprising carrier form and data card inspection stations for visual examination of a data card and a carrier form of the continuous web by the operator upon a mismatch of the information read from the data card and the associated carrier form of the continuous web.

53. The apparatus of claim 52, further comprising means for advancing a carrier form of the continuous web positioned in said collecting and attaching means to said form inspection station upon a mismatch of the read account information.

54. The apparatus of claim 51, wherein each carrier form of the continuous web includes at least one card attachment location thereon, wherein said data card collecting and attaching means receives and releasably retains up to at least two data cards in a card attachment position, and wherein said apparatus further comprises means for positioning a card attachment location of a carrier form on the continuous web adjacent said card attachment position.

55. The apparatus of claim 51, wherein each carrier form of the continuous web includes at least two card attachment locations thereon, wherein said data card collecting and attaching means comprises first and second means, each for receiving and releasably retaining up to at least two cards in a card attachment position, transport means for receiving a card and transporting same along a transport path adjacent said first and second receiving and releasably retaining means, and first and second deflections means normally positioned to enable each of said data cards to be transported along said transport path past said first and second receiving and retaining means, and individually selectively moveable into said transport path to deflect an individual card from said transport path into the corresponding one of said first and second receiving and retaining means, thereby to provide for selective receipt of cards in their respectively associated, first and second receiving and retaining means, and wherein said apparatus further comprises means for positioning the at least two card attachment locations of a carrier form on the continuous web adjacent the corresponding two card attachment positions.

56. The apparatus of claim 55, further comprising means for controlling and actuating said first and second receiving and releasably retaining means for simultaneously attaching the cards received in each of said first and second receiving and retaining means to the respective first and second card attachment locations of the associated form of the continuous web when said predetermined number of data cards has been identified and collected.

57. The apparatus of claim 56, wherein said carrier forms are supplied to said data card collecting and attaching means in double-width of two side-by-side mailer forms of a continuous web, each carrier form of the continuous web having first and second card attachment locations thereon for attachment at each location of up to at least two cards, and wherein said data collecting and attaching means further comprises third and fourth receiving and releasably retaining means and wherein said apparatus further comprises means for controlling and actuating said first, second, third, and fourth receiving and releasably retaining means for simultaneously attaching the cards received in each of said four receiving and releasably retaining means to the respective four attachment locations of the two carrier forms on the continuous web.

58. The apparatus of claim 52, wherein each carrier form of the continuous web includes at least one card attachment location thereon, wherein said data card collecting and attaching means receives and releasably retains up to at least two data cards in a card attachment position and wherein said apparatus further comprises means for positioning a card attachment location of a carrier form on the continuous web adjacent said card attachment position.

59. The apparatus of claim 53, wherein each carrier form of the continuous web includes at least one card attachment location thereon, wherein said data card collecting and attaching means receives and releasably retains up to at least two data cards, in a card attachment position and wherein said apparatus further comprises means for positioning a card attachment location of a carrier form on the continuous web adjacent said card attachment position.

60. The apparatus of claim 54, wherein said data card collecting and attaching means positions first and second diagonally opposite corners of the data cards into corresponding first and second card-corner receiving apertures provided in the carrier form defining the card attachment location on said carrier forms of the continuous web.

61. The apparatus of claim 55, wherein said data card collecting and attaching means positions first and second diagonally opposite corners of the data cards into corresponding first and second card-corner receiving apertures provided in the carrier form defining the card attachment location on said carrier forms of the continuous web.

62. The apparatus of claim 56, wherein said data card collecting and attaching means positions first and second diagonally opposite corners of the data cards into corresponding first and second card-corner receiving apertures provided in the carrier form defining the card attachment location on said carrier forms of the continuous web.

63. An apparatus for attaching data cards to corresponding carrier forms for a plurality of accounts, each said card having account information encoded thereon, and said carrier forms being supplied as a continuous web of successive forms, each said form having account information thereon and information on a predetermined number of cards to be attached thereto for the respective account, comprising:

(a) means for supplying a continuous web of said carrier forms;

(b) means for supplying a plurality of said data cards in individual succession;

(c) means for reading account information from said data cards;

(d) means for reading information from said carrier forms of the continuous web, including account information and the predetermined number of cards to be attached thereto for the corresponding account;

(e) means for comparing information read from said data cards and from said forms of the continuous web and identifying said data cards for attachment to an associated form of the continuous web having corresponding account information, for each form in succession;

(f) data card collecting and attaching means for collecting data cards identified by said comparing and identifying means for attachment to an associated form of the continuous web and then simultaneously attaching said predetermined number of data cards to the associated form on the continuous web in response to said predetermined number of cards having been identified and collected for the associated form; and (g) control means for stopping the supply of a data card from said data card supplying means to said data card collecting and attaching means when said comparing and identifying means determines that there is a mismatch of the information read from a data card and the associated carrier form of the continuous web.

64. The apparatus of claim 63, further comprising carrier form and data card inspection stations for visual examination of a data card and a carrier form of the continuous web by the operator upon a mismatch of the information read from the data card and the associated carrier form of the continuous web.

65. The apparatus of claim 64, further comprising means for advancing a carrier form of the continuous web positioned in said collecting and attaching means to said form inspection station upon a mismatch of the read account information.

66. The apparatus of claim 63, wherein each carrier form of the continuous web includes at least one card attachment location thereon, wherein said data card collecting and attaching means receives and releasably retains up to at least two data cards in a card attachment position, and wherein said apparatus further comprises means for positioning a card attachment location of a carrier form on the continuous web adjacent said card attachment position.

67. The apparatus of claim 63, wherein each carrier form of the continuous web includes at least two card attachment locations thereon, wherein said data card collecting and attaching means comprises first and second means, each for receiving and releasably retaining up to at least two cards in a card attachment position, transport means for receiving a card and transporting same along a transport path adjacent said first and second receiving and releasably retaining means, and first and second deflection means normally positioned to enable each of said data cards to be transported along said transport path past said first and second receiving and retaining means, and individually selectively moveable into said transport path to deflect an individual card from said transport path into the corresponding one of said first and second receiving and retaining means, thereby to provide for selective receipt of cards in their respectively associated, first and second receiving and retaining means, and wherein said apparatus further comprises means for positioning the at least two card attachment locations of a carrier form on the continuous web adjacent the corresponding two card attachment positions.

68. The apparatus of claim 67, further comprising means for controlling and actuating said first and second receiving and releasably retaining means for simultaneously attaching the cards received in each of said first and second receiving and retaining means to the respective first and second card attachment locations of the associated form of the continuous web when said predetermined number of data cards has been identified and collected.

69. The apparatus of claim 51, wherein said carrier forms are supplied to said data card collecting and attaching means in double-width of two side-by-side mailer forms of a continuous web, each carrier form of the continuous web having first and second card attachment locations thereon for attachment at each location of up to at least two cards, and wherein said data collecting and attaching means further comprises third and fourth receiving and releasably retaining means and wherein said apparatus further comprises means for controlling and actuating said first, second, third, and fourth receiving and releasably retaining means for simultaneously attaching the cards received in each of said four receiving and releasably retaining means to the respective four attachment locations of the two carrier forms on the continuous web.

70. The apparatus of claim 64, wherein each carrier form of the continuous web includes at least one card attachment location thereon, wherein said data card collecting and attaching means receives and releasably retains up to at least two data cards in a card attachment position and wherein said apparatus further comprises means for positioning a card attachment location of a carrier from on the continuous web adjacent said card attachment position.

71. The apparatus of claim 65, wherein each carrier form of the continuous web includes at least one card attachment location thereon, wherein said data card collecting and attaching means receives and releasably retains up to at least two data cards in a card attachment position and wherein said apparatus further comprises means for positioning a card attachment location of a carrier form on the continuous web adjacent said card attachment position.

72. The apparatus of claim 66, wherein said data card collecting and attaching means positions first and second diagonally opposite corners of the data cards into corresponding first and second card-corner receiving apertures provided in the carrier form defining the card attachment location on said carrier forms of the continuous web.

73. The apparatus of claim 67, wherein said data card collecting and attaching means positions first and second diagonally opposite corners of the data cards into corresponding first and second card-corner receiving apertures provided in the carrier form defining the card attachment location on said carrier forms of the continuous web.

74. The apparatus of claim 51, wherein said data card collecting and attaching means positions first and second diagonally opposite corners of the data cards into corresponding first and second card-corner receiving apertures provided in the carrier form defining the card attachment location on said carrier forms of the continuous web.

* * * * *